(12) United States Patent
Lee et al.

(10) Patent No.: US 8,923,184 B2
(45) Date of Patent: Dec. 30, 2014

(54) APPARATUS AND METHOD FOR RELIABLY AND DYNAMICALLY TRANSMITTING GROUP INFORMATION VIA A WIRELESS MULTICAST OR BROADCAST CHANNEL

(75) Inventors: Sung Won Lee, Seoul (KR); Han Na Lim, Seoul (KR); Beom Sik Bae, Suwon-si (KR); Song Yean Cho, Seoul (KR); Chae Gwon Lim, Seoul (KR)

(73) Assignees: Samsung Electronics Co., Ltd., Suwon-si (KR); Kyung Hee University Industry Academic Cooperation Foundation, Yongin-si (KR)

( * ) Notice: Subject to any disclaimer, the term of this patent is extended or adjusted under 35 U.S.C. 154(b) by 50 days.

(21) Appl. No.: 13/513,421

(22) PCT Filed: Nov. 30, 2010

(86) PCT No.: PCT/KR2010/008511
§ 371 (c)(1),
(2), (4) Date: Jun. 1, 2012

(87) PCT Pub. No.: WO2011/068345
PCT Pub. Date: Jun. 9, 2011

(65) Prior Publication Data
US 2012/0236779 A1 Sep. 20, 2012

(30) Foreign Application Priority Data
Dec. 1, 2009 (KR) ........................ 10-2009-0118053

(51) Int. Cl.
*H04H 20/71* (2008.01)
*H04L 29/06* (2006.01)
*H04W 4/08* (2009.01)
*H04W 8/18* (2009.01)

(52) U.S. Cl.
CPC ............. *H04W 4/08* (2013.01); *H04L 65/1043* (2013.01); *H04L 65/1073* (2013.01); *H04W 8/186* (2013.01)
USPC ............ 370/312; 370/328; 370/341; 370/349

(58) Field of Classification Search
CPC ...................................................... H04W 4/08
USPC ......... 370/312, 328, 329, 338, 341, 348, 390, 370/349; 379/196; 709/229; 455/435, 518
See application file for complete search history.

(56) References Cited

U.S. PATENT DOCUMENTS

2003/0078042 A1* 4/2003 Miriyala et al. ............... 455/435
2004/0117490 A1* 6/2004 Peterka et al. ................. 709/229
(Continued)

FOREIGN PATENT DOCUMENTS

| KR | 10-2007-0083093 A | 8/2007 |
|---|---|---|
| KR | 10-0836028 B1 | 6/2008 |
| KR | 10-2008-0112468 A | 12/2008 |

*Primary Examiner* — Brian D Nguyen
*Assistant Examiner* — Toan Nguyen
(74) *Attorney, Agent, or Firm* — Jefferson IP Law, LLP

(57) ABSTRACT

The present invention relates to a method and apparatus, in which a controller (OGI-controller) receives the registration of a terminal from a content provider so as to transmit information via a wireless multicast or broadcast channel, and transmits information to the registered terminal. The method comprises: a service registration step in which the controller registers a service to transmit information provided by the content provider to the terminal, and allocates an identification to a terminal group which will receive the information; a terminal registration step in which the content provider registers the terminal group to the controller; a terminal state checking step in which the controller receives a report on the operating states of the terminals of the registered terminal group; a terminal classifying step in which the controller classifies the terminals on the basis of the operating states of the terminals; and a terminal state reporting step in which the content provider receives a report on the state of the terminal.

18 Claims, 75 Drawing Sheets

(56) References Cited

U.S. PATENT DOCUMENTS

| | | | |
|---|---|---|---|
| 2007/0030849 A1* | 2/2007 | Shin | 370/390 |
| 2009/0176524 A1* | 7/2009 | David | 455/518 |
| 2010/0014652 A1* | 1/2010 | Yasuda | 379/196 |

* cited by examiner

FIG. 12

| Group-ID | CP-ID | Type | Area |
|---|---|---|---|
| KH_Driver_Group | KH_Transport | Mobile type | {R1, R2} |
| KH_Display_Group | KH_Transport | Fixed type | {R0, R2, R3} |
| ... | ... | ... | ... |

FIG. 15

| Group-ID | UE-ID |
|---|---|
| KH_Driver_Group | IMEI_X1 |
| KH_Driver_Group | IMEI_X2 |
| KH_Display_Group | IMEI_Y1 |
| ... | ... |

FIG. 18

| Group-ID | UE-ID | System Information |
|---|---|---|
| KH_Driver_Group | IMEI_X1 | OK |
| KH_Driver_Group | IMEI_X2 | NOK, HW-1 Error |
| KH_Display_Group | IMEI_Y1 | OK |
| ... | ... | ... |

FIG. 19

| Group-ID | UE-ID | Received signal strength |
|---|---|---|
| KH_Driver_Group | IMEI_X1 | Level.0 |
| KH_Driver_Group | IMEI_X2 | Level.2 |
| KH_Display_Group | IMEI_Y1 | Level.1 |
| ... | ... | ... |

FIG. 24

| UE-ID | ACK Class | {optional} Group-ID |
|---|---|---|
| IMEI_X1 | Class.0 | KH_Driver_Group |
| IMEI_X2 | Class.2 | KH_Driver_Group |
| IMEI_Y1 | Class.1 | KH_Display_Group |

| ... | ... | ... |

FIG. 25

| ACK Class | RSSI Level |
|---|---|
| Class.0 | Level.0 |
| Class.1 | Level.1 - Level.2 |
| Class.2 | Level.3 - Level.5 |

| UE-ID | System Information | Location Information | Group-ID |
|---|---|---|---|
| IMEI_X1 | OK | Good Signal | KH_Driver_Group |
| IMEI_X2 | NOK, HW-1 Error | Bad Signal | KH_Driver_Group |
| IMEI_Y1 | OK | Good Signal | KH_Display_Group |
| ... | ... | ... | ... |

FIG. 42

| SESSION-ID | TYPE | AREA | GROUP-ID | MOD |
|---|---|---|---|---|
| SESSION-X1 | FIXED | AREA-1 | GROUP-Y1 | Planned |
| SESSION-X2 | MOBILE | AREA-2 | GROUP-Y2 | Planned |

FIG. 43

| SESSION-ID | DEADLINE | IMPORTANCE | SUCCESS RATIO |
|---|---|---|---|
| SESSION-X1 | YYYY-MM-DD-Time | HIGH | 90% |
| SESSION-X2 | YYYY-MM-DD-Time | LOW | 99% |

FIG. 53

| SESSION-ID | START TIME | START CHANNEL | (OPTIONAL) DATA RATE | ACK NECESSITY |
|---|---|---|---|---|
| SESSION-X1 | YYYY-MM-DD-Time | Channel.0 | RATE1 | YES |
| SESSION-X2 | YYYY-MM-DD-Time | Channel.2 | RATE0 | NO |

FIG. 54

| CLASS | ACK ENABLED | ACK CHANNEL | TIMESLOT |
|---|---|---|---|
| CLASS 0 | Yes | CHANNEL.1 | TS.0 |
| ........ | ........ | ........ | ........ |
| CLASS N | Yes | CHANNEL.2 | TS.3 |

FIG. 59

| SESSION-ID | AREA-CODE | START TIME | START CHANNEL | {OPTIONAL} DATA RATE | ACK NECESSITY |
|---|---|---|---|---|---|
| SESSION-X1 | AREA.1 | YYYY-MM-D1-Time | CHANNEL.0 | RATE1 | YES |
| SESSION-X1 | AREA.2 | YYYY-MM-D2-Time | CHANNEL.2 | RATE0 | YES |
| SESSION-X1 | AREA.3 | YYYY-MM-D1-Time | CHANNEL.1 | RATE3 | YES |
| SESSION-X2 | AREA.3 | YYYY-MM-DD-Time | CHANNEL.2 | RATE0 | NO |

| UE-ID | Session-ID | Corrupted-Sequence |
|---|---|---|
| UE-X1 | Session-Y1 | {23:25}, {30:33} |
| UE-X2 | Session-Y1 | NONE |

FIG. 76

| CP-ID | Session-ID | Success-Ratio | UE-ID | Status |
|---|---|---|---|---|
| KH-Loigstics | Session-XX | 97% | UE-X1 | Success |

| UE-ID | Status |
|---|---|
| UE-Xn | Fail |

FIG. 77

| MSG-TYPE |
| --- |
| TRANSACTION-SEQ |
| TRANSFER MODE |
| UE PROPERTY |
| TARGET-AREA-LENGTH |
| TARGET-AREA#1 |
| ⋮ |
| TARGET-AREA#N |
| GROUP ID |
| DEADLINE |
| IMPORTANCE |
| TARGET-SUCCESS-RATIO |
| FILE DESCRIPTION |
| SESSION ID |

FIG. 78

| MSG-TYPE |
| --- |
| TRANSACTION-SEQ |
| REASON CODE |
| SESSION ID |

FIG. 87

| MSG-TYPE |
|---|
| TRANSACTION-SEQ |
| SESSION ID |
| START TIME |
| START CHANNEL |
| DATA RATE |
| ACK NECESSITY |
| ACK-CLASS-LENGTH |
| CLASS#1 |
| ACK-ENABLED |
| ACK-CHANNEL |
| ACK-TIMESLOT |

| CLASS#N |
|---|
| ACK-ENABLED |
| ACK-CHANNEL |
| ACK-TIMESLOT |

FIG. 95

| MSG-TYPE |
|---|
| TRANSACTION-SEQ |
| SESSION ID |
| START TIME |
| START CHANNEL |
| DATA RATE |
| ACK NECESSITY |
| ACK-CLASS-LENGTH |
| CLASS#1 |
| ACK-ENABLED |
| ACK-CHANNEL |
| ACK-TIMESLOT |
| ... |
| CLASS#N |
| ACK-ENABLED |
| ACK-CHANNEL |
| ACK-TIMESLOT |
| {OPTIONAL} FILE DESCRIPTION |

APPARATUS AND METHOD FOR RELIABLY AND DYNAMICALLY TRANSMITTING GROUP INFORMATION VIA A WIRELESS MULTICAST OR BROADCAST CHANNEL

BACKGROUND OF THE INVENTION

1. Field of the Invention

The present invention relates to a mobile communication system and, in particular, to an apparatus and method for transmitting group information through multicast/broadcast radio channel reliably and dynamically.

2. Description of the Related Art

Conventionally, the multicast/broadcast part of the wireless broadband communication network is defined for real time streaming and some simple file transfer services over multicast/broadcast radio channel. The only usage of the multicast/broadcast channel is to provide the whole (or some) subscribers with firmware upgrade, emergency texting, or real time broadcast services for the wireless broadband communication network provider's own purpose.

In case that a content provider uses the wireless broadband communication network, it is the only way of data communication to use the wireless broadcast communication network as a peer-to-peer communication link between the contents provider and the terminal.

According to the conventional technology, the third party company such as the contents provider or SI (System Integration) company cannot use the multicast or broadcast channel of the wireless broadband communication network for the purpose of advertisement or file and information transfer. Furthermore, there is no way of real time online processing in the automated system. Also, there is no technology developed for the wireless broadband network provider to create its own advertisement and sends the advertisement to a group of terminals. Such a problem appears remarkably when it is necessary to transmit certain information to a plurality of apparatuses interconnected through wireless broadband communication network such as SmartGrid and vending machines equipped with a communication module. This can be a significant restriction to the business partners such as contents providers and SI companies using the wireless broadband communication network.

DISCLOSURE OF INVENTION

Technical Problem

The present invention has been made in an effort to solve the above problem and it is an object of the present invention to provide a method and apparatus for a contents provider who intends to broadcast advertisement, file, and information through wireless broadband communication network, to record specific terminals in association with a specific area and collect statistic information about the terminals' system information and radio signal reception strength information from the terminals online in real time.

It is another object of the present invention to provide a method and apparatus for transmitting advertisement, file, and information to the terminals connected to the wireless broadband communication network online in real time through multicast/broadcast radio channel, retransmitting the same when an error occurs, and providing the transmission result to the contents provider as statistic information.

Solution to Problem

In order to solve the above problem, a method for a OGI controller to register a terminal for transmitting information through multicast or broadcast radio channel includes a service registration step for registering a service for transmitting the information provided by a content provider to the terminal and assigning an ID to a terminal group to receive the information; a terminal registration step for registering, at the content provider, the terminal with the controller; a terminal status check step for receiving operation status of the terminals belonged to the registered terminal group; a terminal class assignment step for assigning classes to the terminals based on operation status of the terminals; and a terminal status report step for reporting terminal status to the content provider.

Also, an information transmission method of a controller (OGI-Controller) for transmitting information to registered terminal through a multicast or broadcast radio channel includes a service request step for requesting, at a content provider, registration of a service for information transmission and assigning a session ID; a service activation step for starting the requested service; a scheduling notification step for transmitting to the terminal a scheduling information for receiving the information at a scheduled time; an information transmission step for transmitting the information to the terminal according to the scheduling; a terminal check step for receiving a transfer error report from the terminal received the information; and an information recovery step for performing retransmission of erroneous information in transmitting the information.

An apparatus for registering a terminal for transmitting information through a multicast or broadcast radio channel according to the present invention includes a processor which controls registering a service for transmitting the information provided by a content provider to the terminal and assigning an ID to a terminal group to receive the information, registering the terminal group, checking operations status of the terminals belonged to the registered terminal group, assigning classes to the terminals based on operation status of the terminals; and reporting terminal status to the content provider; and a network module which performs communication with the terminals.

Also, an information transmission apparatus for transmitting information to terminals registered for information transmission through a multicast or broadcast radio channel includes a processor which controls receiving a service registration request for information transmission from a content provider and assigning a session ID for the service, starting the requested service, transmitting scheduling information for receiving the information at a predetermined time to the terminal, transmitting the information to the terminal according to the scheduling, and receiving a report on transmission error from the terminal received the information; and a network module which performs communication with the terminal.

Advantageous Effects

According to the present invention, the content provider is capable of generating a group of UEs and registering a UE with the generated group in easy and efficient way and receiving the system information and radio signal strength information from the registered UEs. The content provider is capable of utilizing such information as upgrade data for fixation, improvement, and location adjustment of the UE.

According to the present invention, the content provider is capable of transmitting various formats of advertisements, files, and information, retransmitting erroneous ones, and receiving the transfer result as statistical information on the multicast or broadcast radio channel of the system in cooperation with the wireless broadband communication network provider online in real time. Through this, the content provider or the wireless broadband communication network provider is capable of transmitting advertisements, files, and information to a large number of UEs over the multicast or broadcast channel, thereby utilizing the radio resource efficiently.

BRIEF DESCRIPTION OF THE DRAWINGS

FIG. 12 is a diagram illustrating a structure of the group ID management table used in step 1150.

FIG. 15 is a diagram illustrating a structure of the UE management table of the present invention.

FIG. 18 is a diagram illustrating a structure of the UE status report table described with reference to FIG. 17.

FIG. 19 is a diagram illustrating a structure of the UE-received radio signal strength table described with reference to FIG. 17.

FIG. 24 is a diagram illustrating a structure of UE-ACK class table.

FIG. 25 is a diagram illustrating a structure of the mapping table of the present invention.

FIG. 42 is a diagram illustrating a structure of the session information table of the present invention.

FIG. 43 is a diagram illustrating a structure of the SLA stable of the present invention.

FIG. 53 is a diagram illustrating a structure of the notification information table of the present invention.

FIG. 54 is a diagram illustrating a structure of the ACK class table of the present invention.

FIG. 59 is a structure of the notification information table of the present invention.

FIG. 76 is a diagram illustrating a structure of the transfer result statistical information report table.

FIGS. 77 to 97 are diagrams illustrating structures of the messages used in the second embodiment of the present invention.

DETAILED DESCRIPTION OF EXEMPLARY EMBODIMENTS

Descriptions are made of the first and second embodiments of the present invention separately. The first embodiment specifies a procedure of registering specific terminals, to which the content provider wants to provide certain information, in association with a specific area and receiving system information and received radio signal strength information from the terminals. The second embodiment specifies a procedure for a wireless broadband communication provider to transmit advertisement, file, and information, retransmits, if error occurs, them, and provide the content provider with statistic information on the transmission result.

Exemplary embodiments of the present invention are described with reference to the accompanying drawings in detail. The same reference numbers are used throughout the drawings to refer to the same or like parts. Detailed descriptions of well-known functions and structures incorporated herein may be omitted to avoid obscuring the subject matter of the present invention.

Figure 1:
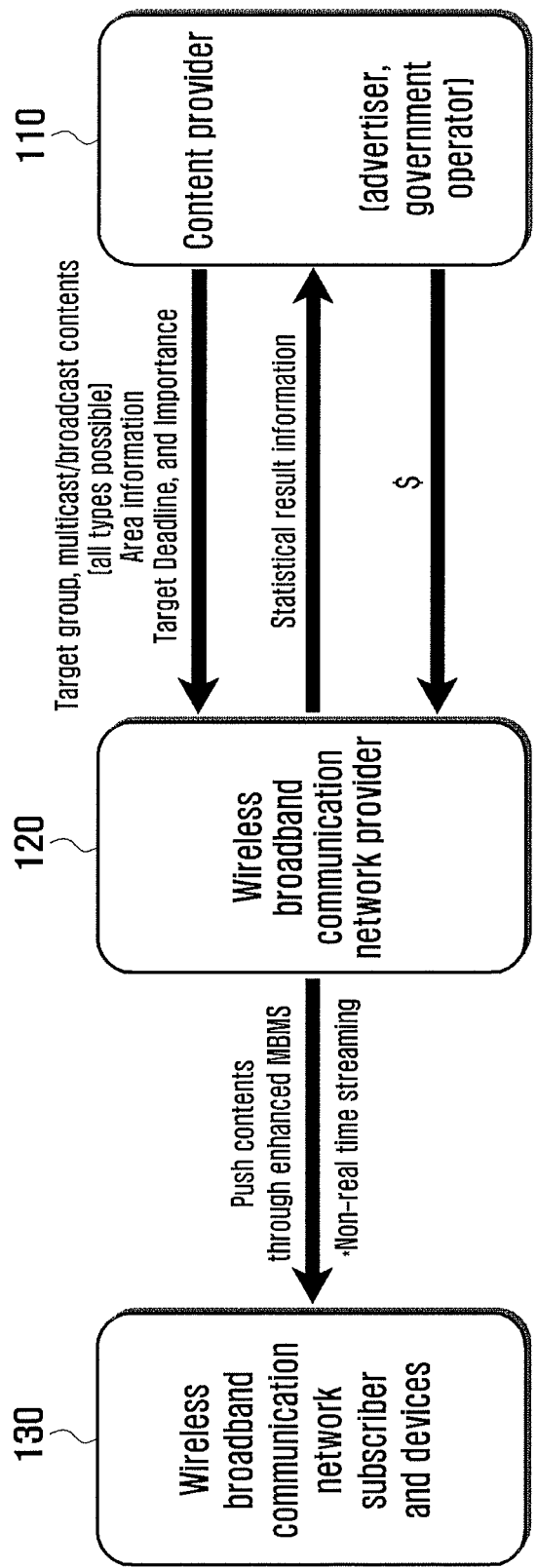
FIG. 1 is a diagram illustrating a concept of a real time online multicast or broadcast service according to an embodiment of the present invention.

FIG. 1 is a diagram illustrating a concept of a real time online multicast or broadcast service according to an embodiment of the present invention.

In FIG. 1, the aim to be accomplished by the present invention is depicted. That is, the present invention provides a method for delivering advertisement information, various types of files, or information to a large number of terminals 130 through wireless broadband communication network. In this case, an online system automated and operating in real time is established between the content provider 110 requesting for the delivery of the advertisement/file/information (hereinafter, 'information') and the wireless broadband communication network provider.

As shown in FIG. 1, the content provider 110 delivers the wireless broadband communication network 120 the information on the group for transmission and contents to be transmitted. In this case, the content provider 110 may further provide the information on the area for the transmission and transmission priority and transmission due time and importance.

The wireless broadband communication network provider 120 transmits the requested information through wireless multicast or broadcast channel of the wireless broadband communication network efficiently and provide the content provider 110 with the statistic information on the transmission result.

In FIG. 1, the first and second embodiments of the present invention are defined entirely. The first embodiment specifies a process in which the content provider 110 registers the terminal 130 (or service) to which information is to be transmitted with the wireless broadband communication network, a process for checking radio environment of the terminal 130 in the wireless broadband communication network and the device condition of the terminal 130, a process for adjusting the location of the corresponding terminal 130 and correcting error by transmitting the check result from the wireless broadband communication network provider 120 to the content provider 110, and receiving controlling the receipt of the information multicast/broadcast through the wireless broadband communication network efficiently.

The second embodiment specifies the method for the content provider 110 to transmit the information through the wireless broadband communication network. In more detail, the first embodiment specifies a process for the content provider 110 to negotiate with the wireless broadband communication network, a process for the content provider 110 to register contents with the wireless broadband communication network based on the negotiated condition, a process for the wireless broadband communication network to transmit the registered contents to the terminal 130 through multicast or broadcast channel, a process for the terminals 130 to acknowledge the receipt of the contents, a process retransmitting erroneous information by optimizing the radio resource based on the acknowledgement received from the terminal 130, and creating and reporting statistical information on the transmission results to the content provider.

Figure 2:
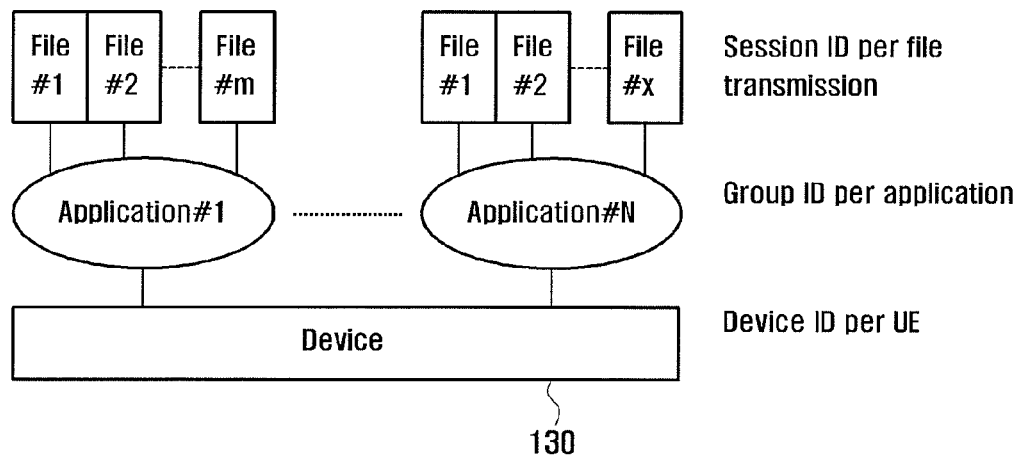
FIG. 2 is a diagram illustrating a concept of operation of multiple application at the terminal 130 according to an embodiment of the present invention and types of identifiers for use in the present invention.

FIG. 2 is a diagram illustrating a concept of operation of multiple application at the terminal 130 according to an embodiment of the present invention and types of identifiers for use in the present invention.

The application executable in the terminal 130 may be download, in necessary, from the content provider 110 through the wireless broadband communication network. In this case, each terminal 130 is assigned a device ID (Device-ID) as a identifier of the terminal 130 in the wireless broadband communication network. Meanwhile, the application has a unique group ID (Group-ID) for identification in the wireless broadband communication network. If the applications transmit different files at different timings, each file transfer may be identified by session ID (Session-ID).

Figure 3:
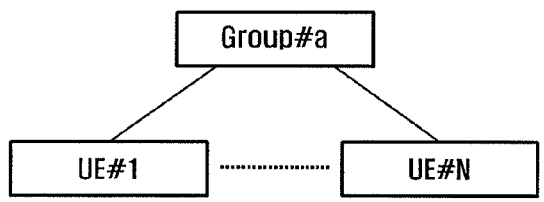
FIGS. 3 and 4 are diagrams illustrating groups of terminals 130 as the targets of the information transfer according to an embodiment of the present invention.
Figure 4:
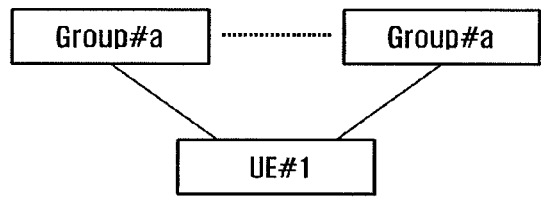

FIGS. 3 and 4 are diagrams illustrating groups of terminals 130 as the targets of the information transfer according to an embodiment of the present invention.

As shown in FIG. 3, the application may include a plurality of terminals as a group of terminals.

However, as shown in FIG. 4, the terminal 130 may belong to a plurality of groups. This concept is identical with the case of software in which a plurality of software entities is operating in a terminal 130.

Figure 5:
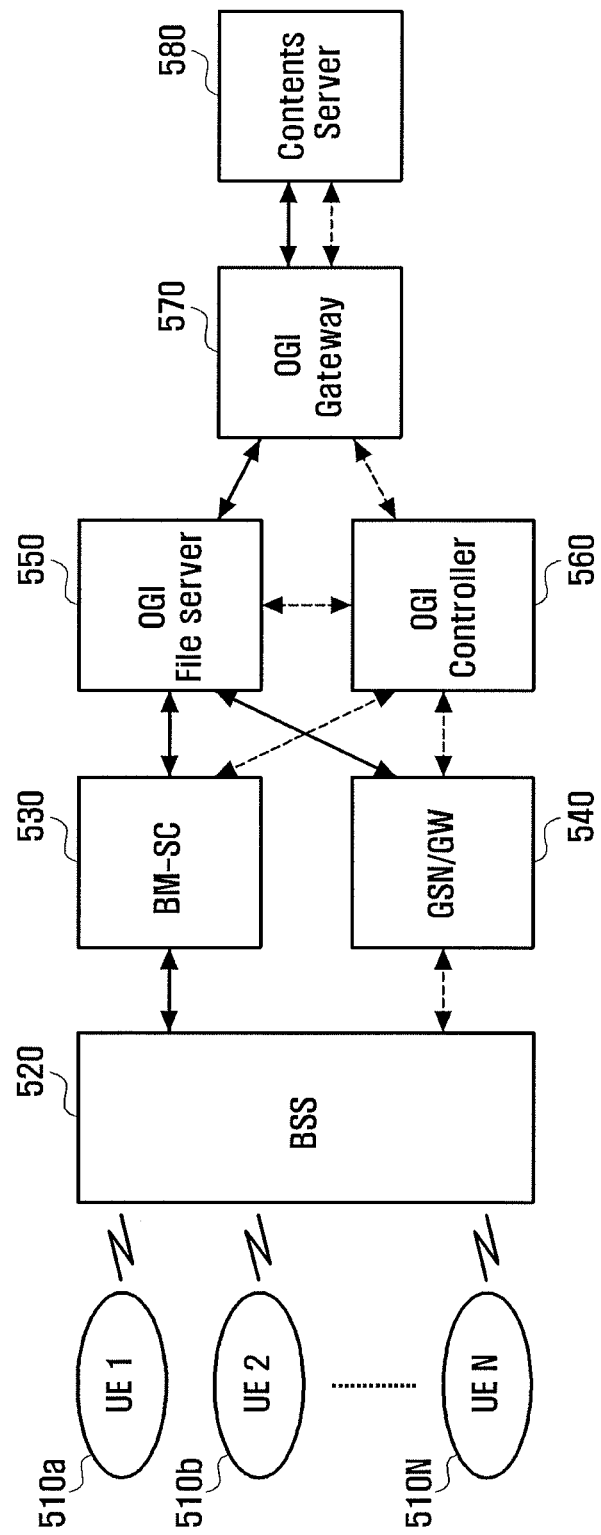
FIG. 5 is a block diagram illustrating a configuration of a network according to an embodiment of the present invention.

FIG. 5 is a block diagram illustrating a configuration of a network according to an embodiment of the present invention.

In order to simplify the explanation of the present invention, the description is directed to an exemplary system based on the 3GPP High Speed Packet Access (HSPA)/Long Term Evolution (LTE). However, the method proposed in the present invention can be applied to other communication networks such as 3GPP2 CDMA2000 network and Mobile WiMAX of the WiMAX forum.

In FIG. 5, UE (User Equipment) 210 is a terminal device performing communication in the wireless broadband communication network. BSS (Base Station System) 520 denotes the system facilities supporting radio communication such as base station. BM-SC (Broadcast/Multicast Service Center) 530 is the apparatus for controlling broadcast channel of the wireless broadband communication network. GSN (CPRS Support Node) 540 denotes the access point for mobility and data communication in the wireless broadband communication network. Here, the BSS 520, BM-SC 530, and GSN/GW 540 area the entities existing in the conventional 3GPP communication network and their functionality can be extended in the present invention.

The OGI-File Server 550, the OGI Controller 560, the OGI Gateway 570, and the 3rd Party Content Server (or content provider) 580 are the entities proposed newly in the present invention.

The OGI file server 550 manages the information that the content provider 110 wants to transmit to the terminal UEs 130 and the physical files for retransmission of the information. The OGI file server 550 transmits the information and files over the real radio channel. To accomplish this, the OGI file server 550 includes a database of the original files and a data base converted for retransmission. The OGI file server 550 includes a module for communication with other entities and a processor for processing communication protocol with the BSS-CN 520, the OGI controller 560, and the OGI gateway 570. The internal configuration of the OGI file server 550 is described in the section for describing the second embodiment.

The OGI (Open Group delivery service Interface) Controller 560 is an entity supporting the core function of the present invention. The OGI controller 560 is placed within the wireless broadband communication network to register and manages the information on the UEs 130 to which the information is transmitted. The internal configuration of the OGI controller is depicted in FIG. 6.

Figure 6:
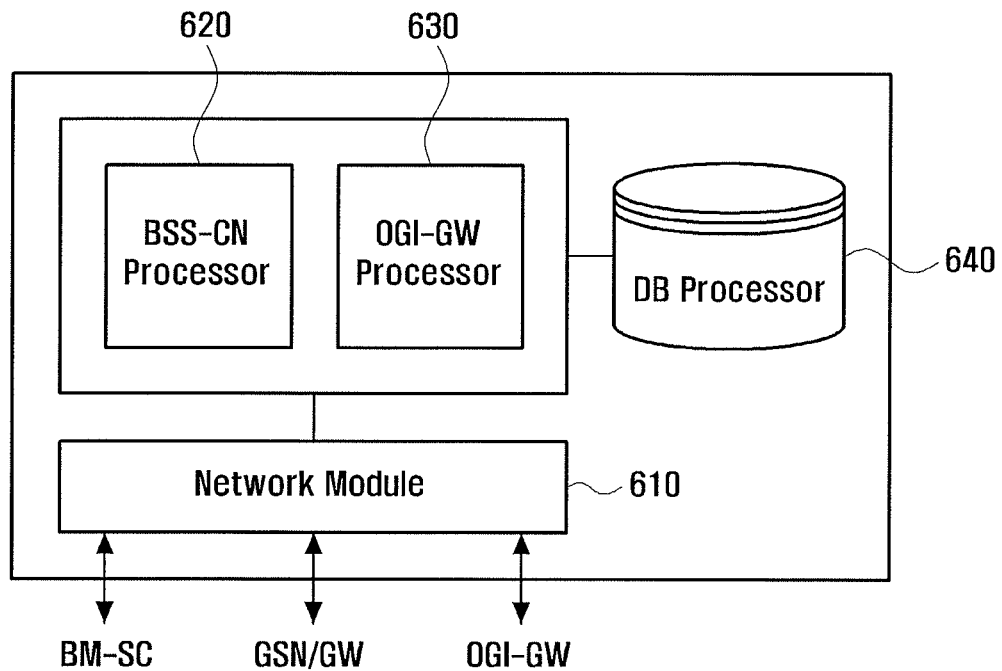
FIG. 6 is a block diagram illustrating an internal configuration of the OGI controller 560.

FIG. 6 is a block diagram illustrating an internal configuration of the OGI controller 560.

As shown in FIG. 6, the OGI controller 560 is provided with a network module 610 for supporting communication with the BM-SC 530, GSN/GW 540, and OGI gateway 570. The OGI controller 560 includes a BSS-CN processor 620 responsible for communication function with the BM-SC 53- and the GSN/GW 540 and an OGI-GW processor 630 responsible for communication function with the OGI gateway 570. The OGI controller 560 also includes a database 640 for processing and managing internal information.

Returning to FIG. 5, the OGI gateway 570 works an access point for the content provider 110 to transmit the information to the target UEs 130 efficiently online in real time using the radio resource as a connection point between the wireless broadband communication network and the content provider 110. The internal configuration of the OGI gateway 570 is depicted in FIG. 7.

Figure 7:
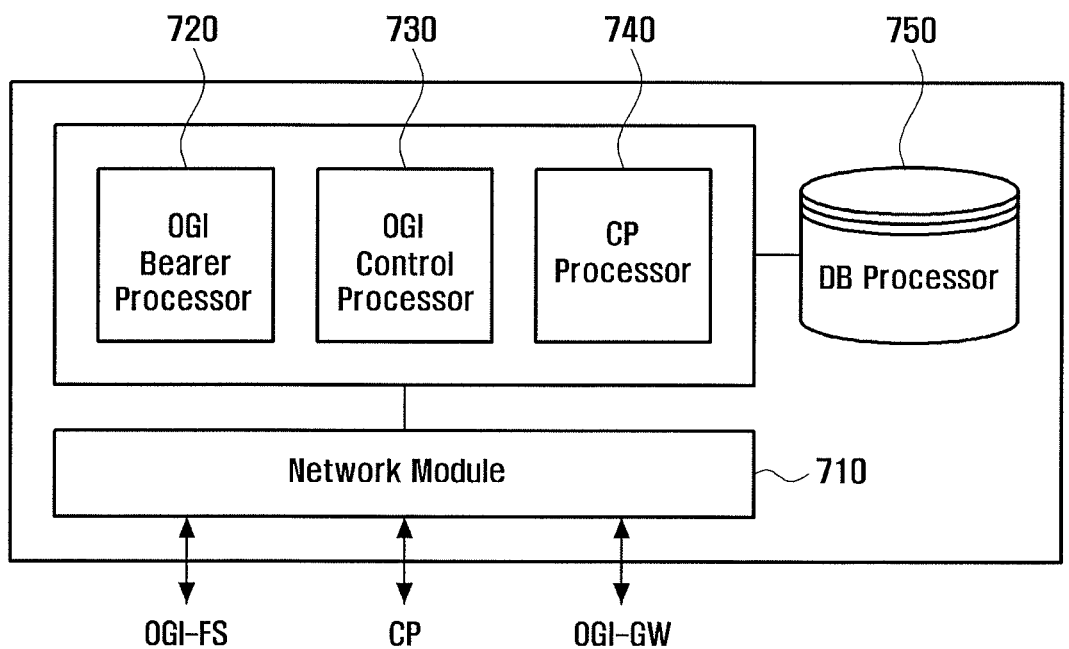
FIG. 7 is a block diagram illustrating an internal configuration of the OGI gateway 570.

FIG. 7 is a block diagram illustrating an internal configuration of the OGI gateway 570.

As shown in FIG. 7, the OGI gateway 570 includes a network module 710 for communication with the OGI file server 550, the OGI gateway 570, and the content provider server 580. The OGI gateway 570 also includes a processor for processing communication protocol with other devices internally. The OGI bearer processor 720 is the processor for performing communication with the OGI file server 550, and the OGI control processor 730 is responsible for communication with the OGI controller 580. The CP processor 740 is the processor for supporting communication with the content provider server 580. The OGI gateway 570 also includes a database 750 for processing internal information.

Returning to FIG. 5, the content provider 110 requesting for information transmission through the wireless broadband communication network includes the content provider server 580 for supporting transmission online in real time. The internal configuration of the content provider server 580 is depicted in FIG. 8.

Figure 8:
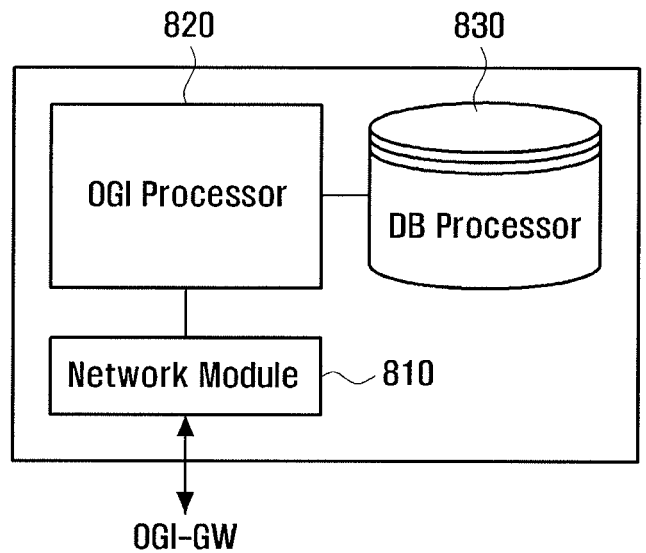
FIG. 8 is a block diagram illustrating an internal configuration of the content provider server 580.

FIG. 8 is a block diagram illustrating an internal configuration of the content provider server 580.

As shown in FIG. 8, the content provider server 580 includes a network module 810 responsible for communication with the OGI gateway 570 and an OGI processor 820 for processing communication protocol with the network module 810. The content provider server 580 also includes a database 830 for processing and managing various types of information.

<First Embodiment>

A description is made of the first embodiment about a method for a content provider 110 intending to provide certain information through wireless broadband communication network to register specific UEs 130 in association with a specific area and receive statistic information on system information and received signal strength information of the UEs 130.

Figure 9:
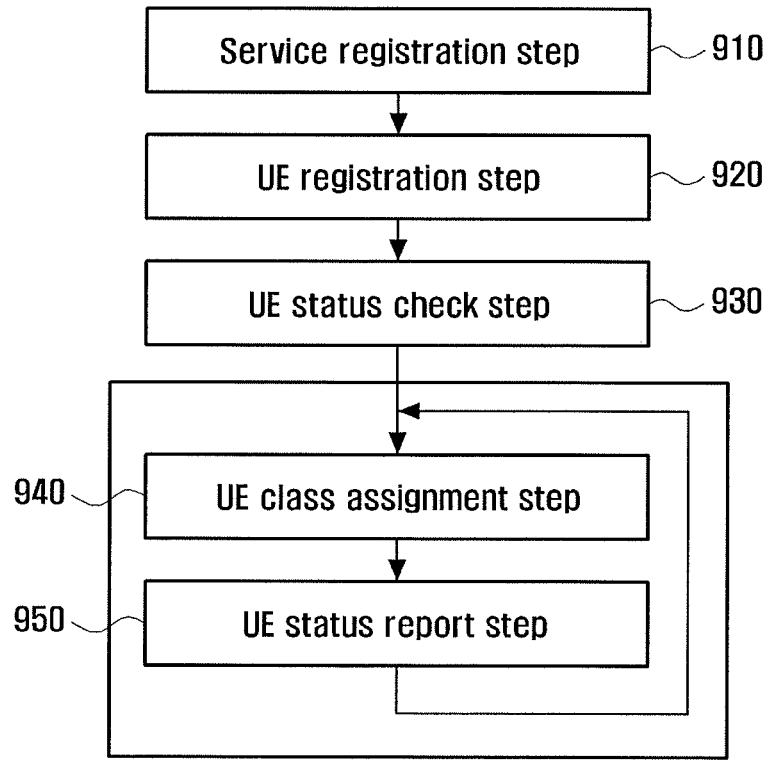
FIG. 9 is a flowchart illustrating a procedure for registering UEs 130 with the wireless broadband communication network to transmit information to the registered UEs through the wireless broadband communication network according to an embodiment of the present invention.

FIG. 9 is a flowchart illustrating a procedure for registering UEs 130 with the wireless broadband communication network to transmit information to the registered UEs through the wireless broadband communication network according to an embodiment of the present invention.

First, the service registration phase 910 is the step at which the content provider 110 registers a multicast group, to which the contents are to be distributed, with the wireless broadband communication network and is assigned the group ID.

Through this procedure, the content provider 110 is allocated the group ID for the application as aforementioned.

The UE registration phase 920 is the step at which the content provider 110 restricts the UEs 130 operating with the corresponding application and registers, only when transmitting the information to the corresponding UEs 130, the UEs with the wireless broadband communication network provider to control and manage efficiently.

The UE status check phase 930 is the step at which the wireless broadband communication network reports whether the UEs 130 operate normally. For this purpose, the UEs 130 reports the received radio signal strength information to the wireless broadband communication network. Through this step, the content provider 110 can switch to the device that is capable of improving the received signal strength, change the location of the UE 130, or correct the system error.

The UE class assignment phase 940 is the step of determining whether the information is transmitted to the target UEs 130 successfully and defines acknowledgement priority to the UE 130 and detailed acknowledgement method for retransmission. Through this step, the content provider 110 can expect reliable transmission through wireless broadband communication network.

Finally, the UE status report phase 950 is the step at which the wireless broadband communication network reports to the content provider whether the UEs 130 operate appropriately before the transmission in spite of no actual information exchange and whether the received signal strength is appropriate enough. Through this step, the wireless broadband communication network provides the content provider 110 with the information about the improvement of the UE 130 and billing legitimacy.

Figure 10:
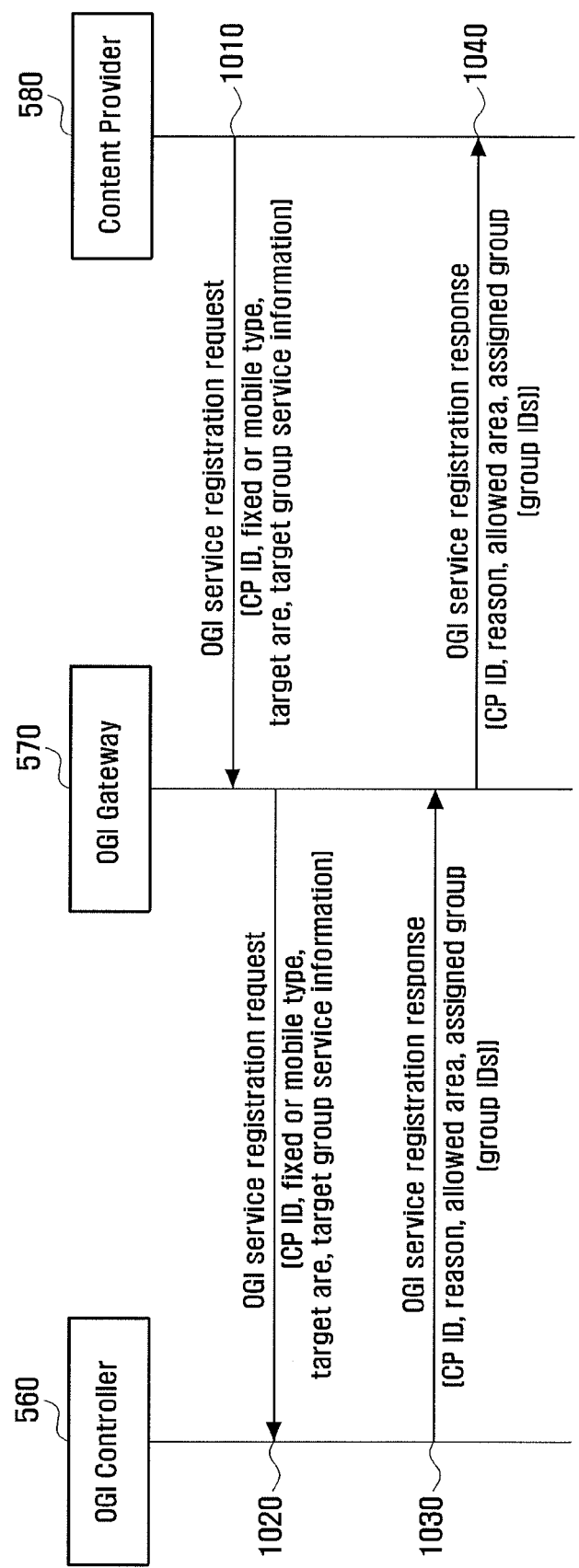
FIG. 10 is a signaling diagram illustrating details of the service registration step 910 of FIG. 9.

FIG. 10 is a signaling diagram illustrating details of the service registration step 910 of FIG. 9.

The content provider server 580 transmits an OGI service registration request message (OGI-ServiceRegistrationRequest) for the fixed or mobile UEs to the OGI gateway 570. This is to request for multicast/broadcast transmission. Upon receipt of this message, the OGI gateway 570 forwards the OGI service registration request (OGI-ServiceRegistrationRequest) message to an appropriate OGI controller 560. If the request is value, the OGI controller 560 issues a Group ID to be used as the identifier for the request afterward. The OGI controller 560 sends an OGI service Registration Response (OGI-ServiceRegistrationResponse) message to the OGI gateway 570 at step 1030, and the OGI gateway 570 forwards this message to the content provider server 580 at step 1040.

Figure 11:
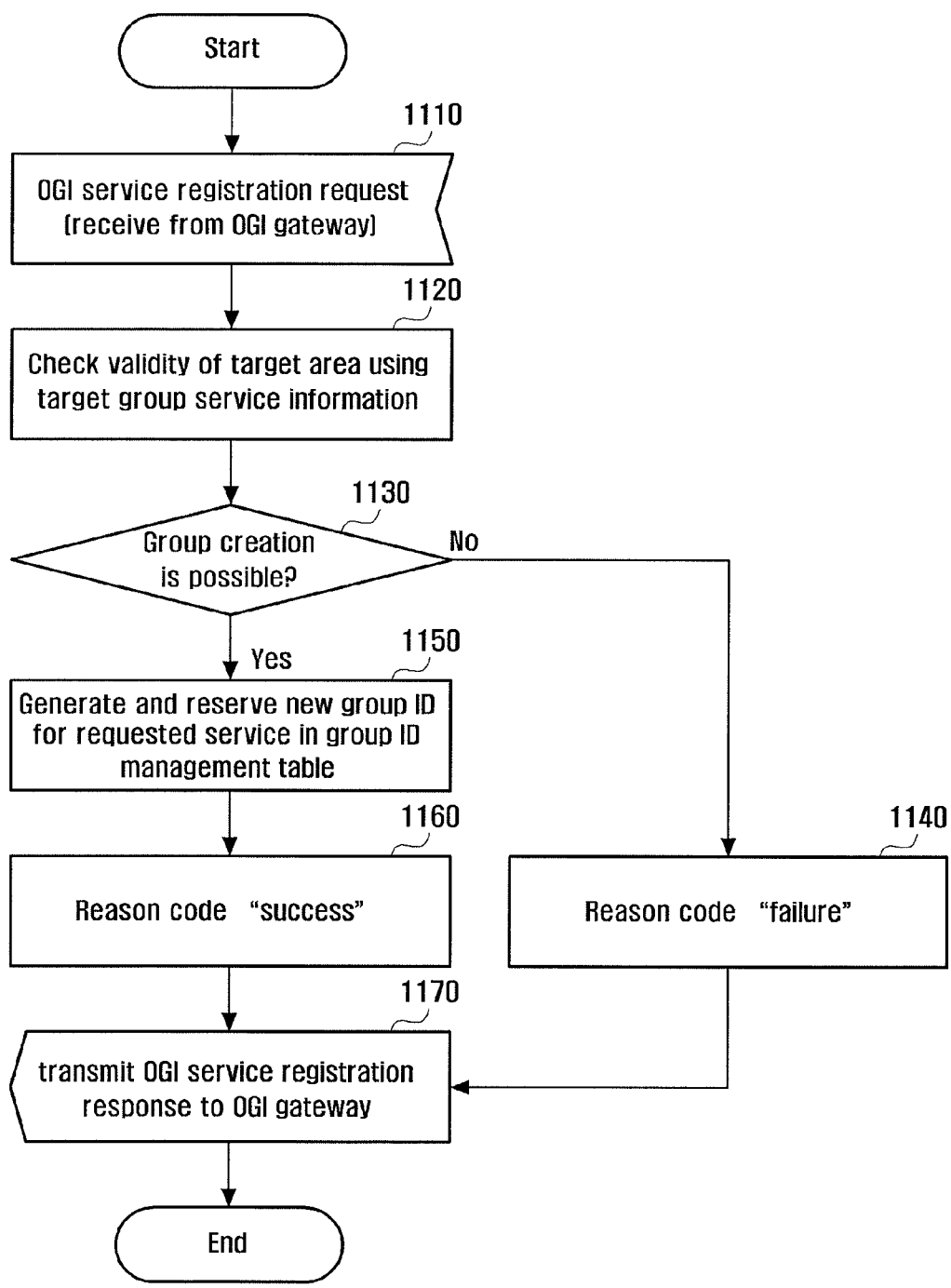
FIG. 11 is a flowchart illustrating a procedure of the OGI controller 560 in FIG. 10.

FIG. 11 is a flowchart illustrating a procedure of the OGI controller 560 in FIG. 10.

First, the OGI controller 560 receives an OGI service registration request (OGI-ServiceRegisterationRequest) message at step 1110. Next, the OGI controller 560 checks the validity of the multicast/broadcast in the requested area at step 1120. If the request is valid at step 1130, the OGI controller 560 generates a group ID for identifying the corresponding application at step 1150.

At the same time, the OGI controller 560 generates a group ID management table as depicted in FIG. 12 at step 1150. The group ID management table may include content provider identifier (CP-ID) for identifying the content provider to which the group ID is issued, a type indicator for indicating whether the UE of the group is a fixed UE or a mobile UE, and a region indicator for indicating the region where the corresponding multicast/broadcast is allowed physically.

The OGI controller 560 sets a reason code to "success" at step 1160 and sends the OGI service registration response (OGI-ServiceRegistrationResponse) message including the group ID to the content provider 580 via the OGI gateway 570.

Meanwhile, if the region is not appropriate for the multicast/broadcast at step 1130, the OGI controller 560 sets the reason code to "failure" at step 1140 and sends the OGI service registration response (OGI-ServiceRegistrationResponse) message to the content provider server 580.

Figure 13:
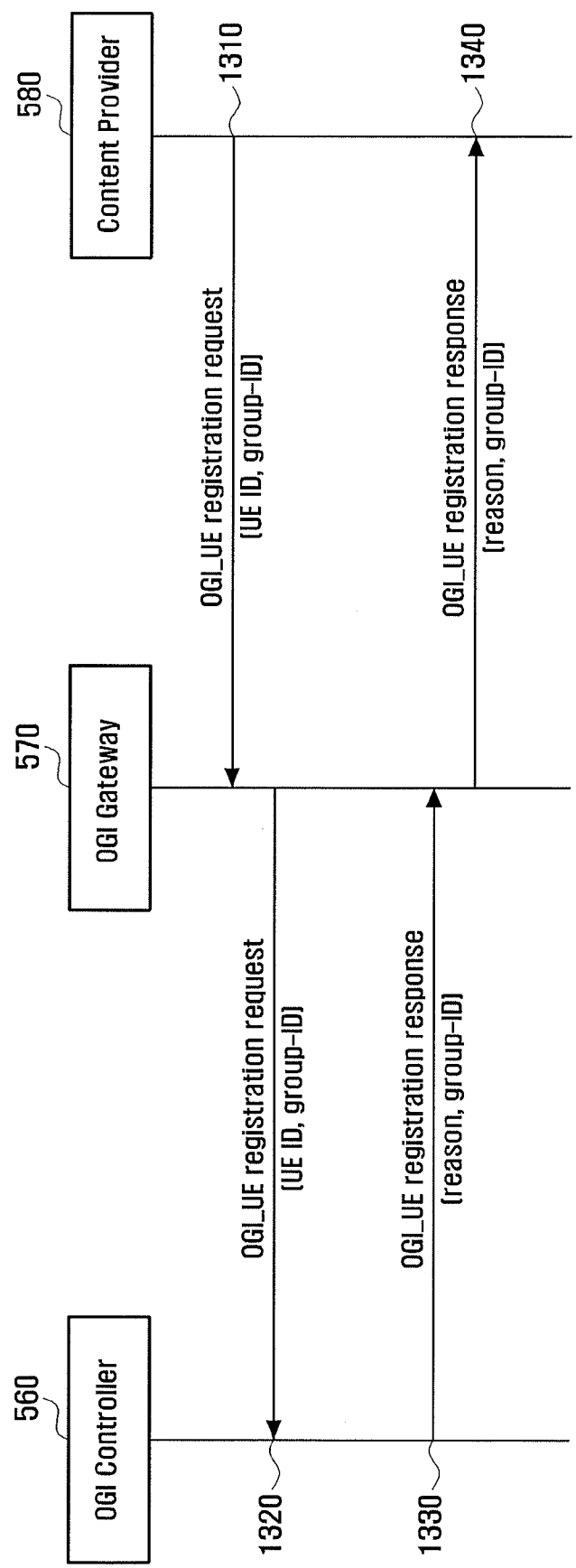
FIG. 13 is a signaling diagram illustrating details of the UE registration step 920 of FIG. 9.

FIG. 13 is a signaling diagram illustrating details of the UE registration step 920 of FIG. 9. The UE registration step is the procedure for linking the UEs 130 as targets of a specific multicast/broadcast to the issued group ID in response to the request of the content provider 110.

As shown in FIG. 13, the content provider 130 sends to the OGI gateway 570 an OGI-UE registration request (OGI-UERegistrationRequest) message for linking the information on the UEs 130 to a specific group through the content provider server 580 at step 1310. This message is forwarded to the OGI controller 560. Upon receipt of this message, the OGI controller 560 stores the information on the UEs of the corresponding group and sends the OGI gateway 570 an OGI-UE registration response (OGI-UERegistrationResponse) message including the information on whether the registration is successful or not at step 1330. The OGI gateway 570 forwards this message to the content provider server (content provider) 580 at step 1340.

Figure 14:
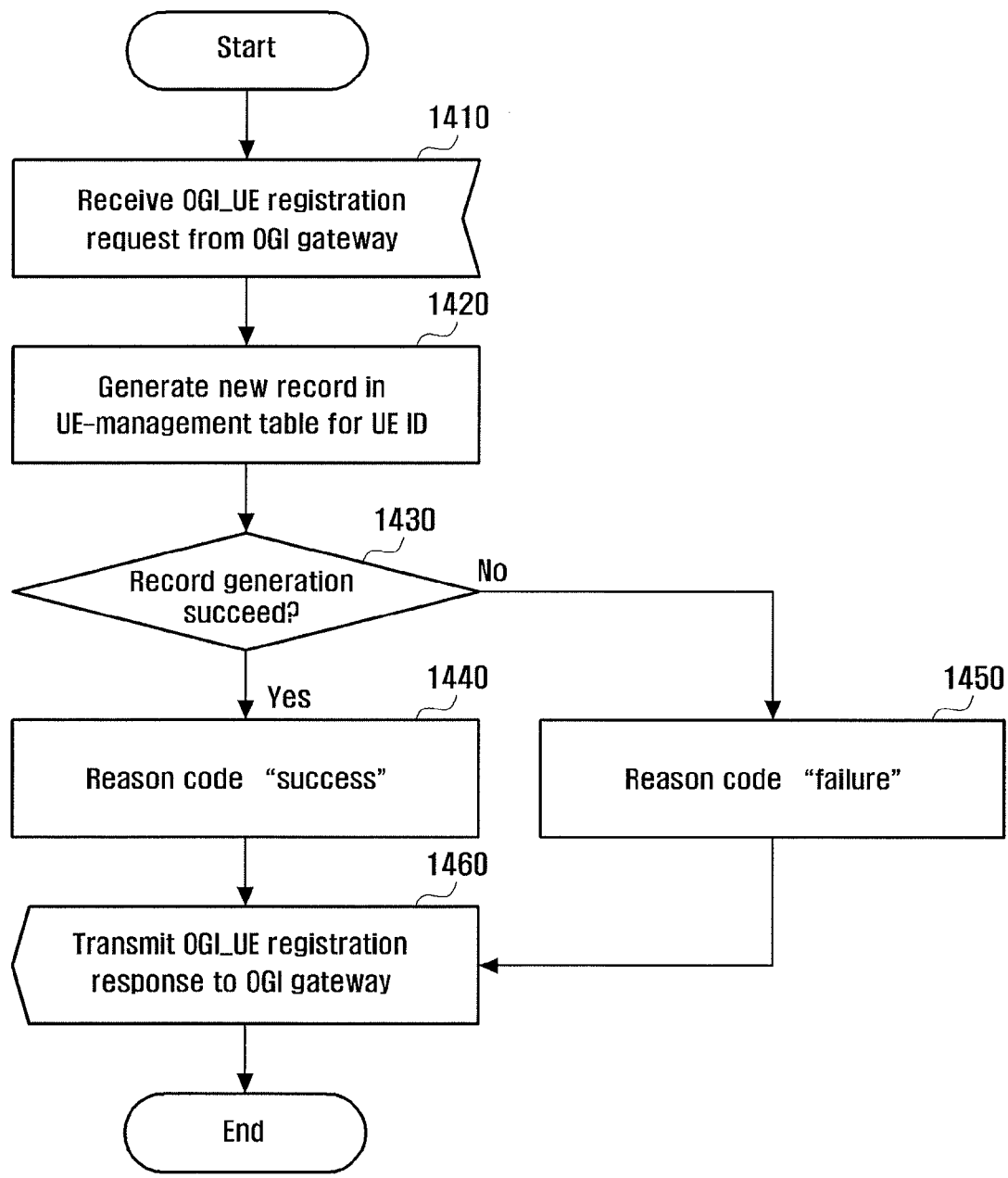
FIG. 14 is a flowchart illustrating a procedure of the OGI controller 560 in FIG. 13.

FIG. 14 is a flowchart illustrating a procedure of the OGI controller 560 in FIG. 13.

The OGI controller 560 receives an OGI-UE registration request (OGI-UERegistrationRequest) message from the OGI gateway 570 at step 1419. The OGI controller 560 saves the UE-IDs carried by the corresponding group ID in the UE management table. An exemplary UE management table is depicted in FIG. 15.

As shown in FIG. 15, the UE management table is formed with the UE IDs matched with the group ID generated at step 1150. In this case, the UE ID is an International Machine Equipment Identifier or an identifier unique in the wireless broadband communication network.

Returning to FIG. 14, the OGI controller 560 sets the reason code according to the UE management table processing result. That is, if the processing result is successful, the OGI controller 560 sets the reason code to "success" at step 1440. Next, the OGI controller 560 sends the content provider server 580 the OGI-UERegistrationResponse) message including the result at step 1460.

Otherwise, if the processing result is failure, the OGI controller 560 sets the reason code to "failure" at step 1450. Next, the OGI controller sends the content provider server 580 the OGI-UE registration response (OGI-UERegistrationResponse) message including the result at step 1460.

Figure 16:
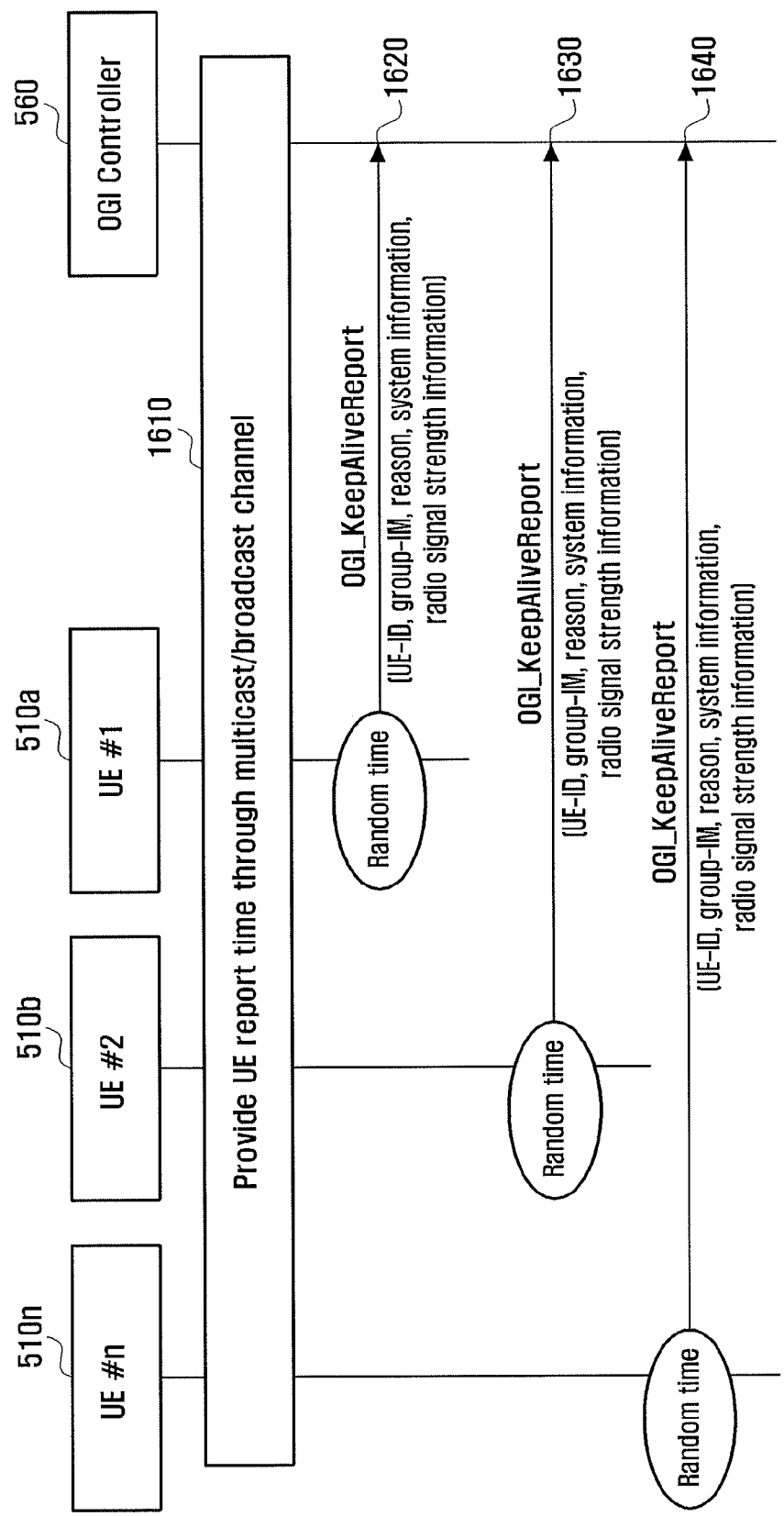
FIG. 16 is a signaling diagram illustrating details of the UE status checking step 930 of FIG. 9.

FIG. 16 is a signaling diagram illustrating details of the UE status checking step 930 of FIG. 9.

The UEs 130 connected to the content provider 110 installed in the wireless broadband communication network reports system information and received radio signal strength information to the OGI controller 560 through the wireless broadband communication network periodically or non-periodically.

In order to accomplish this, the OGI controller 560 notifies a specific group of UEs of the time and radio channel for the information port through multicast/broadcast channel by means of a multicast/broadcast control entity such as BM-SC. In this case, since the uplink channel of the wireless broadband communication network is the restricted resource, the OGI controller 560 schedules such that the corresponding report is performed when the radio channel traffic is low, e.g. at night.

The UEs 510a, 510b, . . . , 510n are aware of the system status and received radio signal strength information report timings for the group to which they belong. Accordingly, the UEs 510a, 510b, . . . , 510n are activated at the predetermined time point to report their system information and received radio signal strength information to the OGI controller 560.

Figure 17:
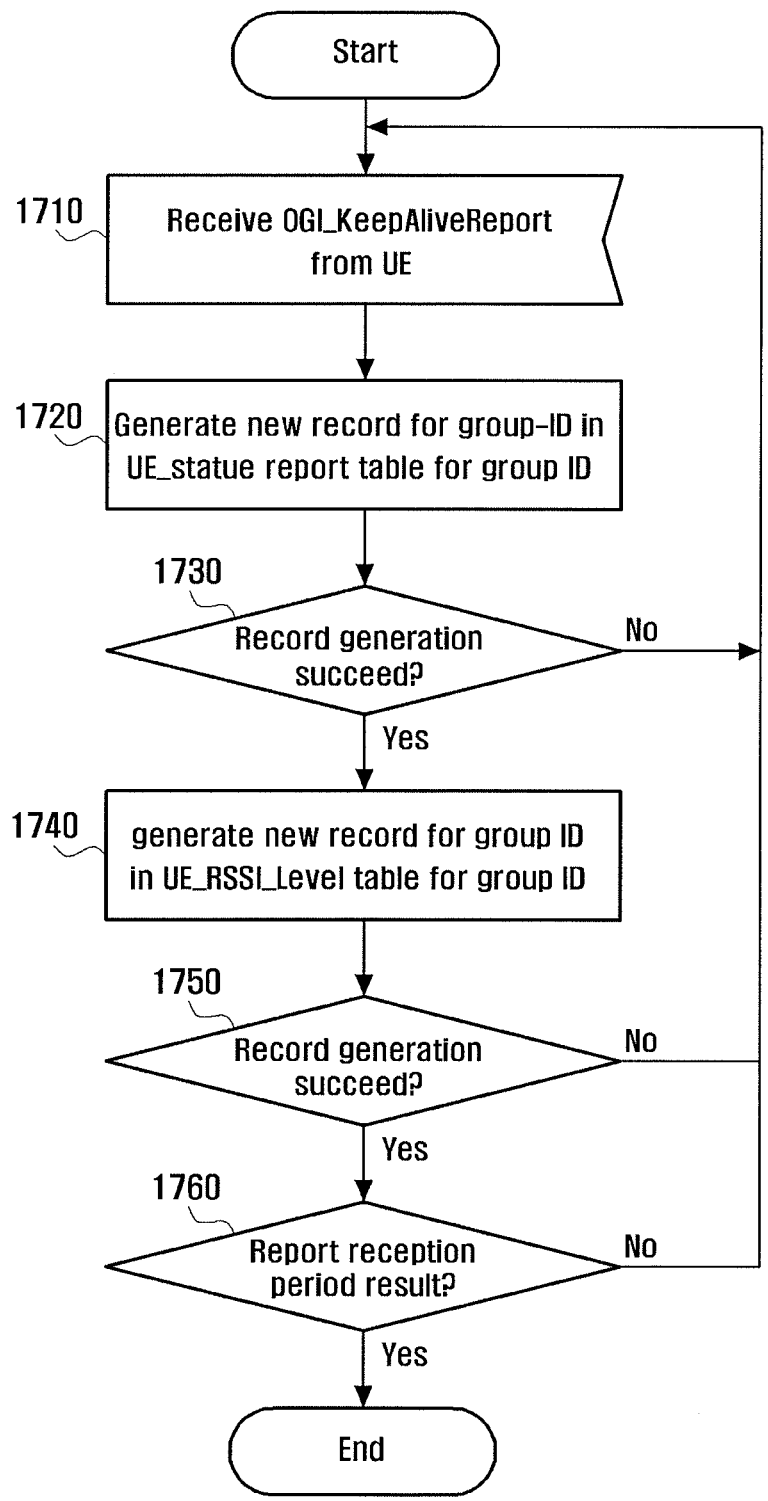
FIG. 17 is a flowchart illustrating a procedure for the OGI controller 560 to collect system information and received radio signal strength information from the UEs.

FIG. 17 shows an exemplary above-described procedure in which the UE 1 510a reports its system information and received radio signal strength information using the OGI keep-alive report (OGI-KeepAliveReport) message to the OGI controller 560 at step 1620, the UE 2 510b at step 1630, and the UE n 510n at step 1640.

FIG. 17 is a flowchart illustrating a procedure for the OGI controller 560 to collect system information and received radio signal strength information from the UEs.

First, the OGI controller 560 receives an OGI keep-alive report (OGI_KeepAliveReport) message from the UEs 130. The OGI controller 560 generates a UE status report table (UE-StatusReport Table) at step 1720 to process and manage the status information of the UEs belonged to a group. The OGI controller 560 saves the reports related to the system information received in for a report period of a specific group scheduled previously. Next, the OGI controller 560 determines whether the status report table has been created completely with informations from all the UEs 130 at step 1730 and, if the status report table creation has not completed, the procedure goes to step 1710 to continue writing the status report table.

If the status report table creation has completed, the OGI controller 560 generates a UE-received radio signal strength table (UE_RSSI_Level Table) at step 1740. Here, the UE status report table is the database for storing the device status information of the UEs 130, and the UE_RSSI_Level Table is the database for storing the received radio signal strengths of the UEs 130.

The OGI controller 560 saves the received radio signal strengths received for the report duration of the group scheduled previously in the UE_RSSI_Level Table. Next, the OGI controller 560 determines whether the UE_RSSI_Level Table has been written completely for all of the UEs 130 at step 1750 and, if so, determines whether the period for receiving the reports from the UEs has expired at step 1760. If the period has not expired, the OGI controller 560 repeats steps 1710 and thereafter. Otherwise, if the period has expired, the OGI controller 560 completes generating the UE status report table and received radio signal strength table.

FIG. 18 is a diagram illustrating a structure of the UE status report table described with reference to FIG. 17.

The OGI controller 560 saves the system informations received from the UEs 130 in the form of the table as depicted in FIG. 18. As shown in FIG. 18, the UE status report table includes the information on the device IDs and system informations of the UEs 130 reported in the specific group.

FIG. 19 is a diagram illustrating a structure of the UE-received radio signal strength table described with reference to FIG. 17.

The OGI controller 560 saves the received radio signal strength informations received from the UEs in the form of the table as depicted in FIG. 19. As shown in FIG. 19, the received radio signal strength table includes the device IDs of the UEs 130 that have reported and the received radio signal strength informations of the UEs 130 in the wireless broadband communication network.

Figure 20:
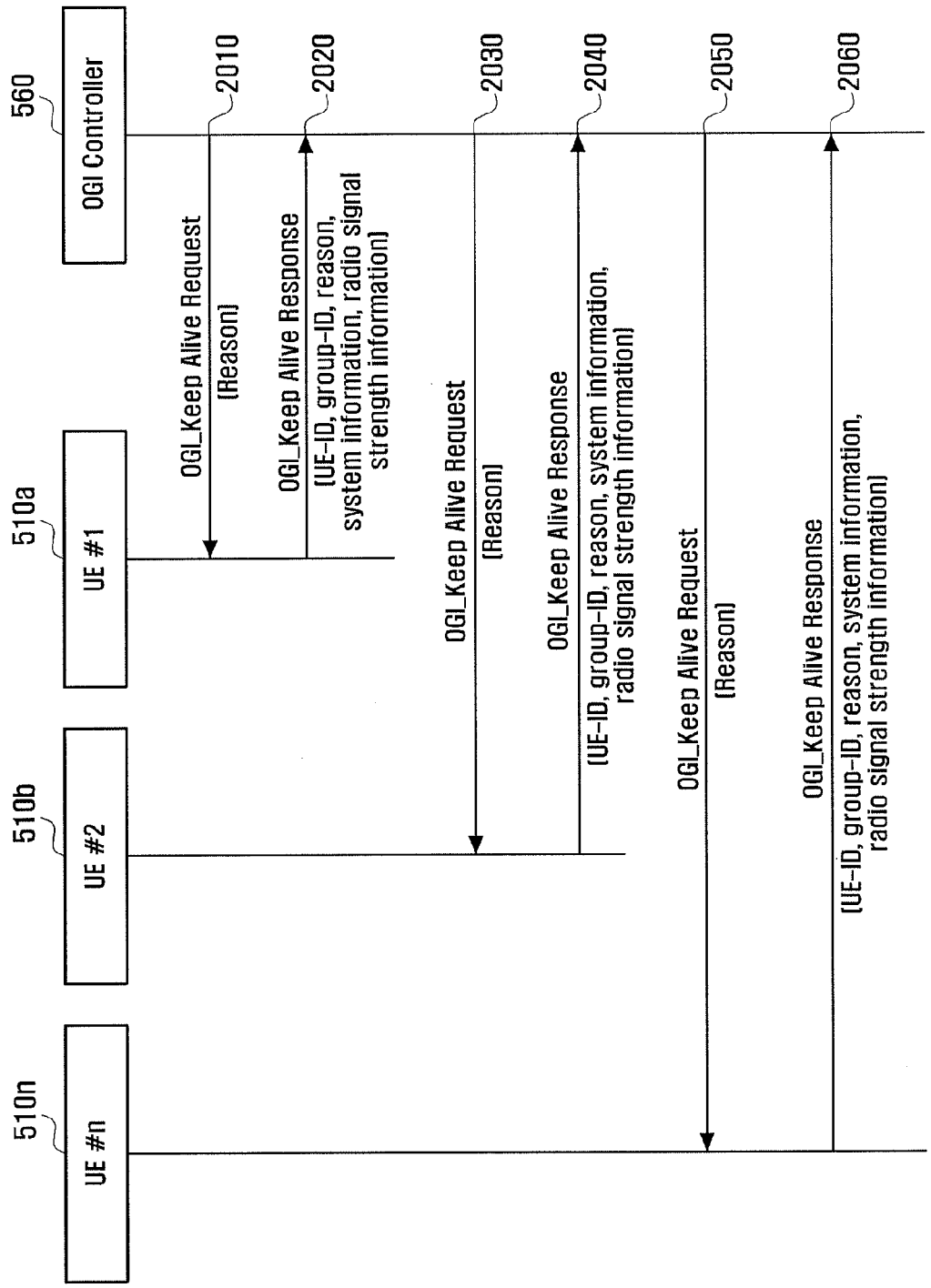
FIG. 20 is a signaling diagram illustrating a status report procedure through forced unicast message transmission.

FIG. 20 is a signaling diagram illustrating a status report procedure through forced unicast message transmission.

It may occur that the UE fails reporting at a time scheduled based on the scheduling information received through the multicast/broadcast channel. In this case, an embodiment of the present invention proposes status report through forced unicast message transmission of the OGI controller 560 according to the procedure depicted in FIG. 20. That is, the OGI controller 560 sends the OGI-KeepAliveRequest message to a specific UE, and the UE which has received this message sends the OGI-KeepAliveResponse message including the system information and received radio signal strength information to the OGI controller 560 as described with reference to FIG. 16.

Referring to FIG. 20, on the basis of this, the OGI controller 560 sends the OGI-KeepAliveRequest message to the UEs 1 510a, UE 2 520b, and UE n 520n at steps 2010, 2030, and 2050, respectively. The OGI-KeepAliveRequest message includes the system information and received radio signal strength information of the UE.

Upon receipt of the OGI-KeepAliveRequest message, the UE 1 510a, UE 2 520b, and UE n 520n sends the OGI-KeepAliveResponse message including the UE's system information and received radio signal strength information to the OGI controller 560 at steps 2020, 2040, and 2060, respectively.

Figure 21:
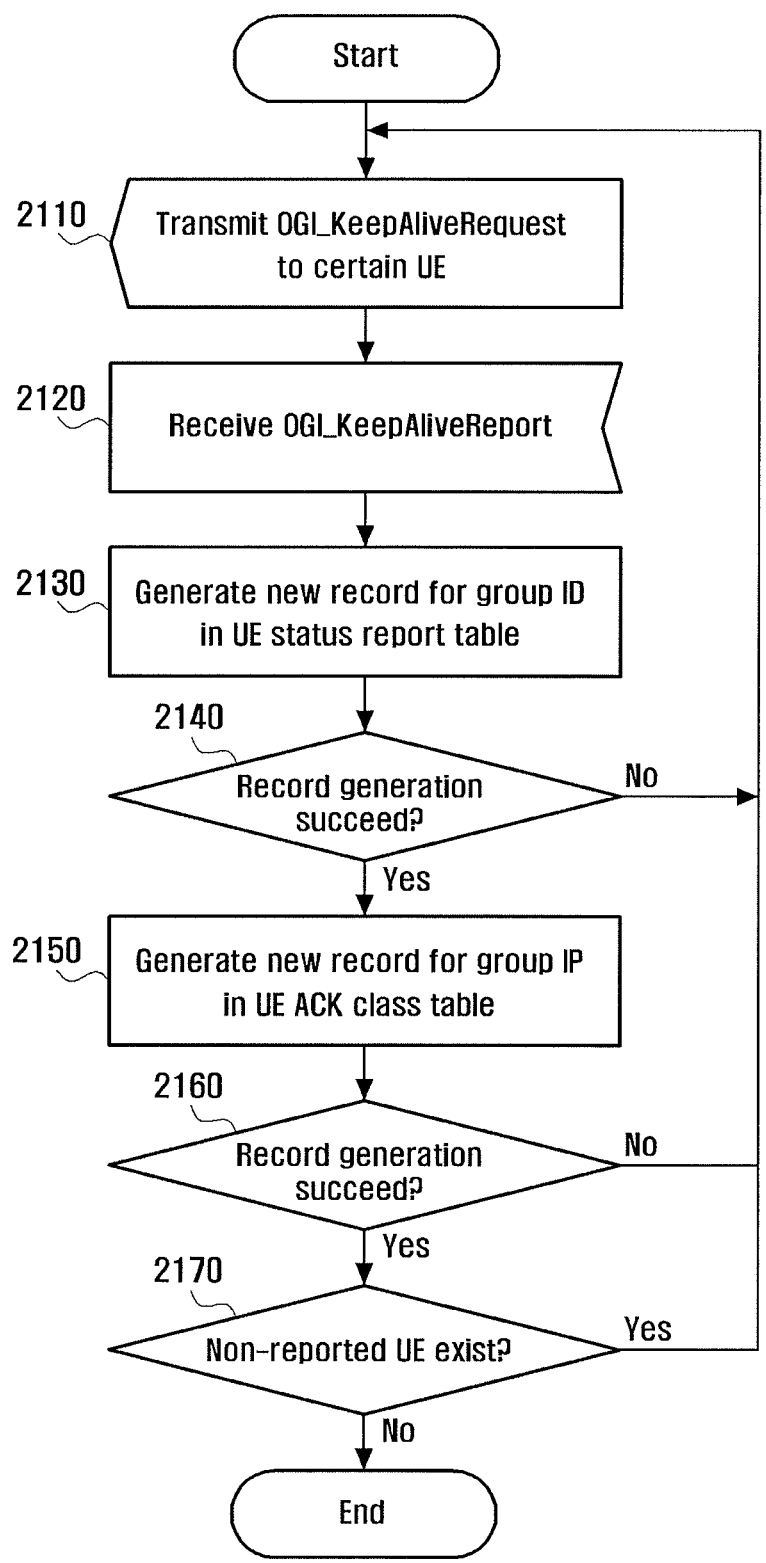
FIG. 21 is a flowchart illustrating a procedure of the OGI controller 560 with unicast report of a specific UE.

FIG. 21 is a flowchart illustrating a procedure of the OGI controller 560 with unicast report of a specific UE.

The operation based on the unicast report of a specific UE is similar to the procedure of the OGI controller 560 in FIG. 17. However, the procedure differs from the procedure of the OGI controller 560 which has been described with reference to FIG. 17 in that step 2110 of transmitting an OGI keep alive request (OGI-KeepAliveRequest) message to the UE is further included.

Steps 2120 to 2160 are identical with the procedure of FIG. 17. The OGI controller 560 determines whether there is any UE remain from which unicast report is expected, at step 3170. If any UE to perform unicast report is remained, the OGI controller 560 returns the procedure to step 2110 to repeat the subsequent steps.

Figure 22:
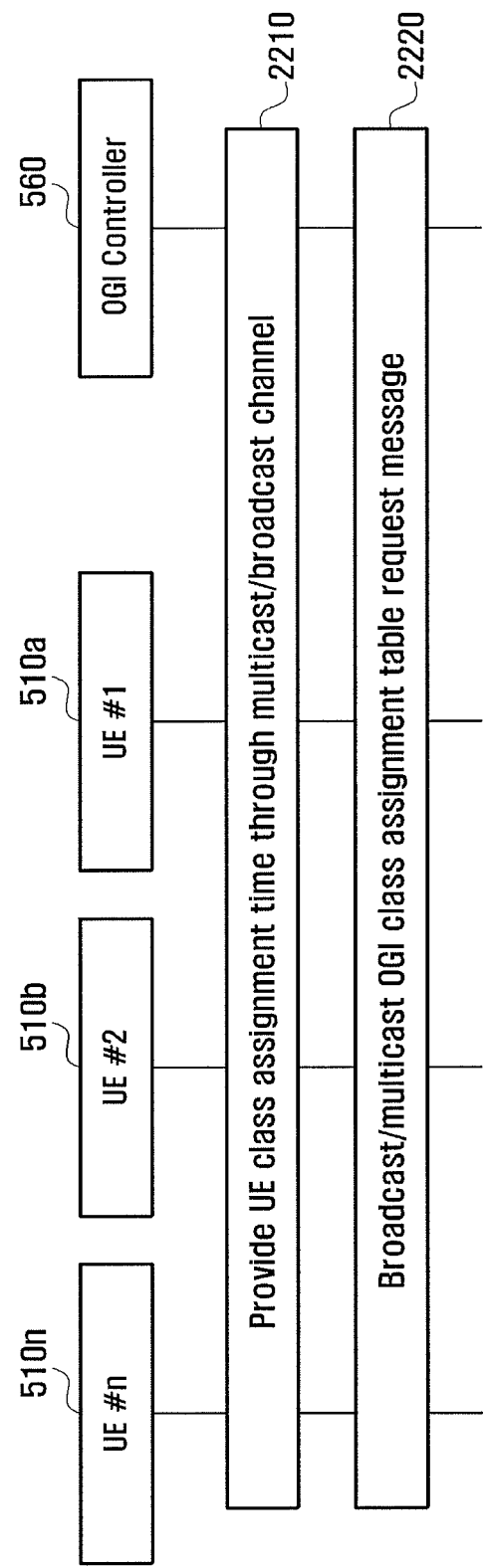
FIG. 22 is a signaling diagram illustrating details of UE class assignment step 940 of FIG. 9.

FIG. 22 is a signaling diagram illustrating details of UE class assignment step 940 of FIG. 9.

FIG. 22 shows a procedure in which the OGI controller 560 calculates classes for determining the priority order to report for retransmission based on the information reported from the UEs and sends the UEs the corresponding class allocation information.

The OGI controller 560 sends the UEs the priority order table per UE which is generated based on the reported information. To accomplish this, the OGI controller 560 configure the time for communication with the UEs in advance at step 2210. The OGI controller 560 sends the corresponding information through the multicast/broadcast channel at the corresponding time at step 2220. The corresponding class assignment information transmission time is similar to the per-group report time predefined between the UE and OGI controller 560 in advance. Through this, the UEs are aware of the timings and radio channels with which the classes assigned and acquire their class assignment information at the corresponding timings through the corresponding channels.

Figure 23:
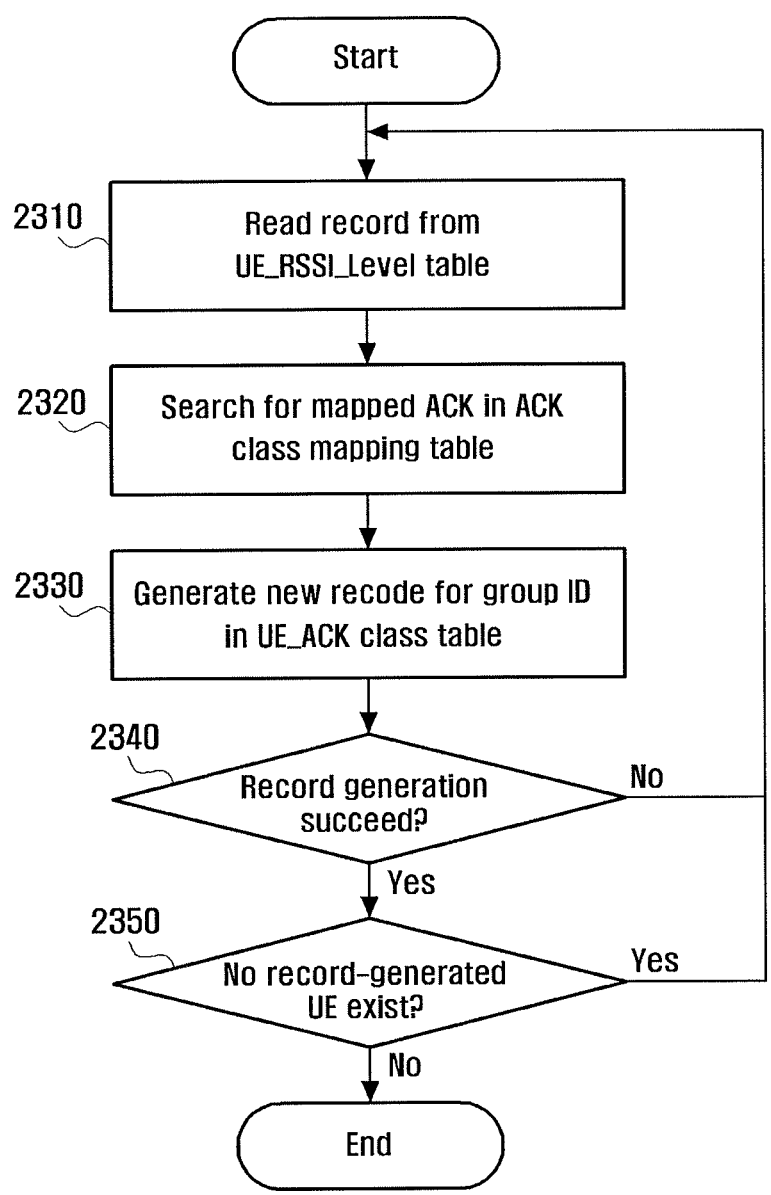
FIG. 23 is a flowchart illustrating a UE class assignment procedure of the OGI controller 560.

FIG. 23 is a flowchart illustrating a UE class assignment procedure of the OGI controller 560.

The OGI controller 560 calculates an ACK class based on the per-UE received radio signal strength information generated by receiving reports from the UEs. In this case, the OGI controller 560 may use the mapping table of the received radio signal strength information and the class level as depicted in FIG. 25. The mapping table depicted in FIG. 25 is an exemplary one, and the mapping values customized according to the installed network may be used. For example, assuming that the radio signal strength measured at a specific UE is level 1, the UE is classified into class 1. Also, assuming that the radio signal strength measured at a specific UE is level 5, the UE is classified into class 2.

The classes of UEs that are calculated by referencing the mapping table depicted in FIG. 25 is generated and managed in the form of the UE-ACK class table as depicted in FIG. 24. The UE-ACK class table depicted in FIG. 24 is also an exemplary one and may be configured differently in various embodiments.

As shown in FIG. 24, the UE-ACK class table saves the UE IDs for identifying the UEs and the class levels assigned currently as mapped each other. Also, each UE ID may include the group ID as an indicator of a multicast/broadcast group to which the UE belongs.

Figure 26:
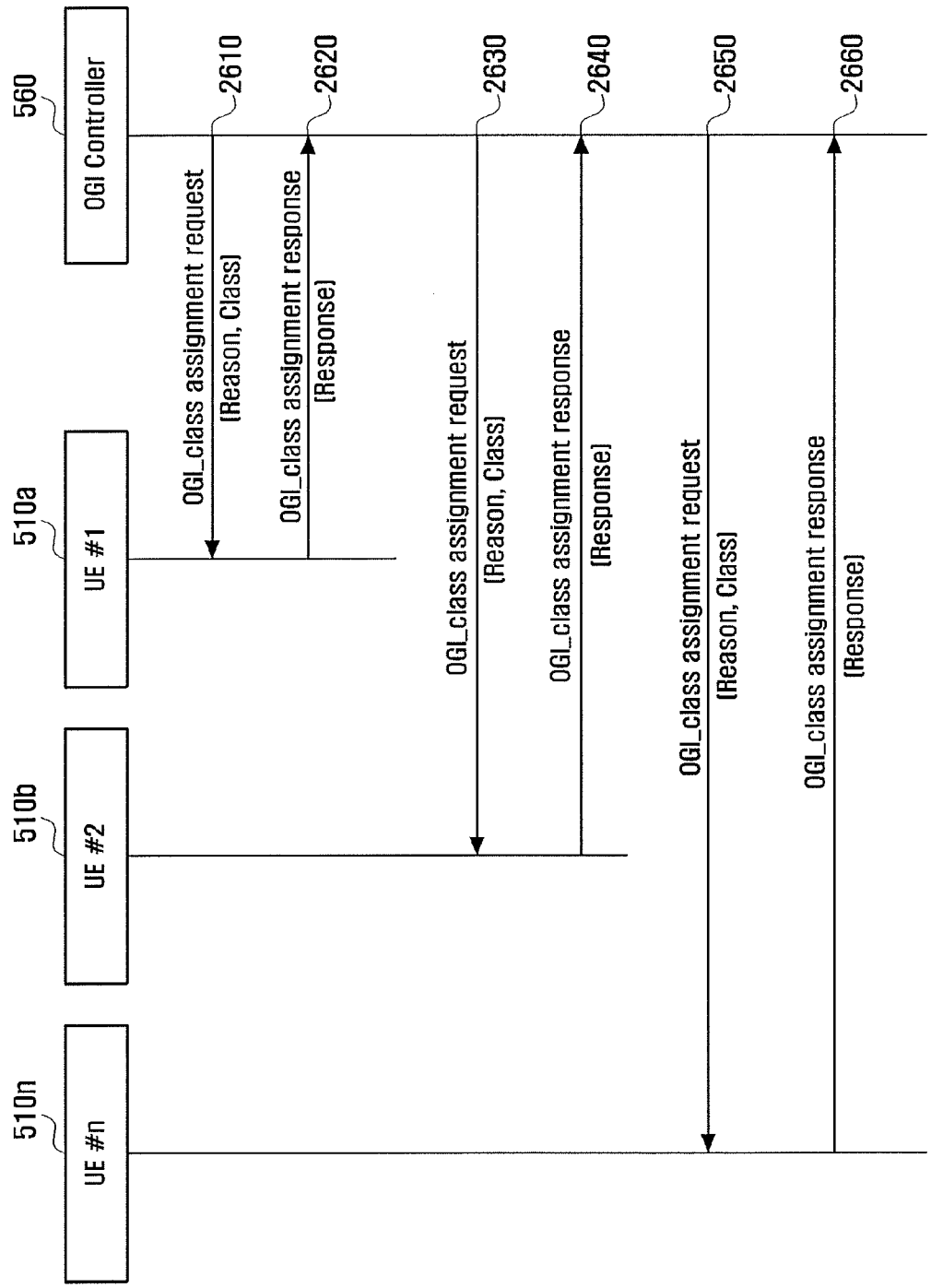
FIG. 26 is a signaling diagram illustrating a UE class assignment procedure based on unicast transmission.

FIG. 26 is a signaling diagram illustrating a UE class assignment procedure based on unicast transmission.

In case that a specific UE is assigned a class through a multicast/broadcast channel, the OGI controller 560 sends a class assignment message to the UE through unicast connection.

That is, the OGI controller 560 transmits the class assignment messages for assigning classes to the respective UEs at step 2610, 2630, and 2650, respectively. The UE 1 510a, UE 2 510b, and UE n 510n send a class assignment message to the OGI controller 560 to acknowledge the assignment of the class at steps 2620, 2640, and 2660, respectively.

The OGI controller 560 performs the above-described procedure to acquire the system information and received radio signal strength information of the UEs 130. Here, the system information is the information to be used for updating or improving the UE 130. The received radio signal strength information may be used as the information for improving the radio communication quality by fixing and improving the UE 130 or adjusting the location of the UE 130.

Figure 27:
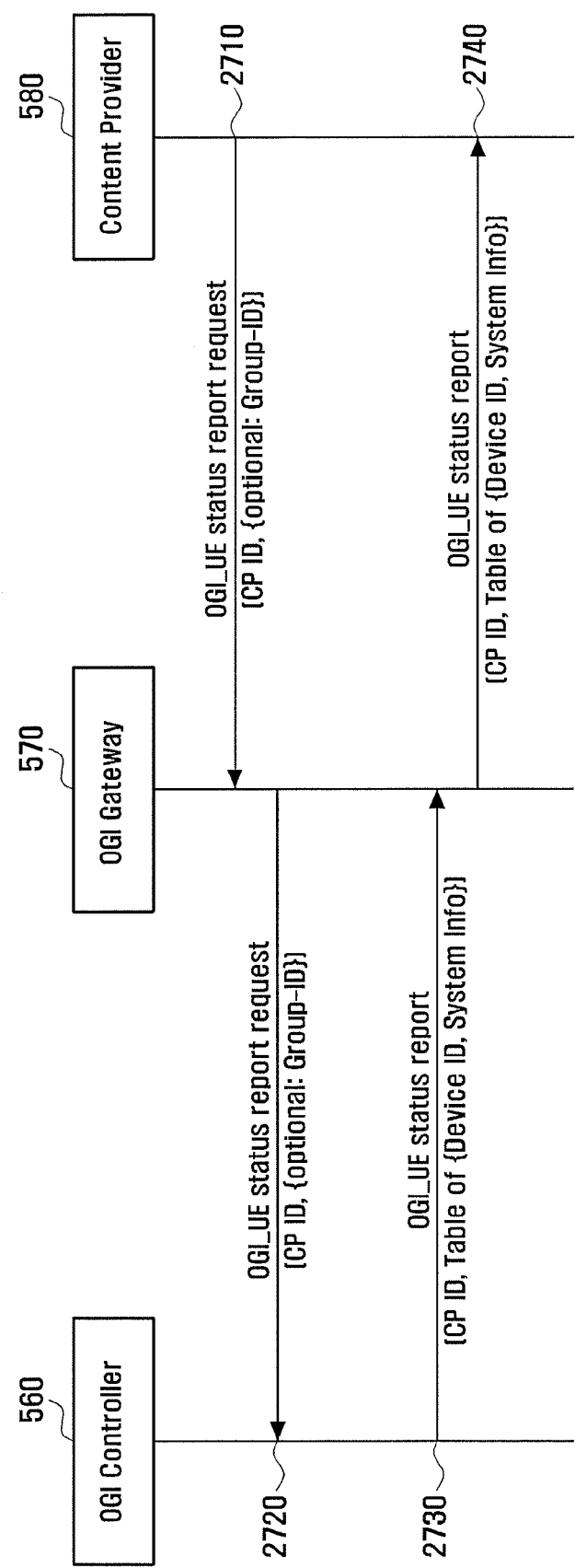
FIG. 27 is a signaling diagram illustrating an information report procedure of the UE.

FIG. 27 is a signaling diagram illustrating an information report procedure of the UE.

The content provider server (content provider) 580 requests the OGI controller 560 for statistic information by sending an OGI-UE status report request (OGI-UEStatusReportRequest) message at step 2710 of FIG. 27. The OGI-UE status report request (OGI-UEStatusReportRequest) message is delivered to the OGI controller 560 via the OGI gateway 570.

Upon receipt of this message, the OGI controller 560 sends the content provider server 580 an OGI-UE statue report (OGI-UEStatusReport) message including the statistic information on the UEs 130 belong to the content provider or a specific multicast/broadcast group of the content provider at step 2730. The response message may be formed in the similar format to the aforementioned other messages or in a format of XML (eXtensible Markup Language) or email.

Figures 28, 29:
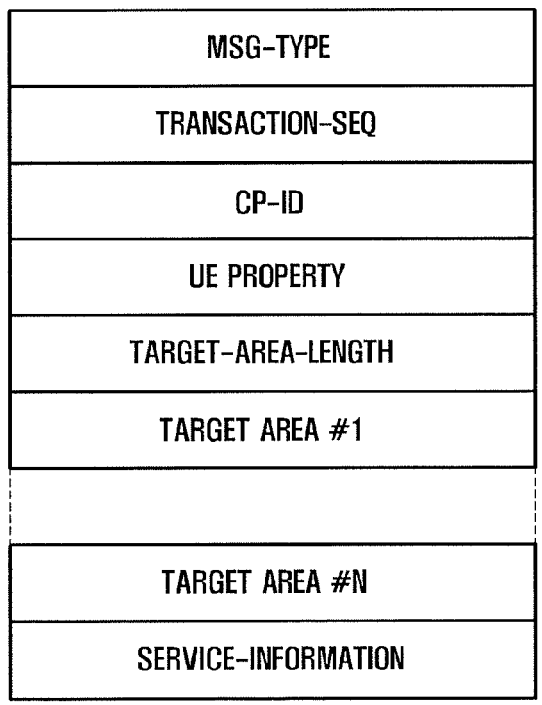
FIG. 28 is a diagram illustrating a structure of the UE information report table.
FIGS. 29 to 37 are diagrams illustrating structures of the messages used in the first embodiment of the present invention.

The information transmitted from the OGI controller 560 to the content provider server 580 is formatted as depicted in FIG. 28. The information is stored in the form of the UE information report table as depicted in FIG. 28. In this case, the UE information report table may include the system information, received radio signal strength information, and group information on the group to which the UE belongs, per UE.

The messages used in the above described message transmission/reception procedures are depicted in FIGS. 29 to 37. In this case, as the common header information of the entire messages, message type (MSG-TYPE) is a control code indicating the type of the corresponding message, a transaction sequence (TRANSACTION-SEQ) is a code used for detecting redundancy or error at the sender. Typically, a specific message is transmitted with the sequence which starts from 0 and increasing by 1.

FIG. 29 is a diagram illustrating a format of the OGI service registration request (OGI-ServiceRegistrationRequest) message.

As shown in FIG. 29, the OGI service registration request (OGI-ServiceRegistrationRequest) message includes a CP-ID for identifying the content provider 110 and a device characteristic (DEVICE-CHARACTERISTIC) field indicating whether the target UE is a fixed UE or a mobile UE. The information on the physical location information for supporting multicast/broadcast is stored in the target region (TARGET-REGION) field as a variable field, and a number of corresponding region fields is determined by the target region length (TARGET-REGION-LENGTH) field. Finally, addition information necessary for to OGI system to know for providing the service is added in the service information (SERVICE-INFORMATION) FIELD.

Figure 30:
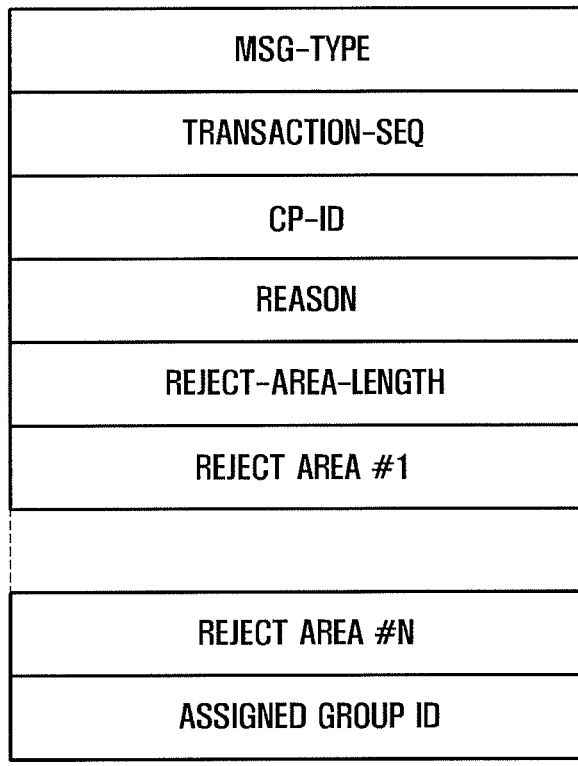

FIG. 30 is a diagram illustrating a format of the OGI service registration response (OGI-ServiceRegistrationResponse) message.

The OGI service registration response (OGI-ServiceRegistrationResponse) message incudes a CP-IP for identifying the content provider 110, a rejected region (REJECTED-REGION) field having a variable length and carrying the information on the region at which the multicast/broadcast service is rejected, and a rejected region length (REJECTED-REGION-LENGTH) field containing a number of the rejected region regions. Finally, the message includes the group ID issued by the OGI system for providing service.

Figure 31:
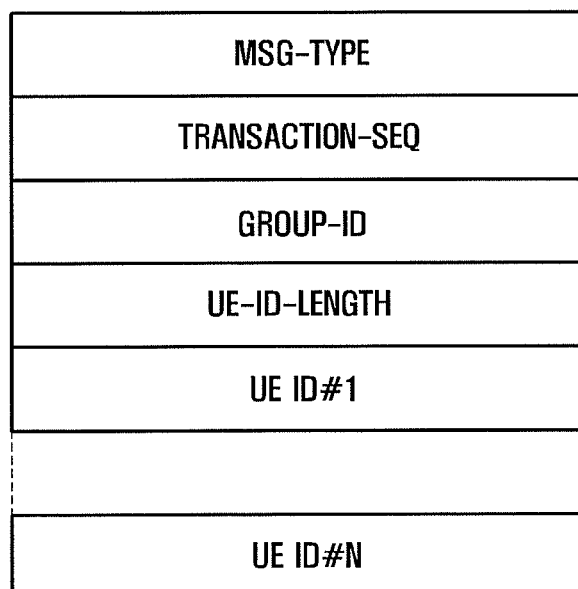

FIG. 31 is a diagram illustrating a format of the OGI-UE registration request (OGI-UERegistrationRequest) message.

The OGI-UE registrations request (OGI-UERegistrationRequest) message includes a group ID as the identifier of the group to which the UEs 130 belong and a UE length (DEVICE-LENGTH) field indicating a number of UEs to be included in the corresponding group. The corresponding number of UE IDs fill the remained space.

Figure 32:
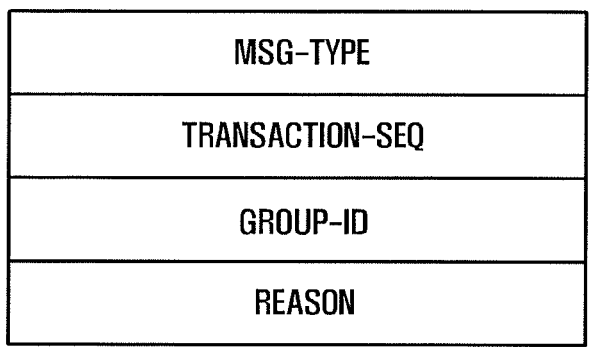

FIG. 32 is a diagram illustrating a format of the OGI-UE registration response (OBI-UERegistrationResponse) message.

The OGI-UE registration response (OBI-UERegistrationResponse) message includes the group ID for identifying the group to which the UEs 130 belong and a reason field for indicating the reason of the addition execution result.

Figure 33:
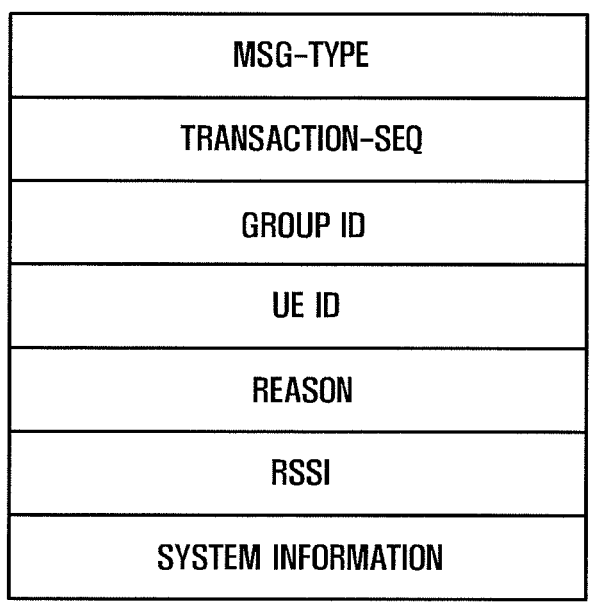

FIG. 33 is a diagram illustrating a format of the OGI keep alive report (OGI-KeepAliveReport) message.

The OGI keep-alive report message includes the group ID for indicating the group related to the information reported, the UE ID, system information, and RSSI. This message also includes a reason field carrying the information on success or failure.

Figure 34:
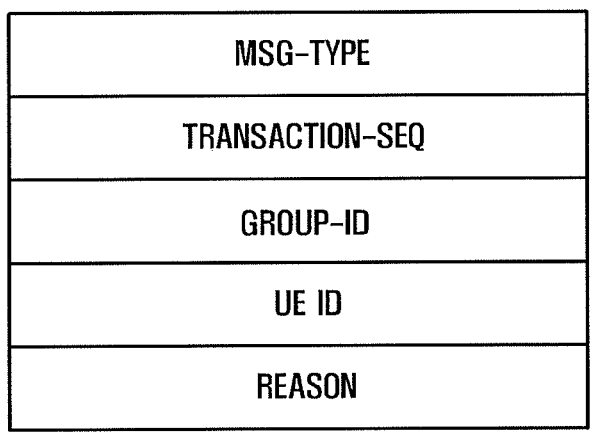

FIG. 34 is a diagram illustrating a format of the OGI keep-alive request (OGI-KeepAliveRequest) message.

When requesting a specific UE 130 to report, the OGI keep alive request (OGI-KeepAliveRequest) message includes a group ID for indicating the corresponding group, a UE ID as the identifier of the UE, an assigned class, and a reason field for carrying addition information.

Figure 35:
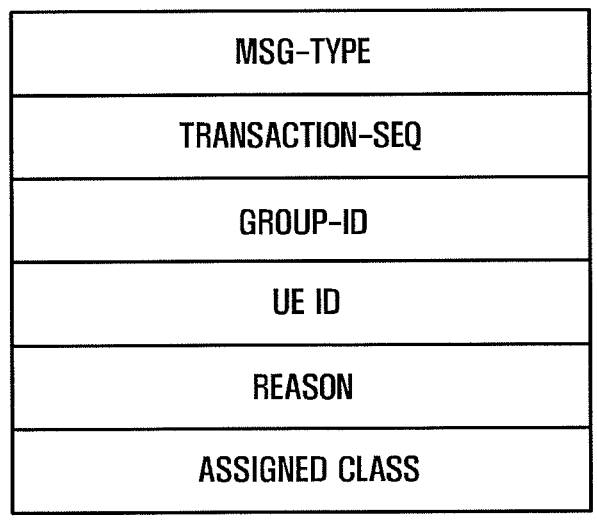

FIG. 35 is a diagram illustrating a format of the OGI class assignment request (OGI-ClassAssignRequest) message.

When assigning a class for use in retransmission acknowledgement corresponding to the future information transmission to the UE, the OGI class assignment request (OGI- ClassAssignRequest) message includes a group ID as the identifier of the group, a UE ID as the identifier of the corresponding UE 130, assigned class of the UE 130, and a reason field for transmitting additional information.

Figure 36:
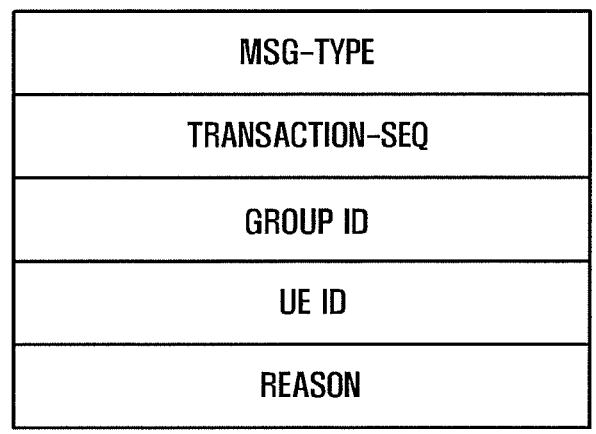

FIG. 36 is a diagram illustrating a format of the OGI class assignment response (OGI-ClassAssignReSPONSE) message.

The OGI class assignment response (OGI-ClassAssignReSPONSE) message includes a group ID as the identifier of the group, a UE ID as the identifier of the UE, and a reason field for transmitting addition information.

Figure 37:
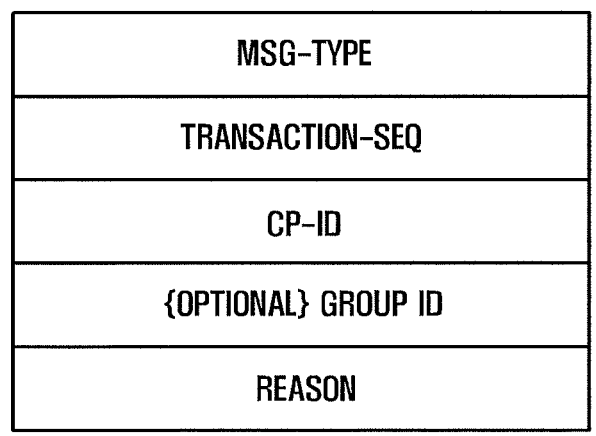

FIG. 37 is a diagram illustrating a format of the OGI-UE status report request (OGI-UEStatusReportRequest) message.

The OGI-UE status report request (OGI-UEStatusReportRequest) message includes a CP ID for identifying the content provider 580, a group ID as the identifier of a specific group, and a reason code indicating additional information to notify the OGI controller 560 of the reason of the request message transmission.

<Second Embodiment>

A description is made of the second embodiment about a method for transmitting information to the UEs 130 through multicast or broadcast radio channel, retransmitting erroneous transmission, and providing the content provider 110 with the transmission result as statistical information.

Figure 38:
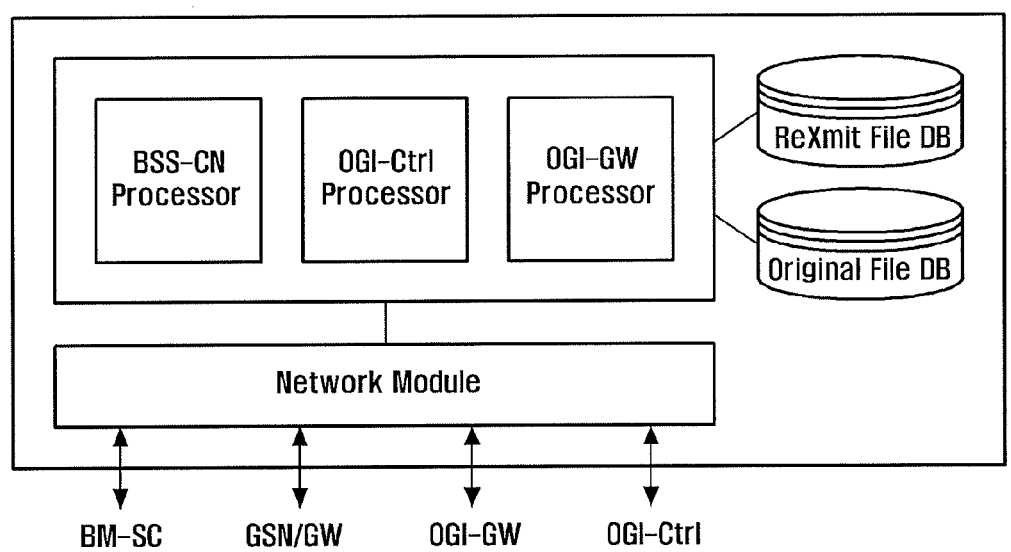
FIG. 38 is a block diagram illustrating internal configuration of the OGI file server 550.

Before describing the second embodiment, it is helpful to describe the internal configuration of the OGI file server 550 which transmits and receive information through radio channels. FIG. 38 is a block diagram illustrating internal configuration of the OGI file server 550.

The OGI file server 550 manages the information to be transmitted to the UEs 130 and physical files for retransmission of the information. The OGI file server 550 transmits the information and files through real radio channel. For this purpose, the OGI file server 550 includes a database of the original files and a database converted for retransmission. The OGI file server includes a module for communication with other entities and a processor for processing communication protocol with a BSS-CN 520, an OGI controller 560, and an OGI gateway 570.

Figure 39:
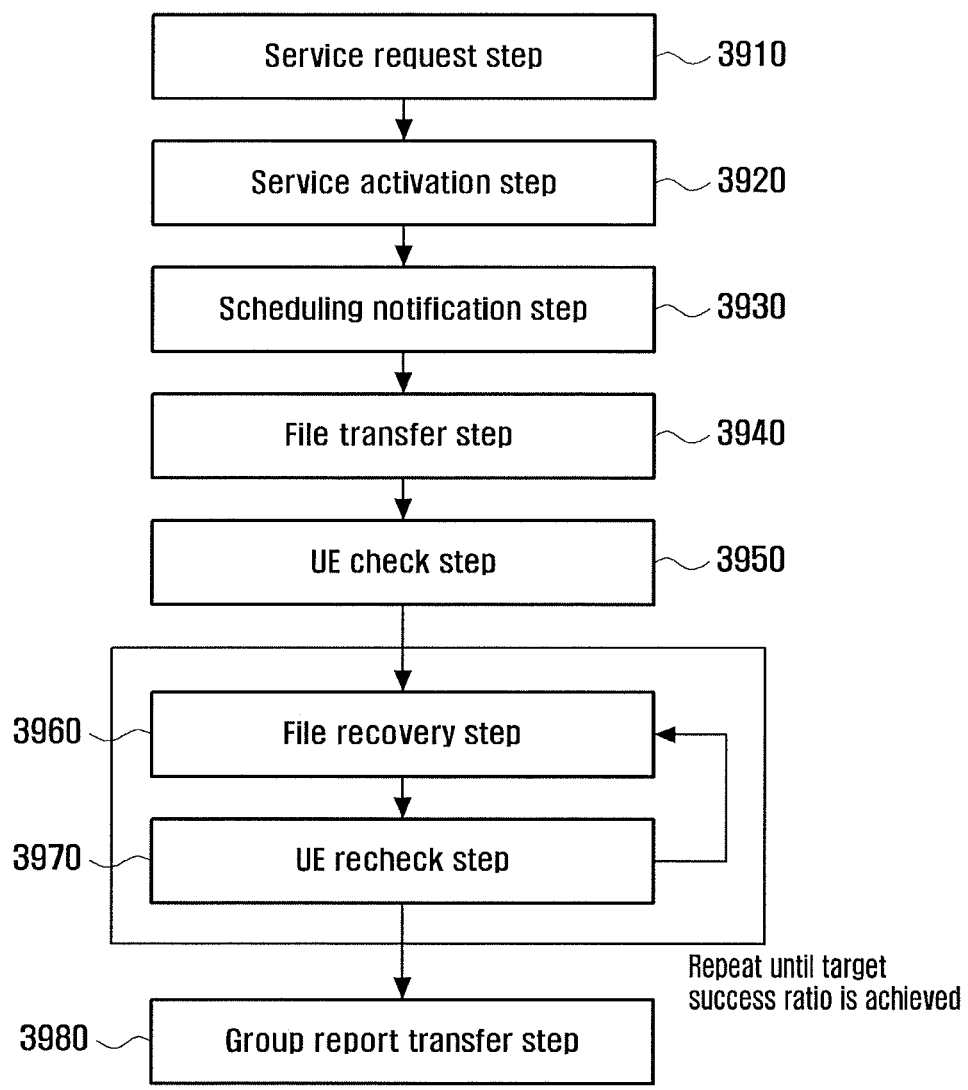
FIG. 39 is a flowchart illustrating a procedure of transmitting information to the UEs 130 through multicast or broadcast radio channel, retransmitting erroneous information, and providing the content provider with the transmission result as statistical information.

FIG. 39 is a flowchart illustrating a procedure of transmitting information to the UEs 130 through multicast or broadcast radio channel, retransmitting erroneous information, and providing the content provider with the transmission result as statistical information.

As shown in FIG. 39, the information transmission method of the present invention starts from a service request step 3910 at which the content provider 110 requests for information transmission through the wireless broadband communication network and acquire a session ID.

At the service activation step 3920, the service is initiated with the requested session. Next, a scheduling notification step for the UEs 130 to prepare the receipt of the information at the scheduled time by notifying the UEs 139 of the activation of the service. Afterward, at the file transmission step 3940, the UEs 130 receives the information on a specific group through the multicast/broadcast channel at the scheduled time. Next, the UEs 130 determines whether the information is received successfully and, if an error is detected, checks a part where the error is detected at step 3950. Afterward, the content provider 110 performs retransmission repeatedly to satisfy the requested quality at file recovery and UE recheck steps 3960 and 3970. Finally, the group transmission report step 3980 for providing the content provider 110 with the information transmission result as statistical information.

The content provider 110 and the wireless broadband communication network provider are capable of transmitting certain information to a large number of UEs 130 online in real time using the multicast or broadcast channel through above-described procedure.

Figure 40:
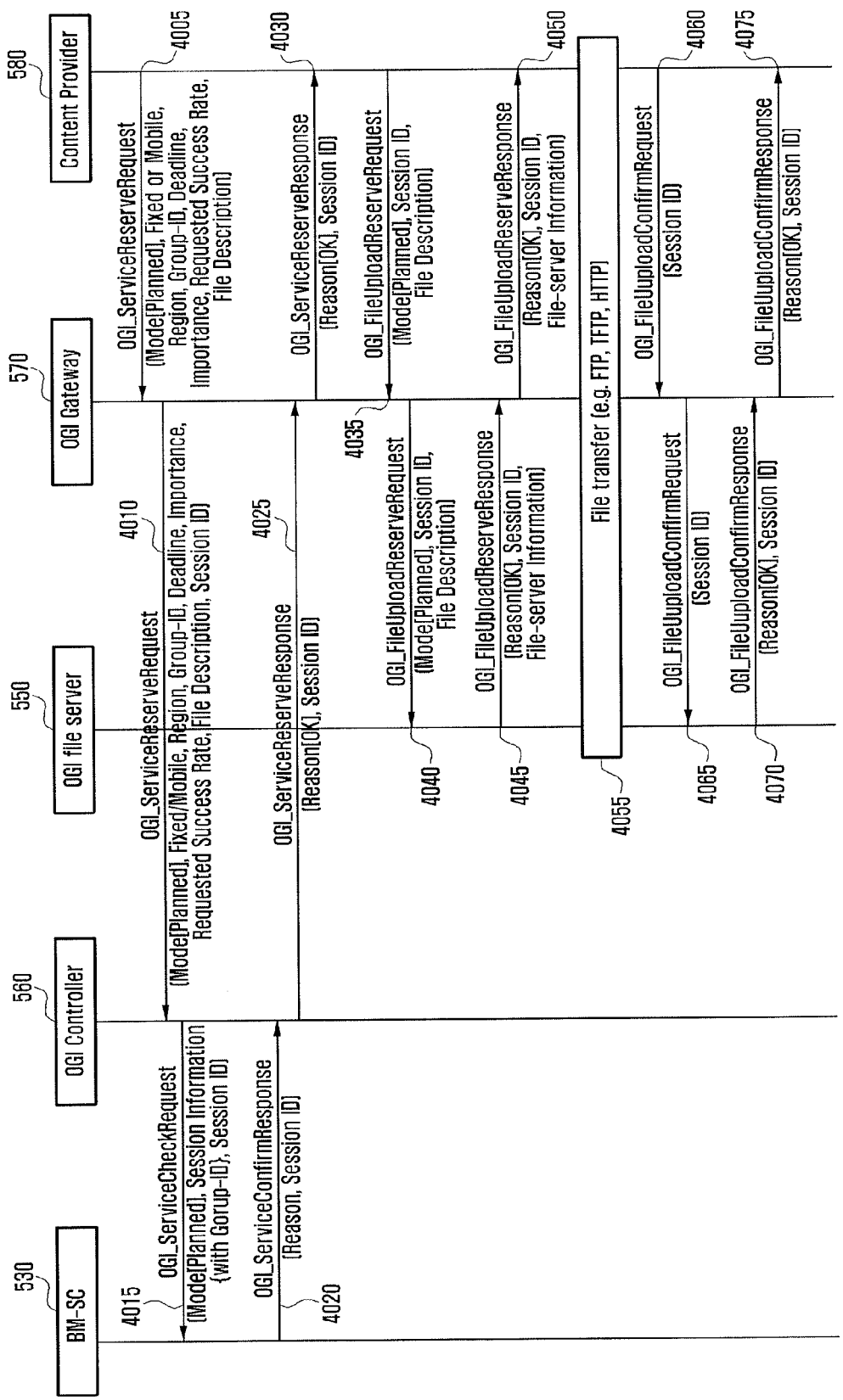
FIG. 40 is a signaling diagram illustrating details of the service request step 3910 of FIG. 39.

FIG. 40 is a signaling diagram illustrating details of the service request step 3910 of FIG. 39.

The content provider 110 sends a multicast/broadcast group transmission request (OGI_ServiceReserveRequest) by means of the content provider server 580 at step 4005. The request is delivered to the OGI controller 560 via the OGI gateway 570. At this time, the request message includes information such as UE mobility/fixation type, target area, target completion time, importance, and target success rate. According to this information, the OGI controller 560 may determine whether to accept or reject the corresponding request.

The OGI controller 560 checks the availability of the radio channel via the BM-SC 539 at step 4015 and then receives the response at step 4020. The OGI controller 560 sends a reply to the OGI gateway in response to the OGI service reserve request (OGI_serviceReserveRequest) message to the OGI gateway at step 4025, and the reply is delivered to the content provider server at step 4030.

If the OGI controller 560 accepts, the content provider server 580 sends the OGI file server an OGI file upload reserve request (OGI_FileUploadReserveRequest) message including information on whether the file transmission or retransmission is available in view of the bearer to the OGI file server 550 via the OGI gateway 570 at steps 4035 and 4040. In this case, the request includes supplementary information such as size of the file to be uploaded.

The OGI file server 550 checks the availability of the file upload and sends an OGI_FileUPloadReserveRespose message to the content provider server 580 at steps 4045 and 4050.

The content provider server 580 uploads the information to be transmitted through the multicast/broadcast channel to the OGI file server 550 at step 4055. The content provider server 580 sends the OGI file server 550 an OGI_FileUploadConfirmRequest message for checking whether the file is uploaded successfully at steps 4060 and 4065. The OGI file server 550 sends the content provider server (content provider) 580 an OGI_FileUploadConfirmResponse message indicating whether the file is uploaded successfully at steps 4070 and 4075.

Figure 41:
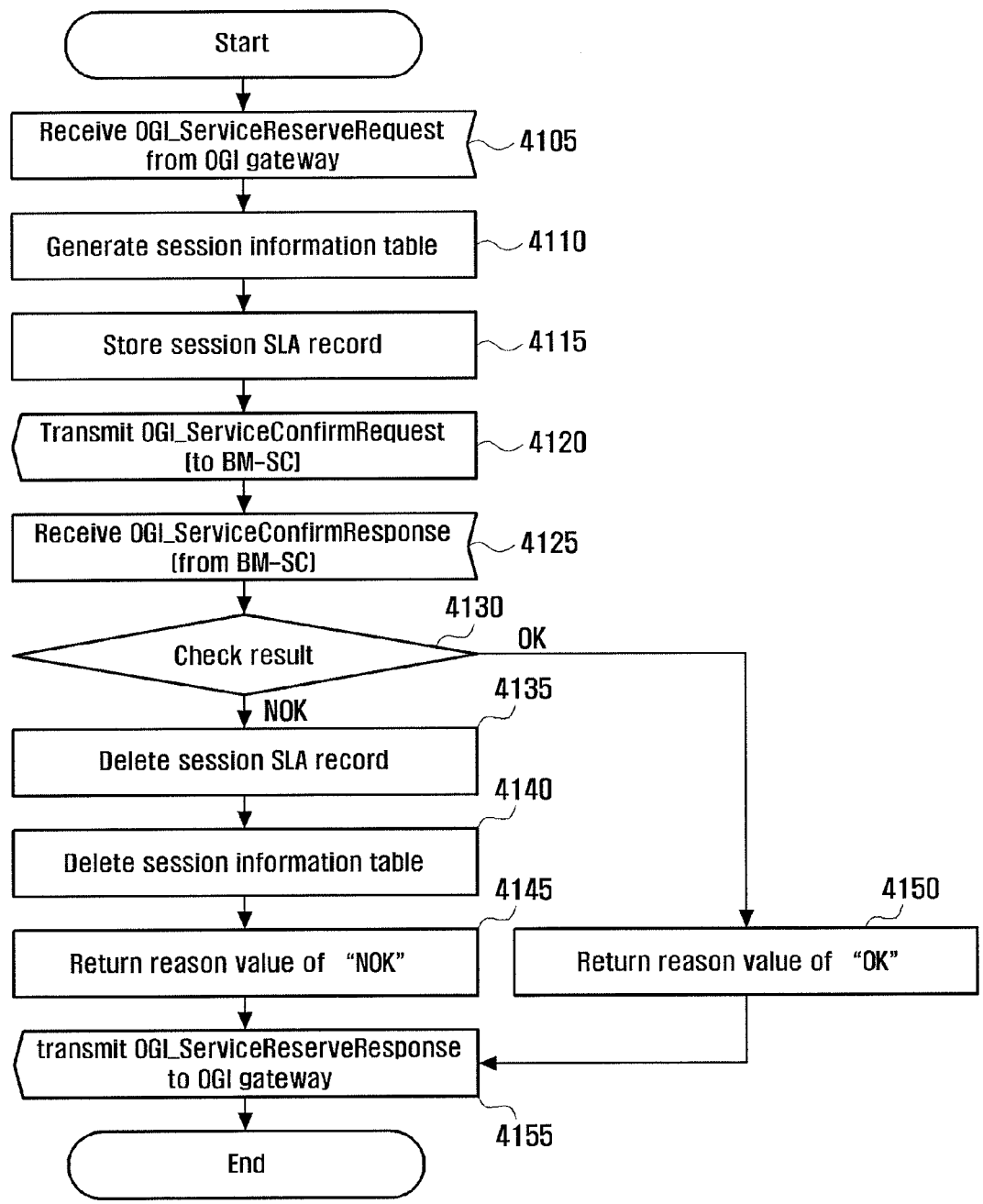
FIG. 41 is a flowchart illustrating a session registration procedure of the OGI controller 560.

FIG. 41 is a flowchart illustrating a session registration procedure of the OGI controller 560.

First, the OGI controller 560 receives an OGI service reservation request (OGI-ServiceReserverRequest) message from the OGI gateway 570 at step 4105. The OGI controller 560 checks the available session ID and generates a Session Information Table at step 4110. Next, the OGI controller 560 saves the information such as recipient UE type, location, and group ID in association with the corresponding session ID. The session information table is configured as shown in FIG. 42.

The OGI controller 560 saves the requested quality information such as requested completion time, request priority, and priority success ratio in a session SLA table. The configuration of the session SLA table is depicted in FIG. 43.

The OGI controller 560 sends an OGI service check request (OGI-ServiceCheckRequest) message to the BM-SC 530 to check the resource availability of the radio channel.

The BM-SC 530 has to be able to receive the OGI-ServiceCheckRequest message to supporting the function proposed in the present invention efficiently and, if the corresponding message is received, determine whether the multicast/broadcast is possible in match to the required quality in the corresponding region of the radio channel, and reply by sending an OGI service reservation response (OGI-ServiceReserveResponse) message to the OGI controller 560.

The OGI controller 560 receives the OGI-ServiceCheck-Response message at step 4125 to determine whether the resource reservation procedure has completed successfully. If the resource reservation procedure has completed successfully, the OGI controller 560 sets the return value to 'OK' at step 4150. The OGI controller 560 sends an OGI service reservation response (OGI-ServiceReserveResponse) message to the content provider server (content provider) 580 via the OGI gateway 470.

If the reservation process fails, the OGI controller 560 releases the preoccupied resource and table at steps 41350 and 4140. Next, the OGI controller 560 sets the return value to 'NOK' at step 4145. The OGI controller 560 sends the content provider server 580 the OGI-ServiceReserveResponse message contain the reason of failure via the OGI gateway 570 at step 4155.

Figure 44:
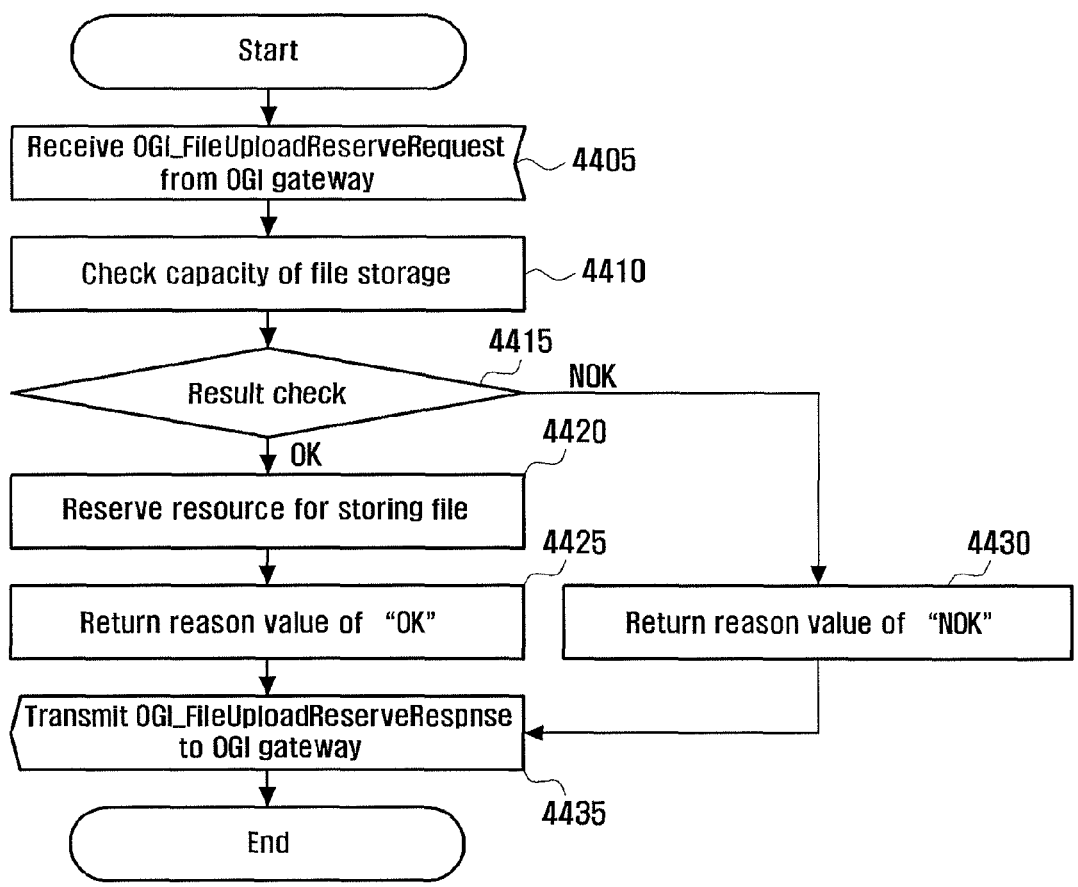
FIG. 44 is a flowchart illustrating an operation order of the OGI file server 550 before storing the file in the session registration procedure of FIG. 40.

FIG. 44 is a flowchart illustrating an operation order of the OGI file server 550 before storing the file in the session registration procedure of FIG. 40.

First, the OGI file server 550 receives an OGI file upload reservation request (OGI-FileUploadReserverRequest) message from the content provider server (content provider) 580 via the OGI gateway 570 at step 4405. The OGI file server 550 check its database capability at step 4410. If the database capability is available, the OGI file server 550 reserves the resource for storing the file and sets the return value to 'OK' at step 4420. Next, the OGI file server 550 sends the content provider server 580 and OGI file upload reservation response (OGI-FileUploadReserverResponse) message via the OGI gateway 570 at step 4435.

Otherwise, if the database capability is not available, the OGI file server 550 sets the return value to 'NOK' at step 4430. Next, the OGI file server 550 sends the content provider server 580 the OGI-FileUploadReserverResponse message via the OGI gateway 570 at step 4435.

Figure 45:
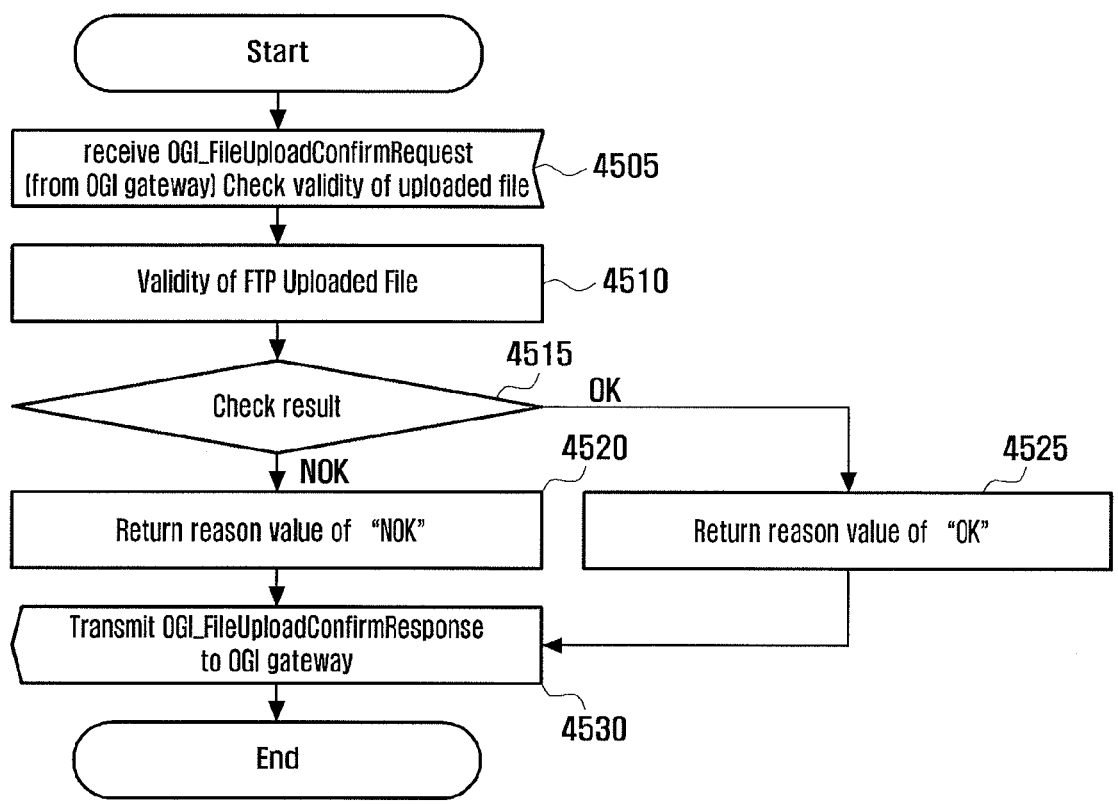
FIG. 45 is a flowchart illustrating an operation order of the OGI file server 550 after storing the file in the session registration procedure of FIG. 40.

FIG. 45 is a flowchart illustrating an operation order of the OGI file server 550 after storing the file in the session registration procedure of FIG. 40.

The OGI file server 550 receives and saves the file from the content provider server (content provider) 580 through file transfer protocol such as FTP/TFP by performing the procedure of FIG. 44. Afterward, the OGI file server 550 receives an OGI file upload confirmation request (OGI-FileUploadConfirmRequest) message from the content provider server (content provider) 580 via the OGI gateway at step 4505. The OGI file server 550 check the validity of the uploaded file at step 4510. If the upload is performed normally, the OGI file server 550 sets the return value to 'OK' at step 4525 and sends an OGI file upload confirmation response (OGI-FileUploadConfirmResponse) message including the return value to the content provider server (content provider) 580 at step 4530.

Otherwise, if the upload is performed abnormally, the OGI file server 550 sets the return value to 'NOK' at step 4520 and sends the OGI-FileUploadConfirmResponse message including the return value to the content provider server (content provider) 580.

Figure 46:
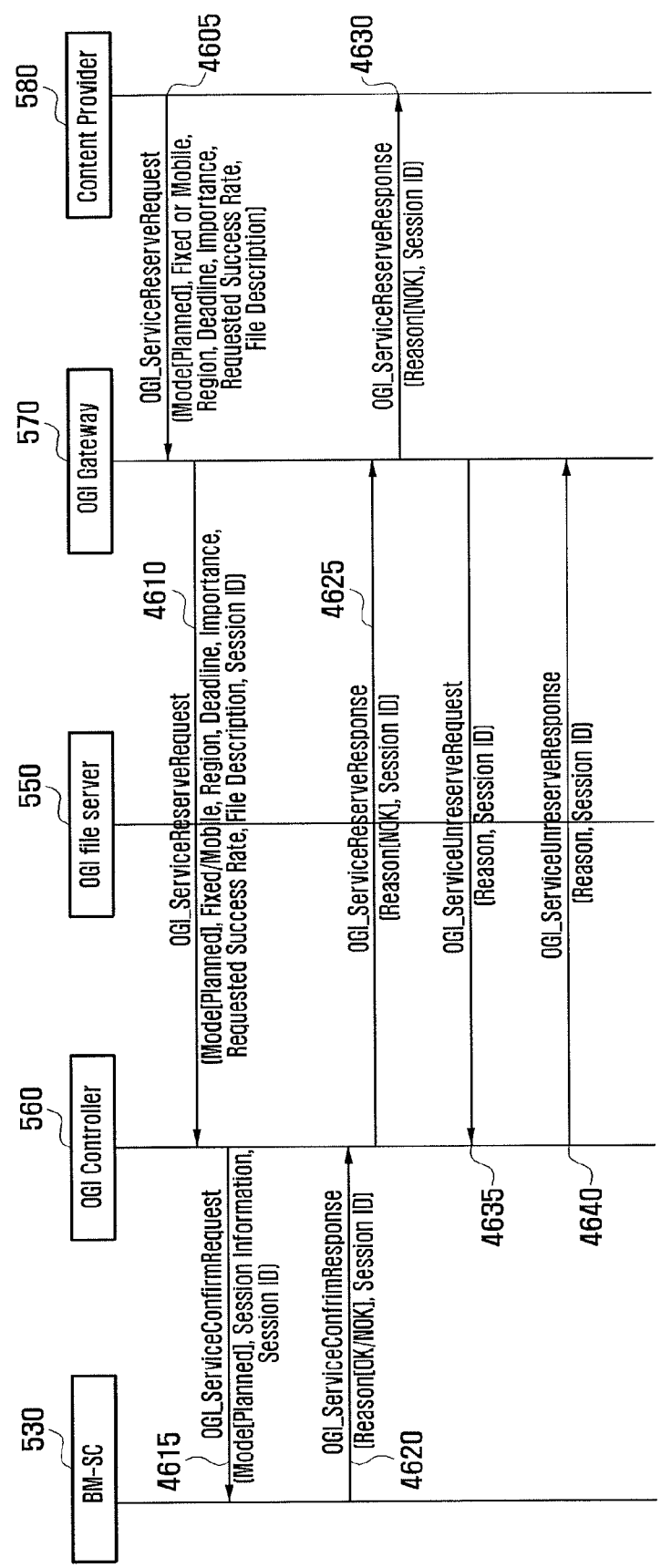
FIG. 46 is a signaling diagram illustrating a procedure in case that the session registration procedure has failed at the session registration step of FIG. 40.

FIG. 46 is a signaling diagram illustrating a procedure in case that the session registration procedure has failed at the session registration step of FIG. 40. In this case, steps 4605 to 4630 of FIG. 46 are identical with steps 4005 to 4030 of FIG. 40, detailed descriptions thereon are omitted herein.

The session registration may failure due to the problem of the OGI controller 570 or the BM-SC 530 in the middle of the session registration step of FIG. 40. In this case, the OGI gateway 470 sends an OGI service un-reservation request (OGI-ServicerUnreserveRequest) message to the OGI controller 560 to release the pre-reserved table or resources at step 4635. The OGI controller 560 releases the reserved table or resource and sends an OGI service un-reservation response (OGI-ServiceUnreserveResponse) message to the OGI gateway 470 at step 4740.

Figure 47:
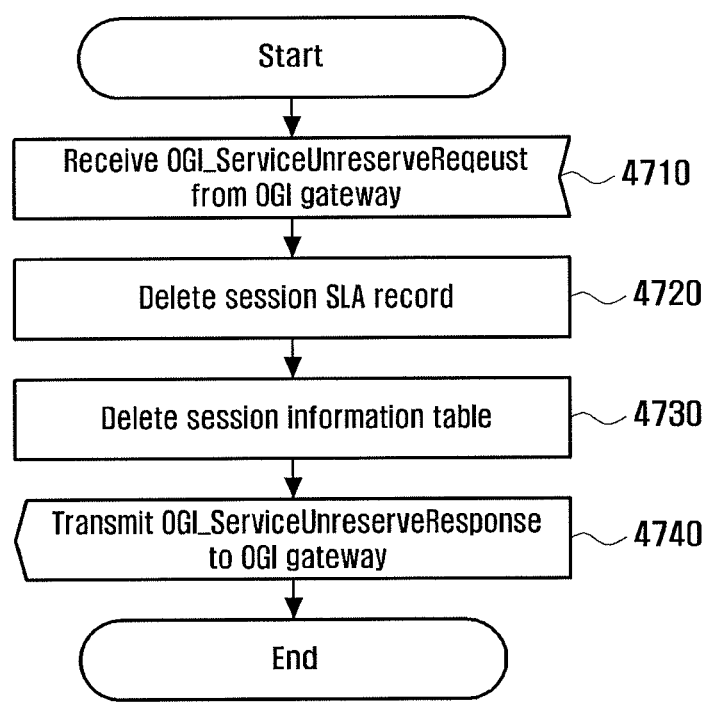
FIG. 47 is a flowchart illustrating an operation order of the OGI controller 560 in case that the session registration procedure of FIG. 46 fails.

FIG. 47 is a flowchart illustrating an operation order of the OGI controller 560 in case that the session registration procedure of FIG. 46 fails.

First, the OGI controller 560 receives the OGI-ServiceUnreserveRequest message from the OGI gateway 570 at step 4710. The OGI controller 560 deletes supplementary information such as table and session information generated in response to the ServiceReserveRequest message, at steps 4720 and 4730. The OGI controller 560 generates the OGI-ServiceUnreserveResponse message including the operation result to the OGI gateway 570 at step 4740.

Figure 48:
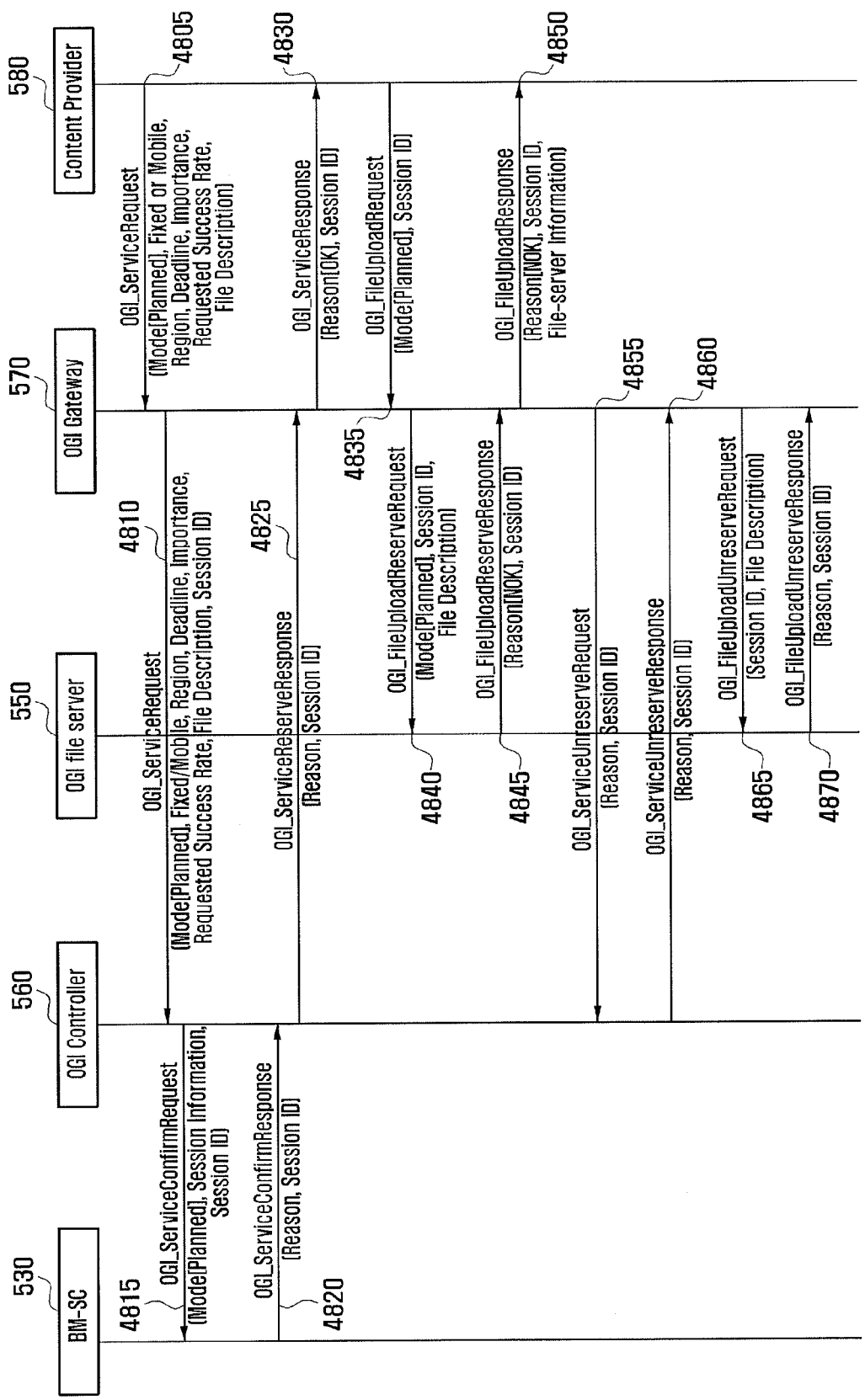
FIG. 48 is a signaling diagram illustrating procedure in case that the session registration fails due to the capability shortage of the OGI file server at session registration step of FIG. 40.

FIG. 48 is a signaling diagram illustrating procedure in case that the session registration fails due to the capability shortage of the OGI file server at session registration step of FIG. 40. Here, steps 4805 to 4850 of FIG. 48 are identical with steps 4004 to 4050 of FIG. 40, detailed descriptions thereon are omitted herein.

If the session registration fails, the OGI gateway 570 sends the OGI-ServiceUnreserveRequest message to the OGI controller to release the pre-reserved table or resource at step 4855. The OGI controller 560 releases the reserved table or resource and sends the OGI-ServiceUnreserveResponse message to the OGI gateway 470 at step 4740.

Next, the OGI gateway 570 sends an OGI file upload un-reservation request (OGI-FileUploadUnreserveRequest) message to the OGI file server 550 at step 4865. After releasing the reserved table and resource, the OGI file server 550 sends an OGI file upload un-reservation response (OGI-FileUploadUnreserveResponse) message to the OGI gateway 570.

Figure 49:
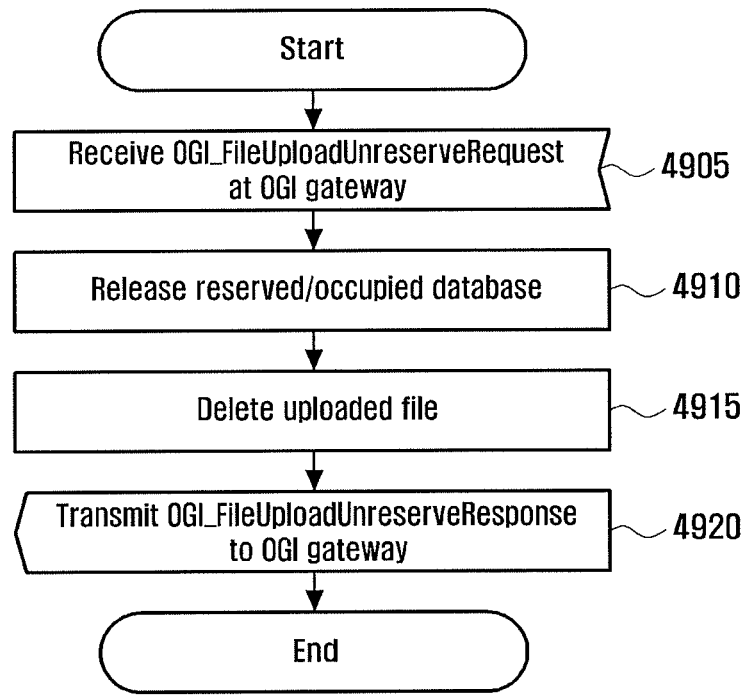
FIG. 49 is a flowchart illustrating an operation order of the OGI file server 550 in case that the session registration fails in FIG. 48.

FIG. 49 is a flowchart illustrating an operation order of the OGI file server 550 in case that the session registration fails in FIG. 48.

The OGI file server 550 receives the OGI-FileUploadUnreserveRequest message for releasing the reserved table and resource from the OGI gateway at step 4905. The OGI file server 550 releases the pre-reserved/occupied database space and discards the file being in the middle of upload simultaneously at step 4915. Next, the OGI file server 550 sends the OGI-FileUploadUnreserveResponse message including the table and resource release result to the OGI gateway 570 at step 4920.

Figure 50:
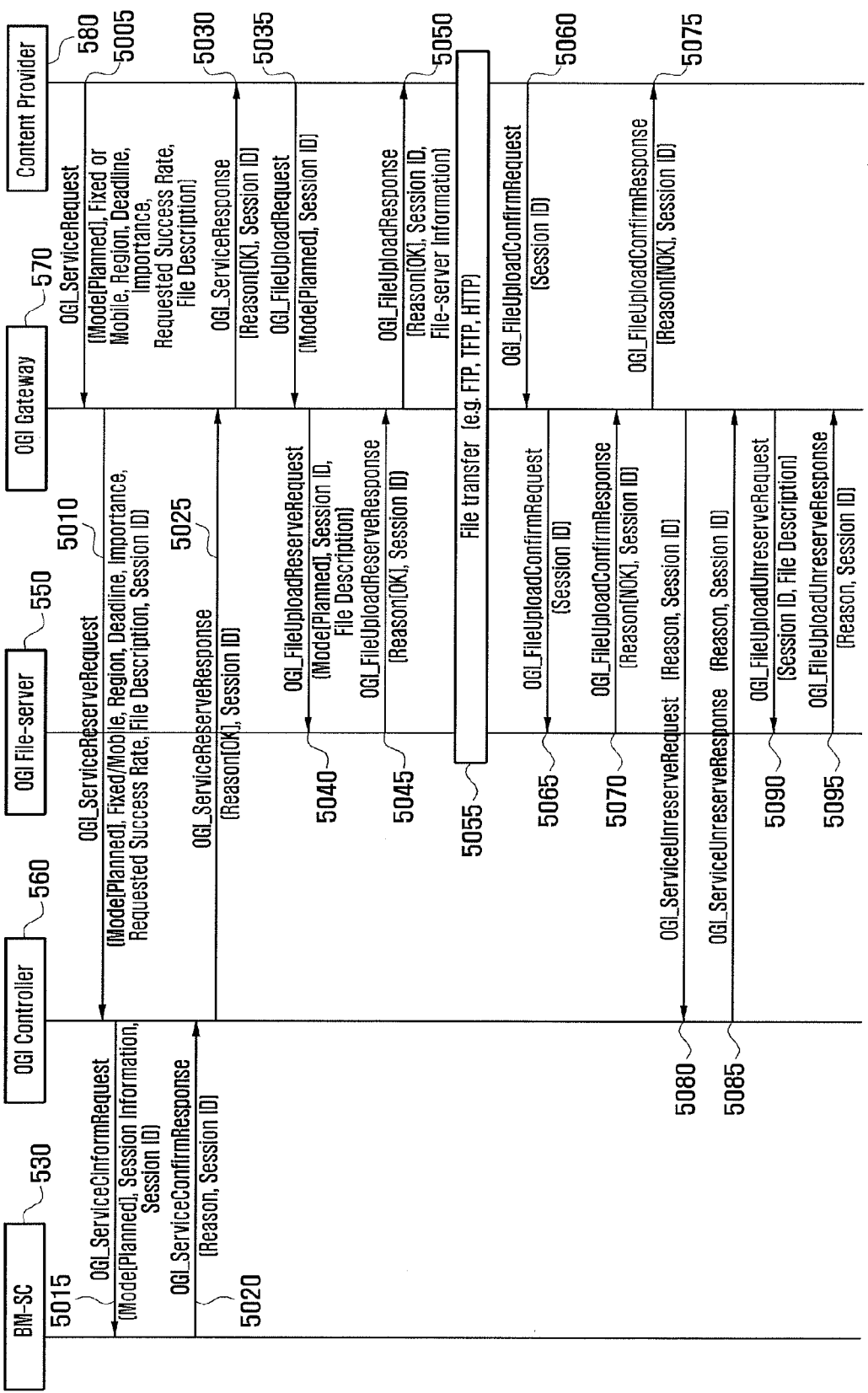
FIG. 50 is a signaling diagram illustrating a procedure in case that the operation of the OGI file server 550 fails in FIG. 48.

FIG. 50 is a signaling diagram illustrating a procedure in case that the operation of the OGI file server 550 fails in FIG. 48. This is the case where the service reservation fails due to the error occurred in the file upload process.

The OGI file server 550 receives the OGI-FileUploadUnreserveRequest message from the OGI gateway 570 at step 5090. The OGI file server 550 releases the pre-reserved/occupied database space and discard the file being in the middle of upload simultaneously. Next, the OGI file server 550 sends the OGI-FileUploadUnreserveResponse message including the execution result to the OGI gateway 570 at step 5095.

The session established according to the successful execution of the service request step 3910 of FIG. 39 is activated through the service activation step 3920 of FIG. 39.

Figure 51:
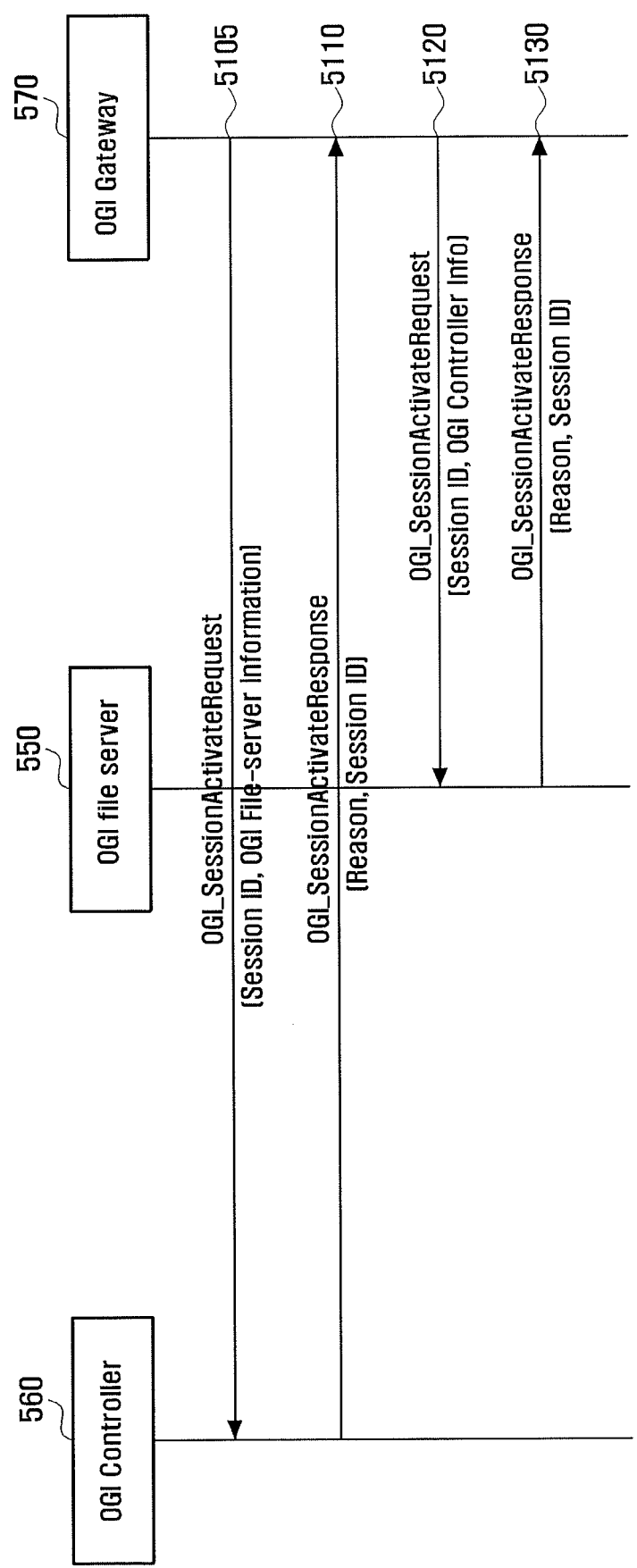
FIG. 51 is a signaling diagram illustrating details of the service activation step 3920 of FIG. 39.

FIG. 51 is a signaling diagram illustrating details of the service activation step 3920 of FIG. 39. In FIG. 51, the OGI gateway 570 notifies the OGI controller 560 and the OGI file server 560 of the start of the service for the session registered successfully.

For this purpose, the OGI gateway 570 sends the OGI controller 560 an OGI session activation request (OGI-SessionActivateRequest) message including a session ID at step 5150. The OGI controller 560 activates the session corresponding to the received session ID and sends the OGI gateway 570 an OGI session activation response (OGI-SessionActivateResponse) message in reply to the OGI-SessionActivateRequest message at step 5110.

Likewise, the OGI gateway 570 sends the OGI file server 560 the OGI-SessionActivateRequest message including the session ID at step 5120. The OGI controller activates the session corresponding to the received session ID and sends the OGI gateway 570 the OGI-SessionActivateResponse message in reply to the OGI-SessionActivateRequest at step 5130.

Figure 52:
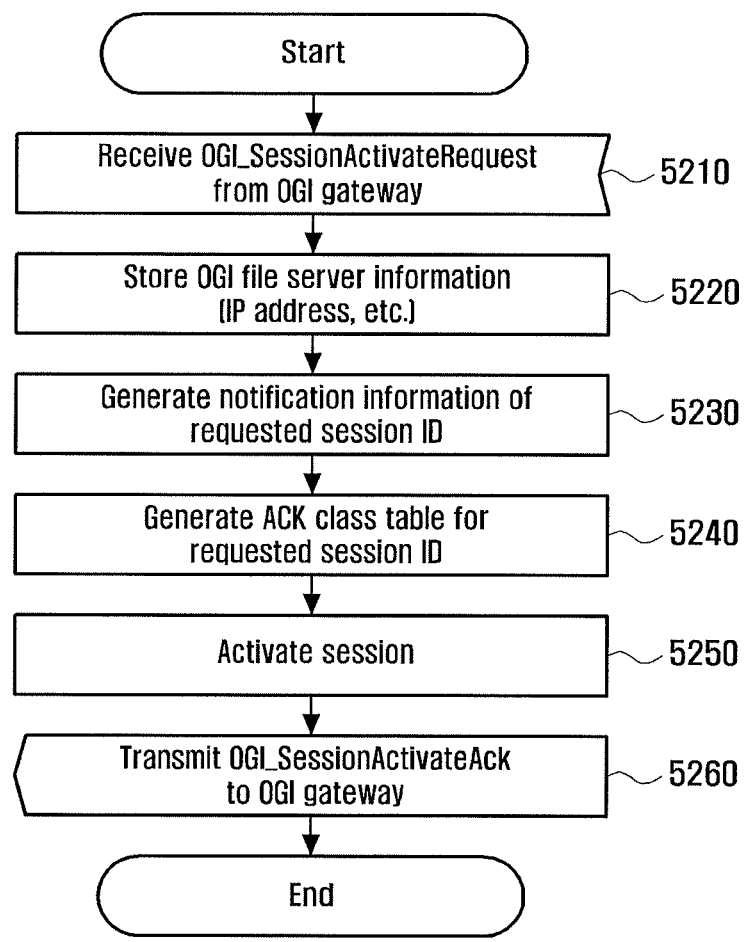
FIG. 52 is a flowchart illustrating an operation order of the OGI controller 560 in case that the session is initiated in FIG. 51.

FIG. 52 is a flowchart illustrating an operation order of the OGI controller 560 in case that the session is initiated in FIG. 51.

First, the OGI controller 560 receives an OGI session activation Request (OGI-SessionActivateRequest) message from the OGI gateway 570 at step 5210. The OGI controller 560 saves the information on the OGI file server which stores the file of the corresponding session at step 5220. Next, the OGI controller 560 sends the corresponding file through multicast/broadcast and generates a notification information table including the information for receiving response information from the UEs 130. The structure of the notification information table is depicted in FIG. 53.

As shown in FIG. 53, the notification information table includes session IDs, start times of the respective sessions, radio channels, data rate (optional), and information on whether to receive ACK or not.

Returning to FIG. 52, the OGI controller 560 generates an ACK class table at step 5240. In case that the ACK is received from the UEs after file transfer of the initiated session, the ACK class table includes the information on whether to receive per-UE class ACK and channel, if receives, to be used and time information for the channel. In this case, the ACK class table is configured as shown in FIG. 54.

The OGI controller 560 starts the session successfully at step 5250 and, as a consequence, sends an OGI session activation confirmation (OGI-SessionActivateConfirm) message to the OGI gateway 570 at step 5260.

Figure 55:
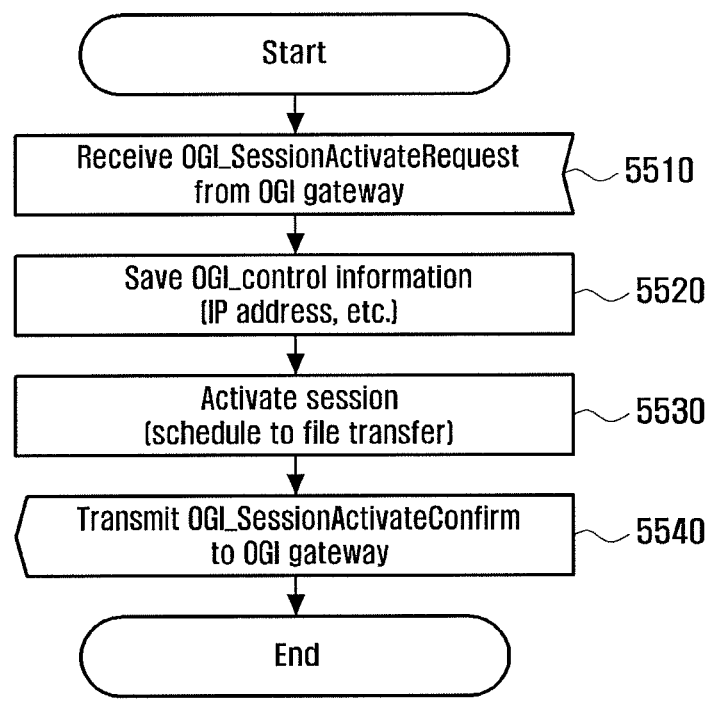
FIG. 55 is a flowchart illustrating a procedure of the OGI file server 550 in case that the session starts at the service activation step of FIG. 51.

FIG. 55 is a flowchart illustrating a procedure of the OGI file server 550 in case that the session starts at the service activation step of FIG. 51.

First, the OGI file server 550 receives the OGI-SessionActivateRequest message from the OGI gateway 570 at step 5510. The OGI file server 550 saves the information on the OGI controller 560 at step 5520 and starts the session at step 5530. Next, the OGI file server 550 sends the OGI-SessionActivateConfirm message including the processing result to the OGI gateway 570 at step 5540.

Figure 56:
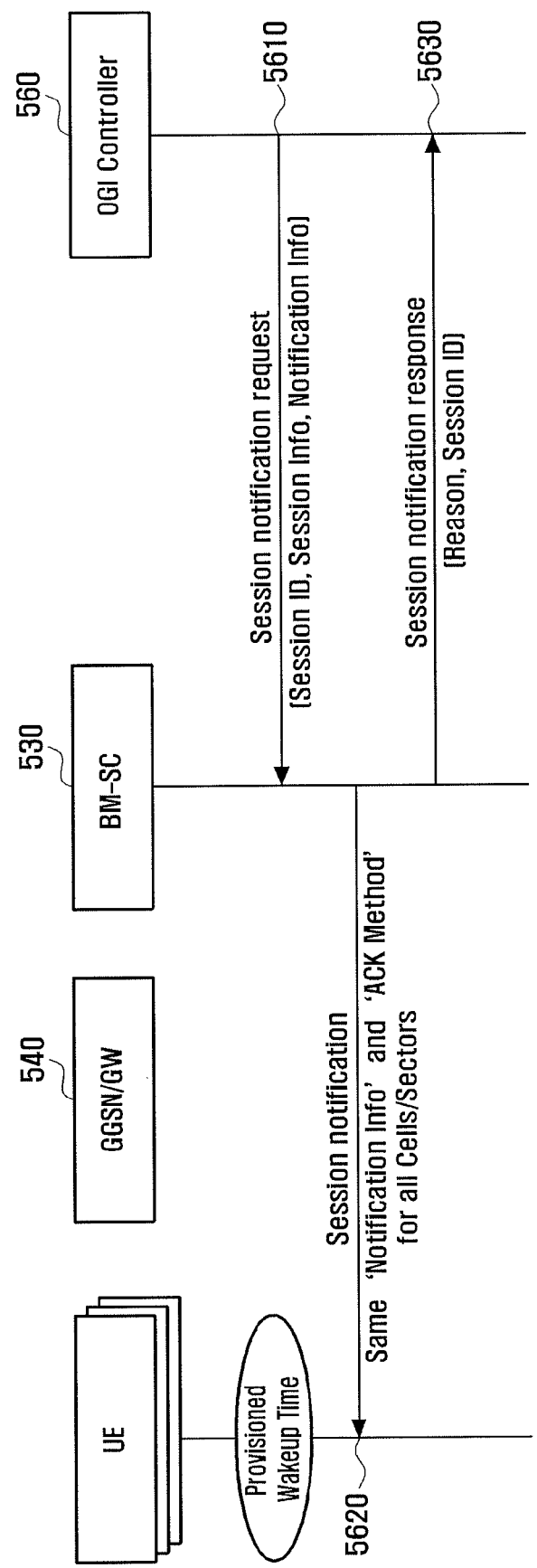
FIG. 56 is a signaling diagram illustrating details of the scheduling notification step 3939 of FIG. 39.

FIG. 56 is a signaling diagram illustrating details of the scheduling notification step 3939 of FIG. 39. In this case, FIG. 56 is directed to an embodiment in which the OGI controller 560 notifies the entire cells of scheduling at the same timing at same data rate.

In order accomplish this, the OGI controller 560 sends an OGI session notification request (OGI-SessionNotificationRequest) message to the BM-SC 530 at step 5610. The BM-SC 530 multicasts/broadcasts the session notification message at a scheduling information transmission time reserved between the UEs 130 and the BM-SC 530 such that a specific group receive the corresponding information. The session notification message includes the notification information table as shown in FIG. 53 and the ACK class table as shown in FIG. 54. Upon receipt of the session notification message, the UE 130 can acquire the information on the established session.

Meanwhile, the BM-SC sends an OGI session notification response (OGI-SessionNotificationResponse) message to the OGI controller 560 to report whether the session notification is successful, at step 5630.

Figure 57:
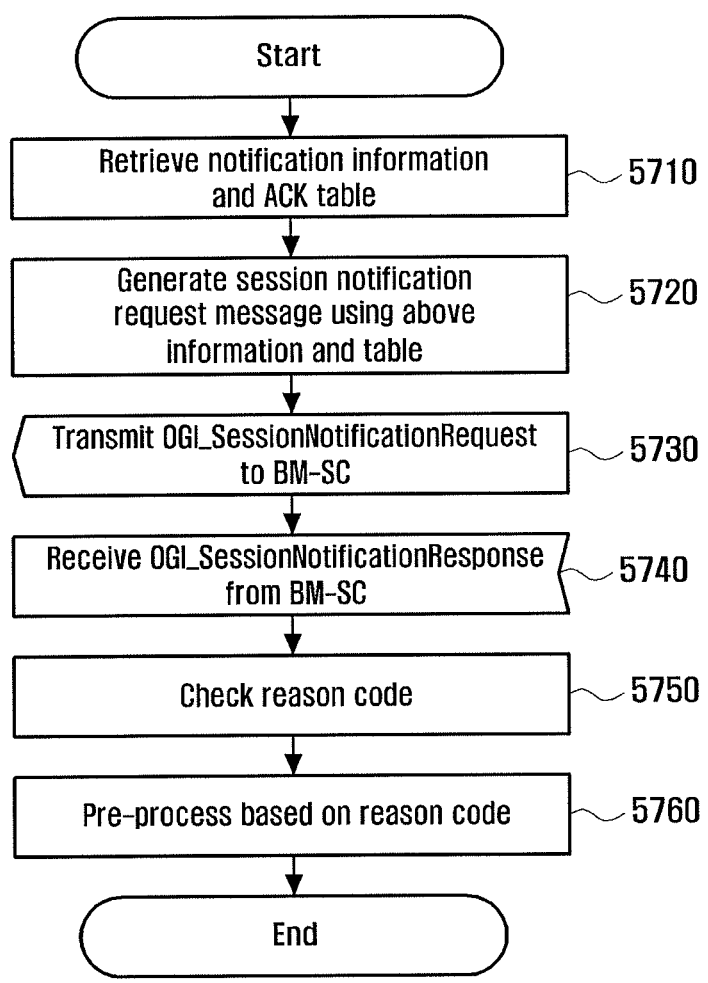
FIG. 57 is a flowchart illustrating an operation order of the OGI controller 560 in the scheduling information transfer procedure of FIG. 56.

FIG. 57 is a flowchart illustrating an operation order of the OGI controller 560 in the scheduling information transfer procedure of FIG. 56.

First, the OGI controller 560 searches for the notification information table and ACK class table to be transmitted to the UEs 130 at step 5710. Next, the OGI controller generates the OGI-SessionNotificationRequest message including the notification information table and the ACK class table at step 5720. The OGI controller 560 sends the OGI-SessionNotificationRequest message to the BM-SC 530 at step 5730 and receives a reply in response to this message at step 5740.

Upon receipt of the reply, the OGI controller 560 checks the "reason" code at step 5750, and the procedure goes to the next step according to the checked code at step 5760.

In FIG. 56, it is assumed that the radio channel environment of a specific session configure identically for all of the cells. However, if an optimized data rate and response scheme is applied to each cell, it is possible to utilize the resource of the wireless broadband communication network more efficiently.

Figure 58:
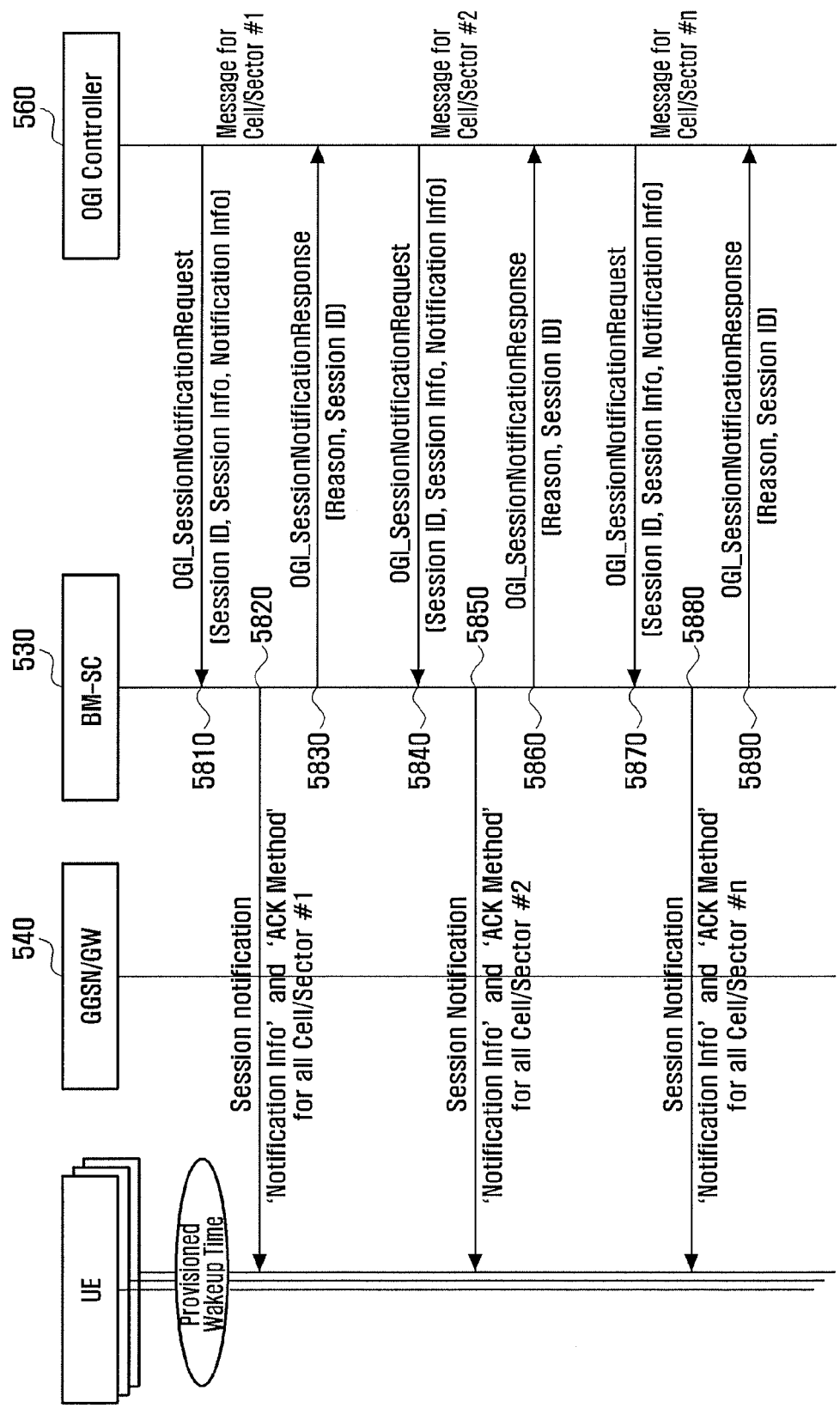
FIG. 58 is a signaling diagram illustrating a procedure for transmitting session scheduling information per cell.

In order to accomplish this, FIG. 58 is directed to the embodiment in which the OGI controller 560 generates the notification information table and ACK class table optimized per cell and transmits the tables to the corresponding cell independently.

As shown in FIG. 58, the OGI controller 5810 sends the BM-SC 530 the OGI-SessionNotificationRequest messages addressed to the respective cells independently at steps 5810, 5840, and 5870. In this case, the OGI-SessionNotificationRequest message includes the notification information table and the ACK class table. The notification table sent to the respective UEs 130 in FIG. 56 and the notification information table sent to the respective UEs 130 in FIG. 58 differ from each other in that the notification information table of FIG. 58 further includes area codes as depicted in FIG. 59.

Meanwhile, the BM-SC 530 sends the session notification message to the respectively cells independently at steps 5820, 5850, and 5880. The BM-SC 530 sends the OGI-SessionNotificationResponse message to the OGI controller 560 at steps 5830, 5860, and 5890.

Figure 60:
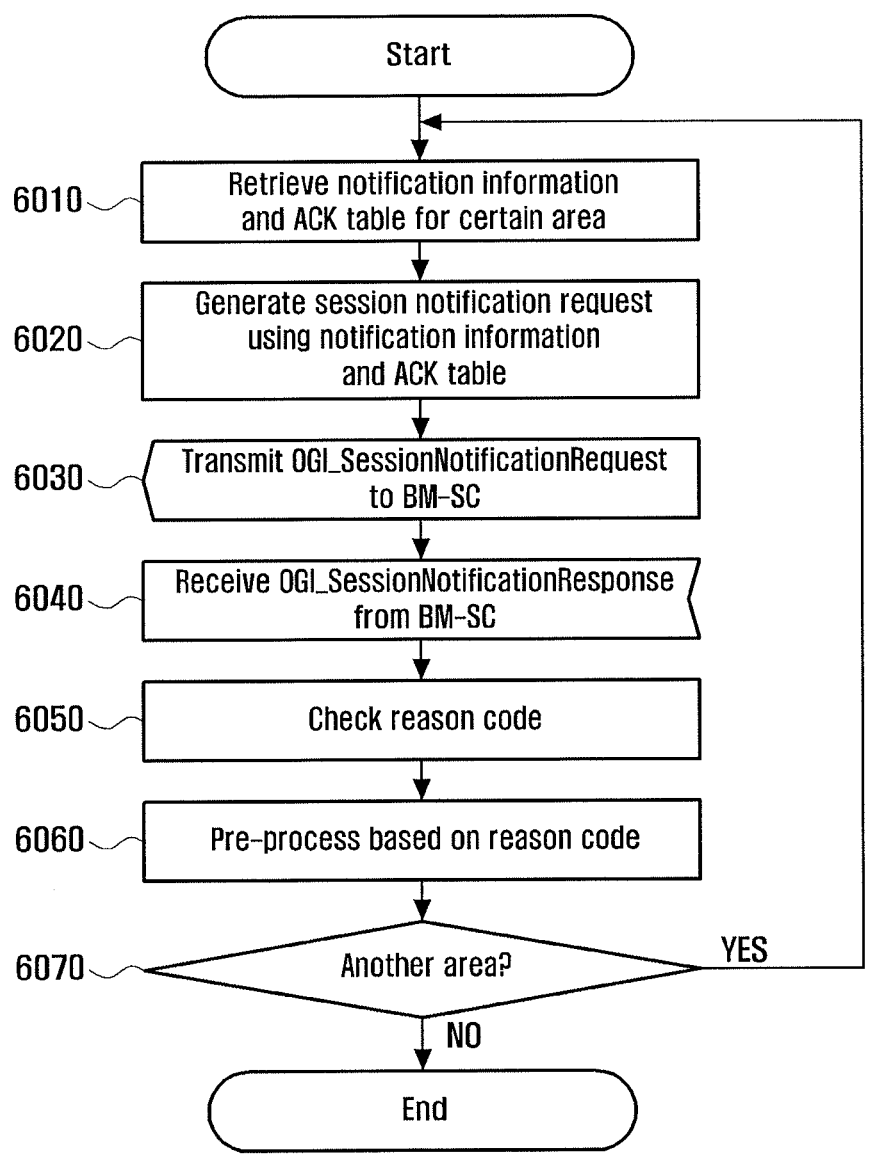
FIG. 60 is flowchart illustrating an operation order of the OGI controller 560 at per-cell scheduling notification step of FIG. 58.

FIG. 60 is flowchart illustrating an operation order of the OGI controller 560 at per-cell scheduling notification step of FIG. 58.

First, the OGI controller 560 retrieves the notification information tables and ACK class tables to be transmitted to the respective UEs 130 at step 6010. The notification information table is structured as shown in FIG. 59, and the ACK class table is structured as shown in FIG. 54.

The OGI controller 560 generates the OGI-SessionNotificationRequest message including the notification information table and ACK class table at step 6020. Next, the OGI controller 560 sends the OGI-SessionNotificationRequest message to the BM-SC 530 and then receives a reply in response to this message at step 6040.

Upon receipt of the reply, the OGI controller 560 checks the "reason" code at step 6050 and performs subsequent process according to the checked code at step 6060. The OGI controller 560 determines whether there is any area to which the scheduling notification is not transmitted at step 6070. If the there is any area to which the scheduling notification is not transmitted, the OGI controller 560 returns the procedure to step 6010 to perform subsequent steps.

Figure 61:
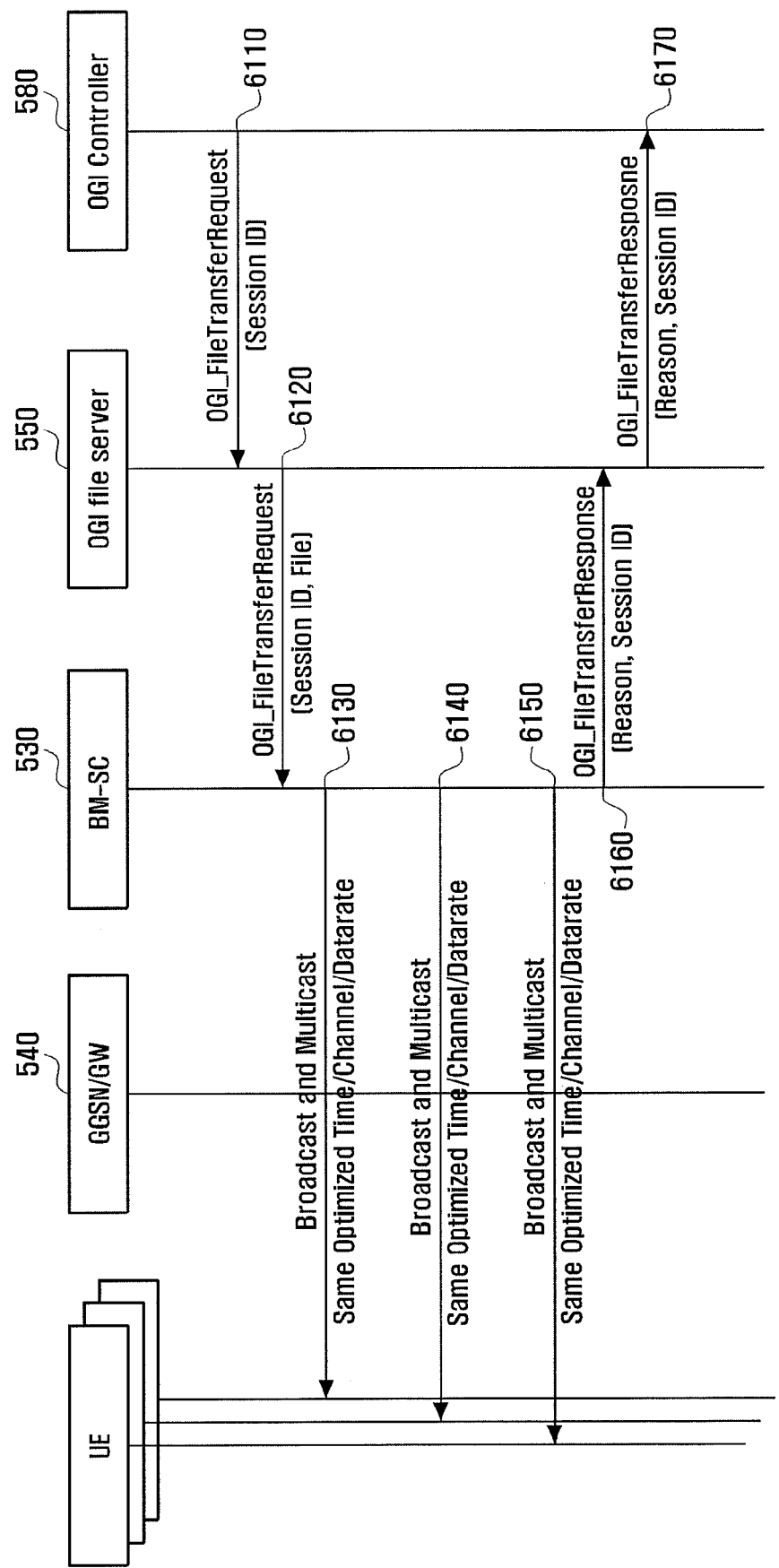
FIG. 61 is a signaling diagram illustrating details of the fine transmission step 3940 of FIG. 39.

FIG. 61 is a signaling diagram illustrating details of the fine transmission step 3940 of FIG. 39. That is, FIG. 61 shows the process for transmitting the actual information to the UEs 130 through the multicast/broadcast channel at the scheduled time point. FIG. 61 is directed to the procedure in which the file is transmitted to all of the cells in the same radio channel configuration.

As shown in FIG. 61, the OGI controller 560 sends an OGI file transfer request (OGI-FileTransferRequest) message to the BM-SC 530 to request for file transfer at steps 6110 and 6120. The BM-SC 530 sends the file to the respective UEs 130 at steps 6130 and 6150. Here, the same file is transmitted to the respective UEs 130 through the radio channels configured with the same conditions.

After transmitting the file to the respective UEs 130, the BM-SC 530 sends an OGI file transfer response (OGI-FileTransferResponse) message to the OGI controller 560 at steps 6160 and 6170.

Figure 62:
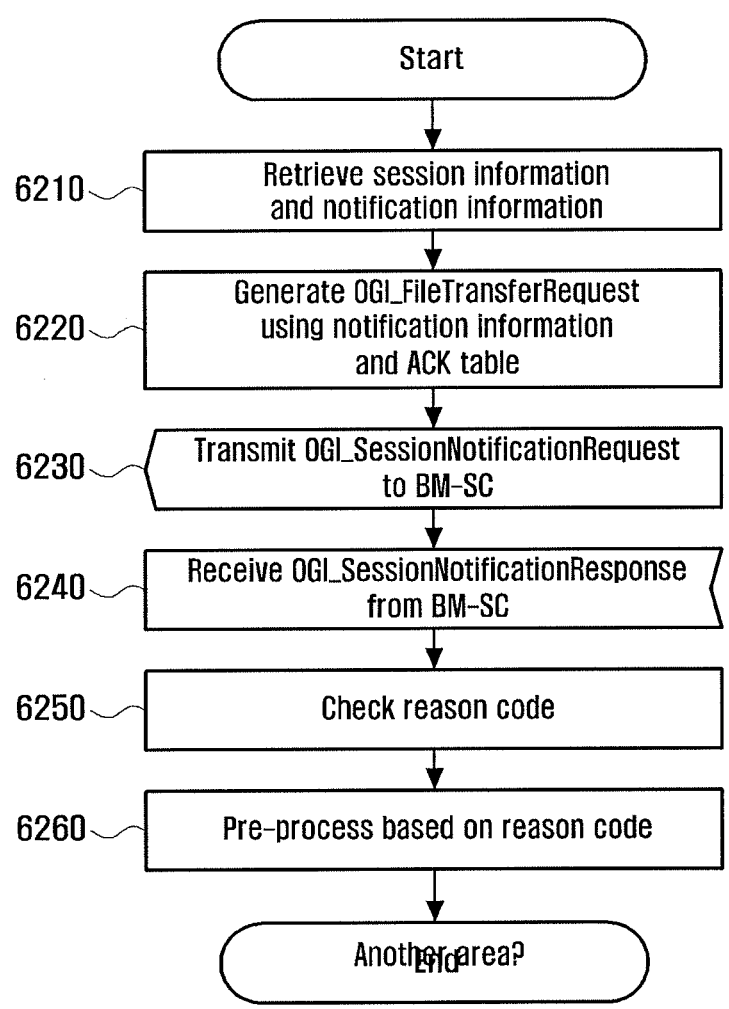
FIG. 62 is a flowchart illustrating an operation order of the OGI controller in FIG. 61.

FIG. 62 is a flowchart illustrating an operation order of the OGI controller in FIG. 61.

First, the OGI controller 560 checks the session information and notification information at the scheduled time at step 6210. The OGI controller 560 generates the OGI-FileTransferRequest message using the checked session information and notification information at step 6220. Next, the OGI controller 560 sends the OGI-FileTransferRequest message to the BM-SC 530 at step 6230 and waits for a response. Upon receipt of the OGI-FileTransferResponse message at step 6240, the OGI controller 560 checks the "Reason" code at step 6250 and performs the subsequent process based on the code at step 6260.

Figure 63:
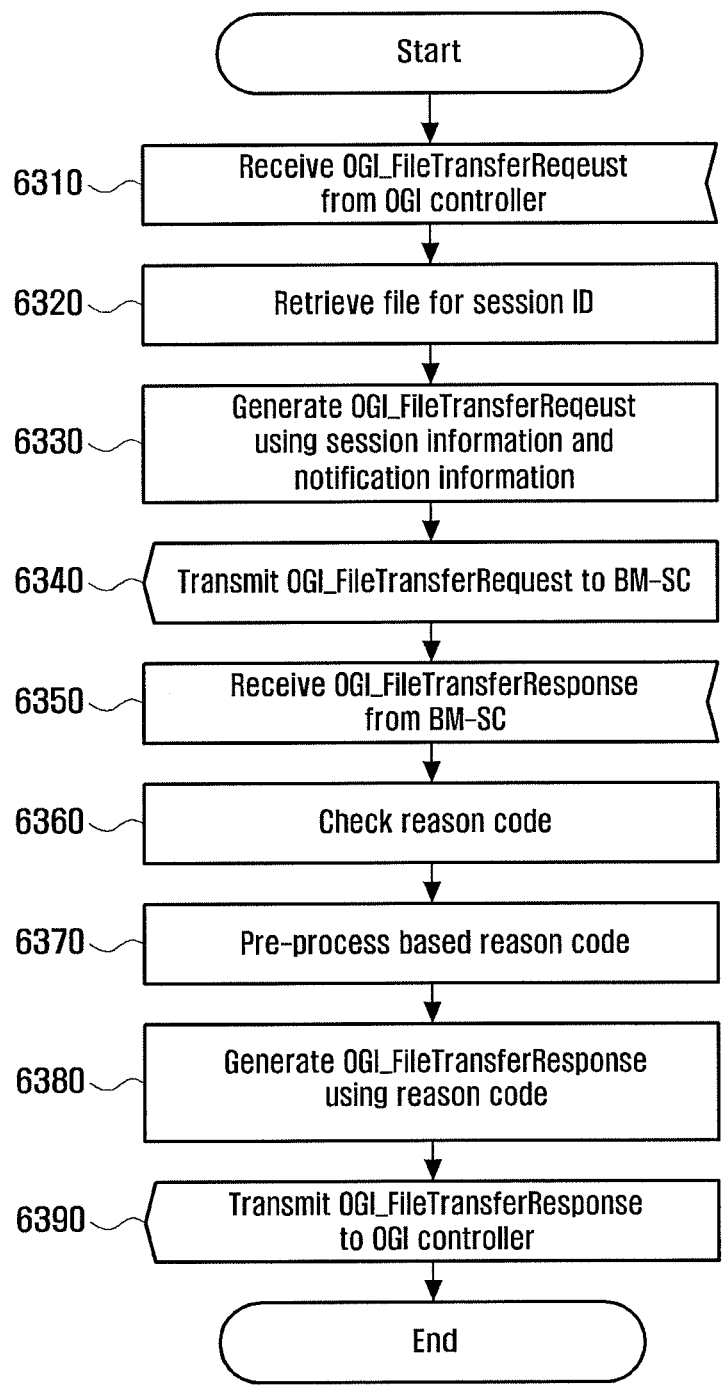
FIG. 63 is a flowchart illustrating an operation order of the OGI file server 550 in FIG. 61.

FIG. 63 is a flowchart illustrating an operation order of the OGI file server 550 in FIG. 61.

The OGI file server 550 receives the OGI-FileTransferRequest message transmitted by the OGI controller 560 at step 6310. The OGI file server 550 checks the session ID included in the received message and searches for the file matching the session ID at step 6320. Next, the OGI file server 550 generates the OGI-FileTransferRequest message including the retrieved file at step 6330 and sends this message to the BM-SC 530 at step 6340.

The OGI file server 550 receives the OGI-FileTransferResponse message from the BM-SC 530 at step 6350 and checks the "Reason" code at step 6360. Next, the OGI file server 550 performs subsequent process according to the checked code. Simultaneously, the OGI file server 550 generates the OGI-FileTransferResponse message using the code at step 6380 and sends the generated message to the OGI controller 560 at step 6390.

Figure 64:
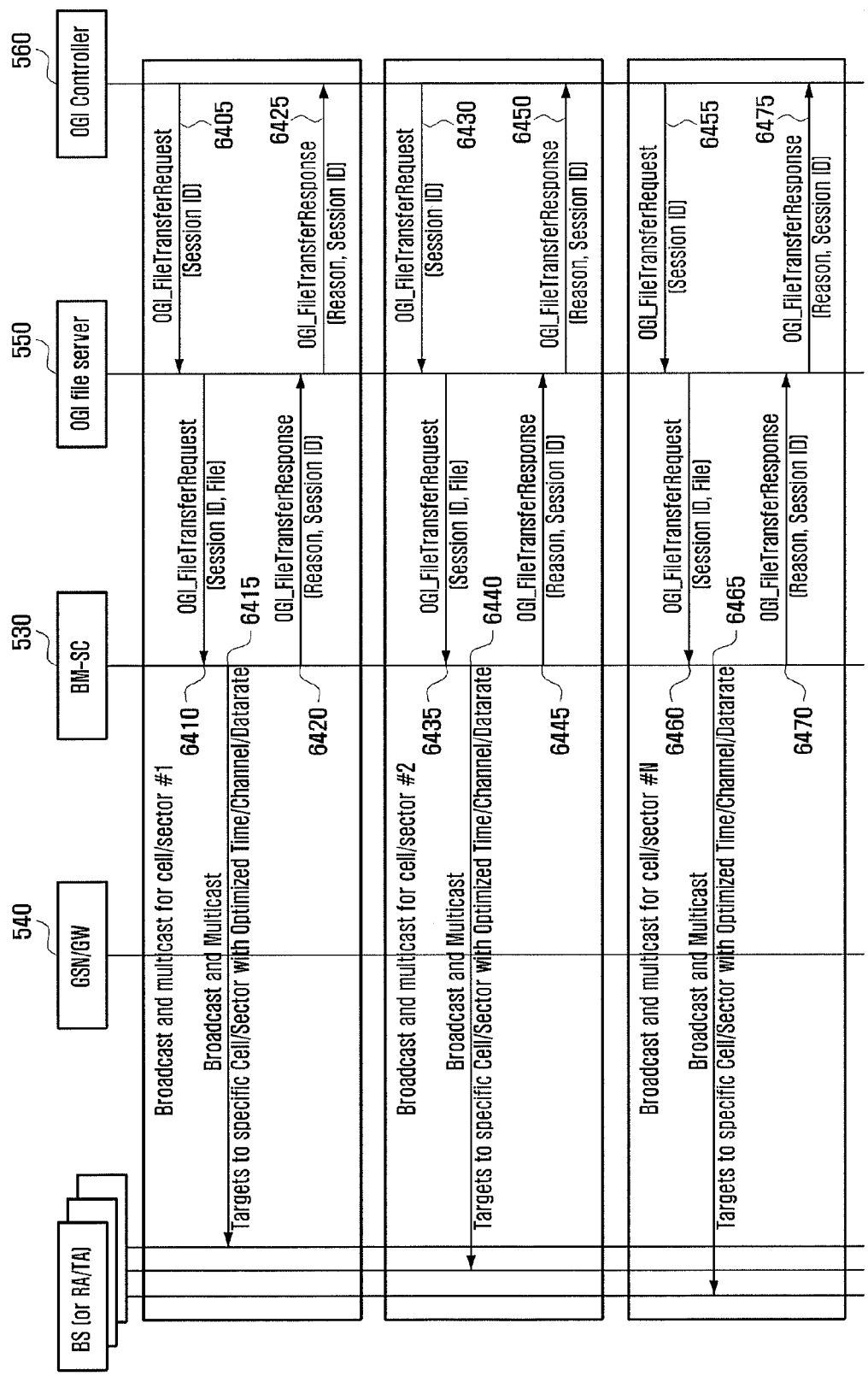
FIG. 64 is a signaling diagram illustrating the procedure of transmitting the file through the radio channel optimized per cell.

FIG. 64 is a signaling diagram illustrating the procedure of transmitting the file through the radio channel optimized per cell.

The file transfer procedure of FIG. 64 is similar to features described with reference to FIG. 61. However, FIG. 64 has a difference in that the file is transferred through the radio channel optimized per cell independently. That is, the file for cell 1 is transmitted at steps 6405 to 6425, the file for cell 2 at steps 6430 to 6450, and the file for cell 3 at steps 6455 to 6475.

Since the detailed procedure for transmitting the file for each cell is identical with that of FIG. 61, detailed description thereon is omitted herein.

Figure 65:
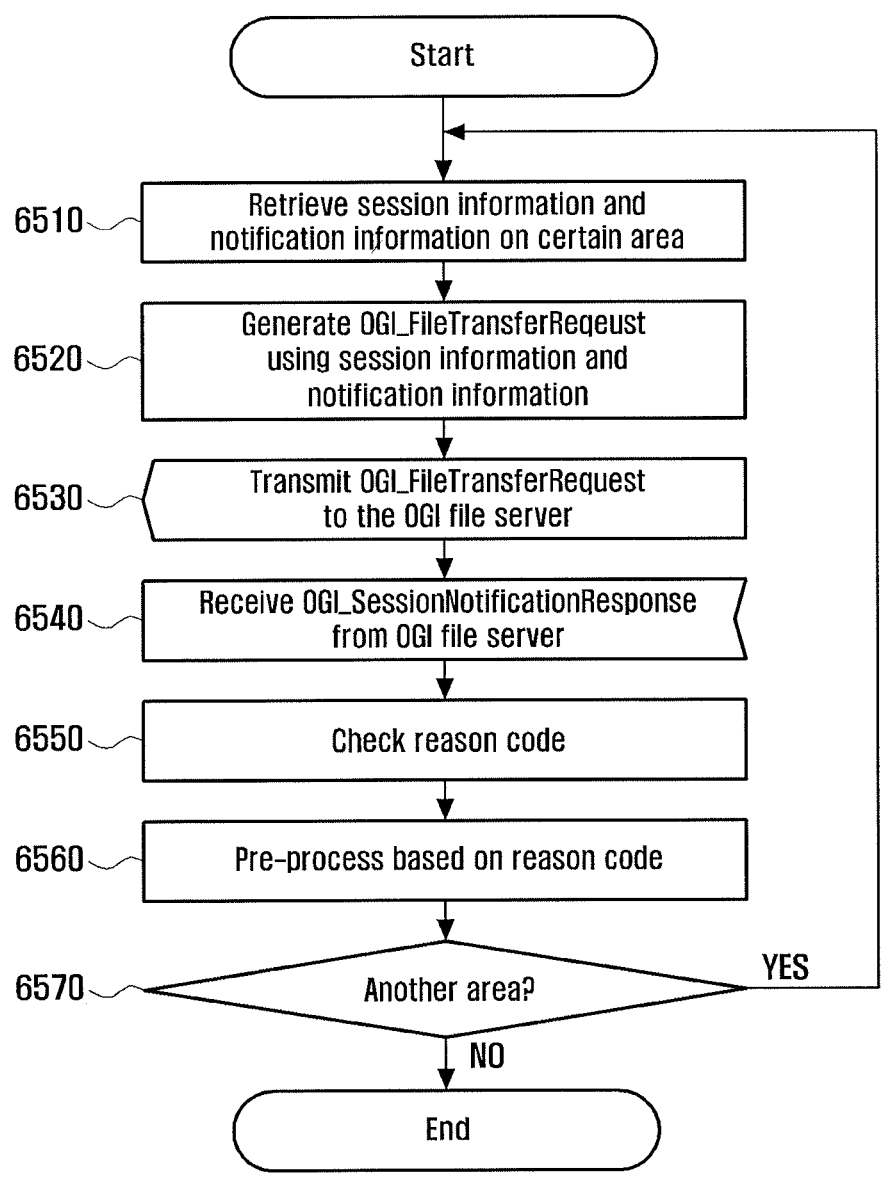
FIG. 65 is a flowchart illustrating an operation order of the OGI controller 560 in FIG. 64.

FIG. 65 is a flowchart illustrating an operation order of the OGI controller 560 in FIG. 64.

First, the OGI controller 560 checks the session information and notification information on a specific cell or specific area at step 6510. The OGI controller 560 generates the OGI-FileTransferRequest message using the checked session information and notification information at step 6520. Next, the OGI controller 560 sends the OGI-FileTransferRequest message to the BM-SC 530 at step 6530 and waits for a response. Upon receipt of the OGI-FileTransferResponse message at step 6540, the OGI controller 560 checks the "Reason" code at step 6550 and performs the subsequent process based on the code at step 6560.

Next, the OGI controller 560 checks the cells or area to which the file has not been transmitted at step 6570 and, if necessary to transmit the file to a specific cell, returns the procedure to step 6510 to perform subsequent steps.

Figure 66:
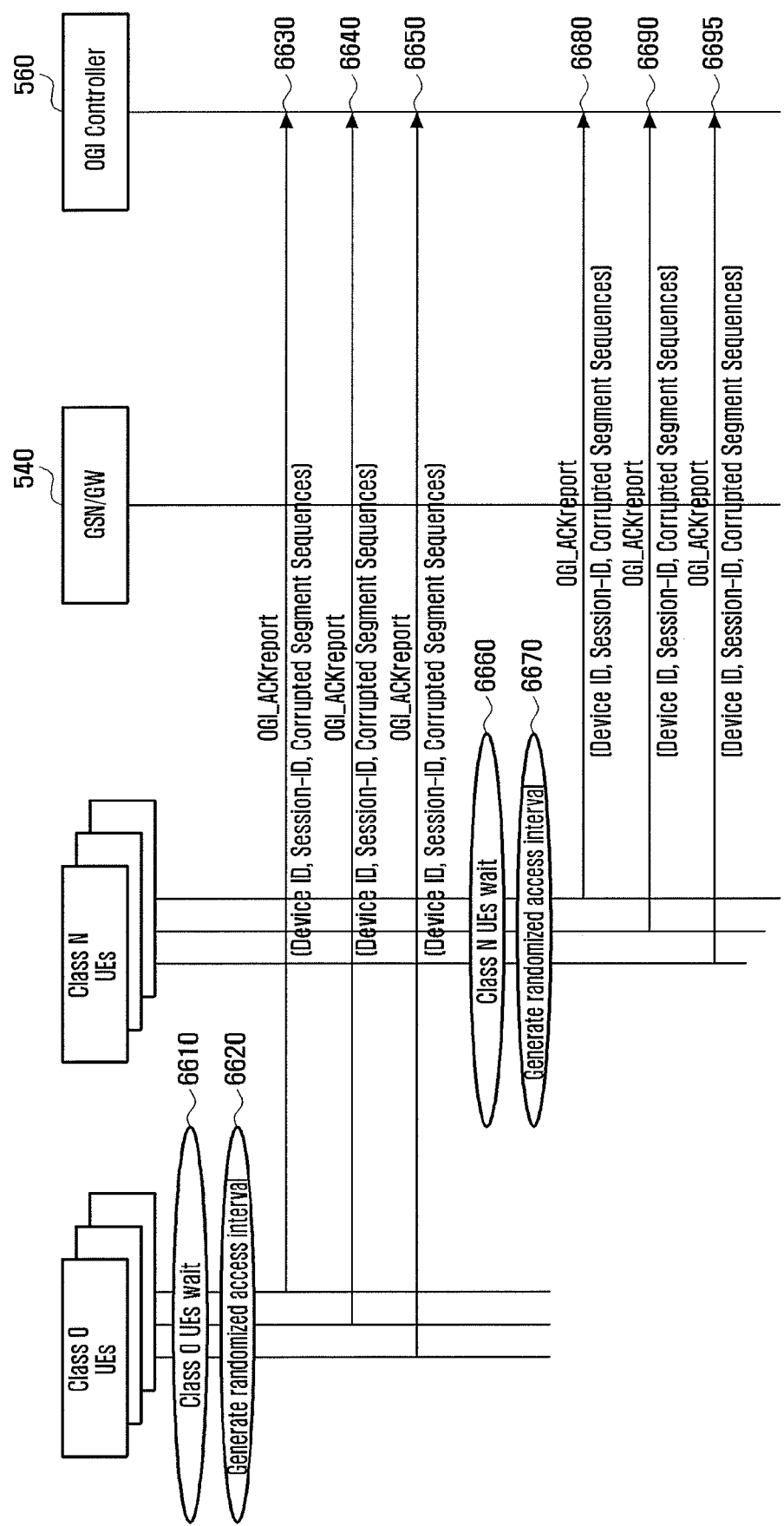
FIG. 66 is a signaling diagram illustrating details of the UE check step 3950 of FIG. 39.

FIG. 66 is a signaling diagram illustrating details of the UE check step 3950 of FIG. 39. In FIG. 66, each UE 130 reports to the OGI controller 560 whether the file has been received successfully according to the response configuration information defined in the ACK class table of FIG. 54.

For this purpose, the UEs classified as class 0 waits for the arrival of time for reporting to the OGI controller 560 at step 6610 and, if the time arrives, generates a randomized access interval at step 6620. Each UE sends an OGI acknowledgement report (OGI-ACKreport) message to the OGI controller 560 at the predetermined timings at steps 6630 to 6650.

This procedure is repeated for the UEs classified as class 0 to class N repeatedly.

In this case, each UE 130 is assigned timeslot according to the class and classified into one of the case generating ACK and the case not generating ACK according to the condition. The reason why the time and channel are classified according to the class is to avoid the congestion on the uplink radio channel when a large number of UEs 130 belonged to a group attempts ACK transmissions simultaneously. Also, the reason why the ACK is transmitted or not according to the class is to manage the radio channel quality-adaptive file (information) transfer and intelligent response (based on the radio channel condition) because, when success ratio requested by the content provider 110 is low, it is not necessary for all the UEs 130 to succeed so as to skip ACK response to the UE 130 of the class having low radio channel quality, and oppositely when the success ratio is high, it is necessary for all the UEs 130 including low class UEs to succeed.

Figure 67:
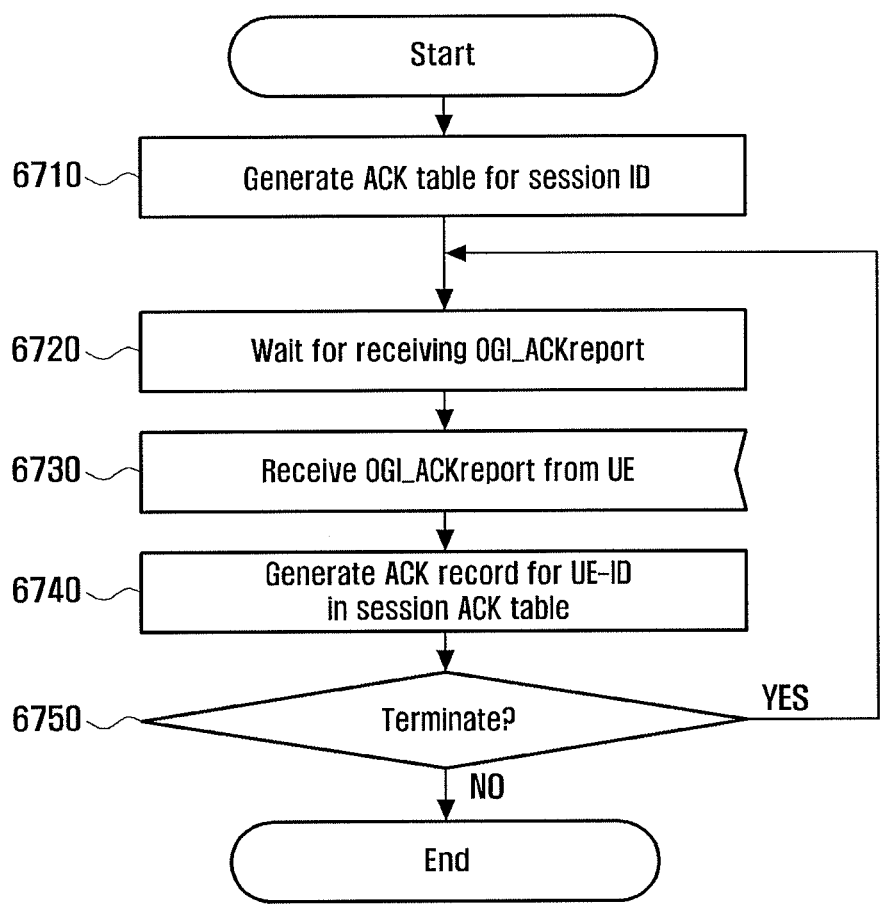
FIG. 67 is a flowchart illustrating an operation order of the OGI controller in FIG. 66.

FIG. 67 is a flowchart illustrating an operation order of the OGI controller in FIG. 66.

First, the OGI controller 560 generates the ACK table for the corresponding session at a scheduled time at step 6710. Next, the OGI controller 560 waits for receiving the OGI-ACKreport message transmitted by each UE at step 6729 and receives the message at step 6730. The OGI controller 560 analyzes the received OGI-ACKreport message and records the analysis result in the generated ACK table at step 6740. An exemplary ACK table structure is depicted in FIG. 68.

Figures 68, 69:
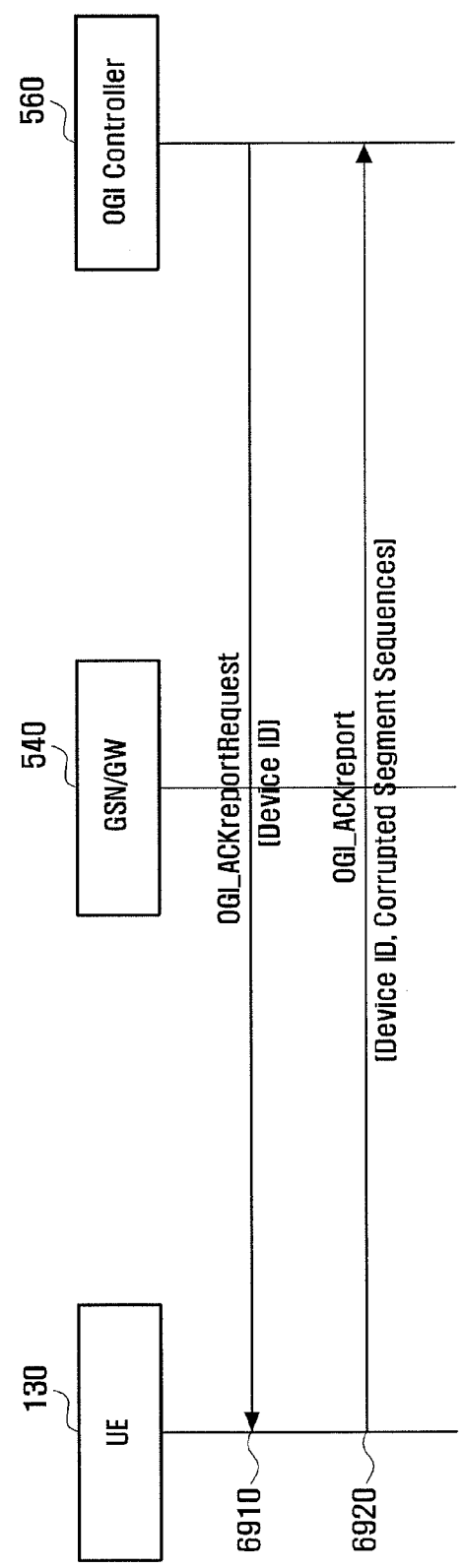
FIG. 68 is a diagram illustrating a structure of the ACK table of the present invention.
FIG. 69 is a signaling diagram illustrating a reception status report procedure based on unicast transmission.

As shown in FIG. 68, the ACK table may include a UE ID field for identifying each UE, session ID field for indicating the session responded, and a corrupted sequence field for indicating the erroneous part of the file transmitted in the corresponding session.

The OGI controller 560 determines whether the scheduled termination time has elapsed at step 6750 and, if the termination time has not elapsed, returns the procedure to step 6710 to perform the subsequent steps repeatedly.

Although it has been scheduled and notified of the scheduling information, if the UE 130 has not replied, it is impossible to receive the report on the success or failure through unicast transmission. The operation of the OGI controller for such a situation is depicted in FIG. 69.

FIG. 69 is a signaling diagram illustrating a reception status report procedure based on unicast transmission.

As shown in FIG. 69, the OGI controller 560 sends an OGI acknowledgement report request (OGI-ACKreportRequest) message to the UE which has not reported reception status in a predetermined scheduling time at step 6910.

Upon receipt of the message, the UE sends an OGI acknowledgement report (OGI-ACKreport) message to the OGI controller 560 in response to the OGI-ACKreportRequest message at step 560.

Figure 70:
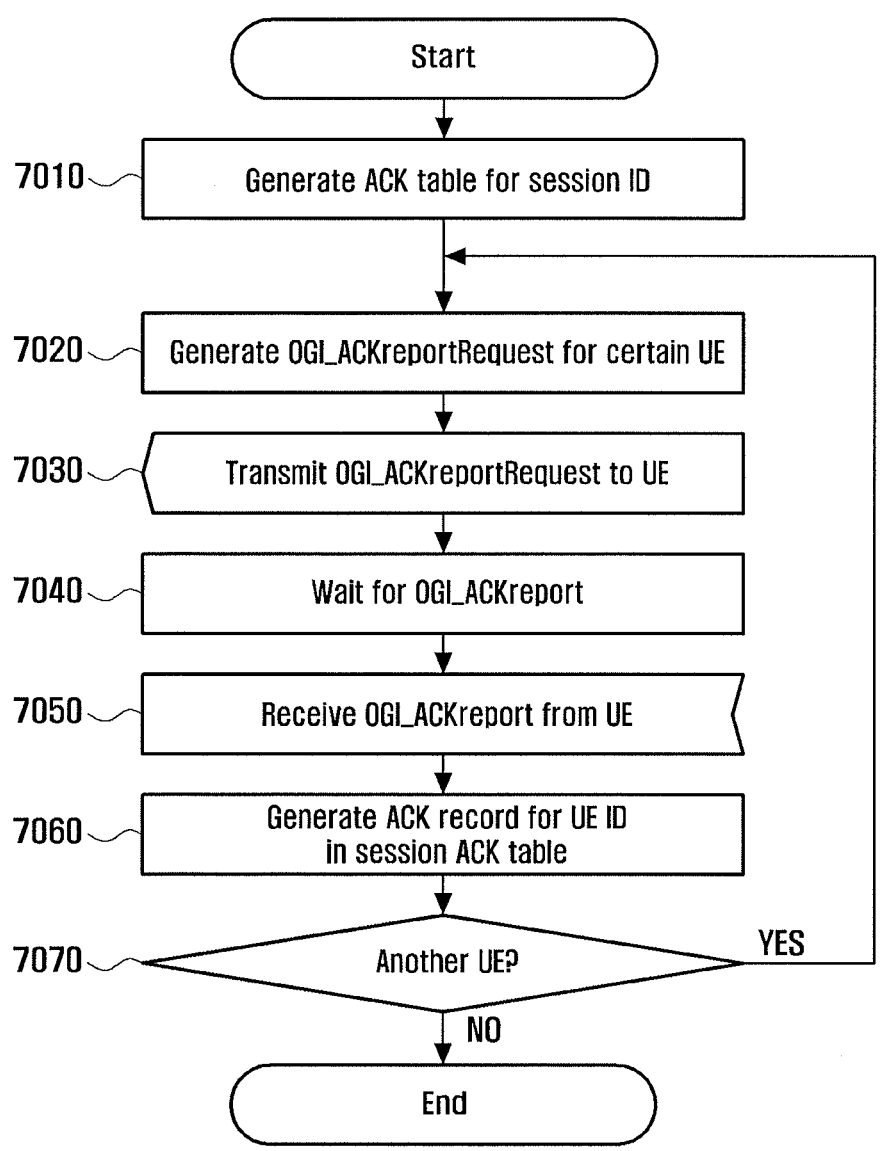
FIG. 70 is a flowchart illustrating an operation order of the OGI controller 560 in FIG. 69.

FIG. 70 is a flowchart illustrating an operation order of the OGI controller 560 in FIG. 69.

First, the OGI controller 560 generates an ACK table corresponding to the session ID at step 7010. Next, the OGI controller 560 generates the OGI-ACKreportRequest message to be transmitted to the UE which has not reported the reception status in a predetermined scheduling time at step 7020. The OGI controller sends the generated message to the corresponding UE at step 7030 and waits for receiving a response at step 7040. Upon receipt of the OGI-ACKreport message from the UE at step 7050, the OGI controller 560 records the data on the corresponding UE in the ACK table.

The OGI controller 560 determines whether there is another UE from which no reception status report is received at step 7070. If there is another UE from which no reception status report is received, the OGI controller 560 returns the procedures to step 7010 to perform the subsequent steps.

The multicast/broadcast is the transmission made without consideration of the radio channel status of the UE 130 and thus it is difficult to expect 100% success. Accordingly, after the file transmission, it is inevitable to perform retransmission of the transmission-failed file. In case that the priority of the file is very high or the number of the UEs belonged to a specific group is small, it is possible to perform retransmission based on unicast.

Figure 71:
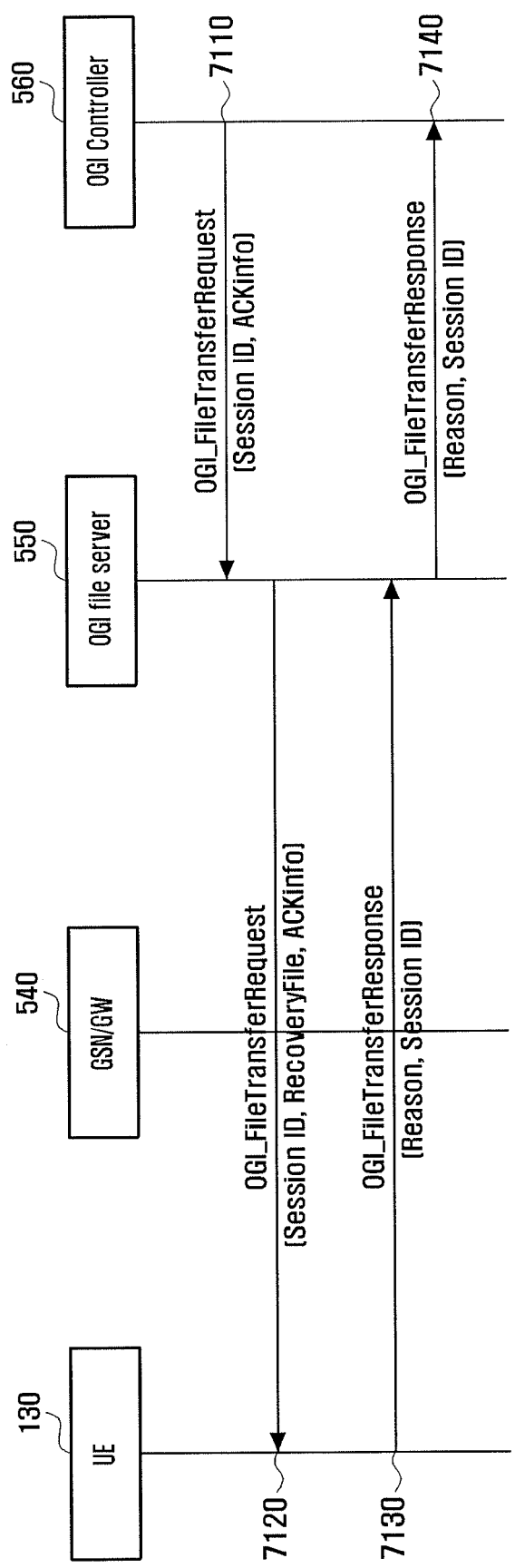
FIG. 71 is a signaling diagram illustrating details of file recovery step 3960 of FIG. 39.

FIG. 71 is a signaling diagram illustrating details of file recovery step 3960 of FIG. 39.

In this case, the OGI controller 560 checks the information on the session and per-UE error and requests the OGI file server 550 for retransmission of the erroneous part of the file transfer. For this purpose, the OGI controller 560 sends an OGI file transfer request (OGI-FileTransferReqeust) message to the OGI file server 550 at step 7110. The OGI file server 550 generates a retransmission file by collecting the erroneous parts and sends the OGI-FileTransferRequest message including the corresponding file to the corresponding UE 130 in unicast form.

Figure 72:
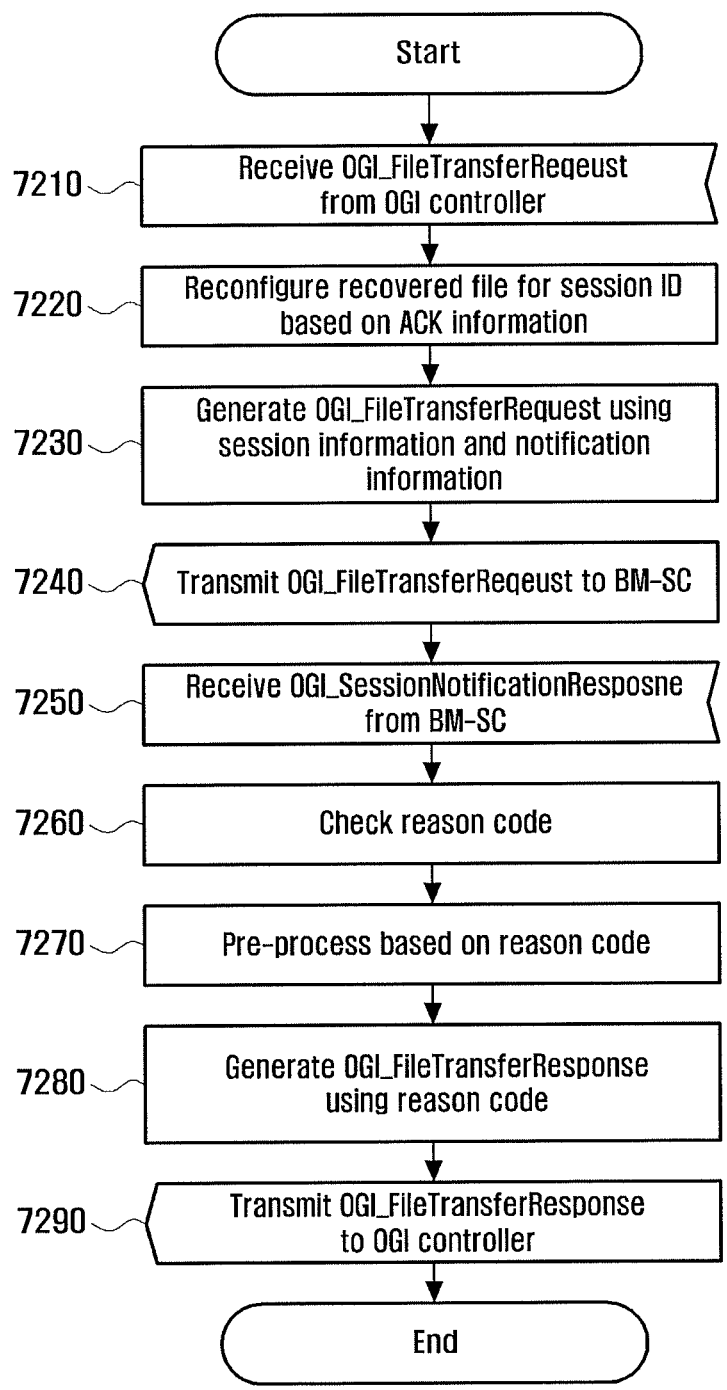
FIG. 72 is a flowchart illustrating an operation order of the OGI file server 550 in FIG. 71.

FIG. 72 is a flowchart illustrating an operation order of the OGI file server 550 in FIG. 71.

First the OGI file server 550 receives the OGI-FileTransferRequest message from the OGI controller 560. The OGI file server 550 reconfigures the file for transmitting only the erroneous frame based on the information on corresponding session and the error report of the corresponding UE.

The OGI file server 550 generates the OGI-FileTransferRequest message including the file to be retransmitted at step 7230. Next, the OGI file server 550 sends the BM-SC 530 the OGI-FileTransferRequest message including the retransmission file at step 7240. The OGI file server 550 may transmit the message through a direct data channel established with the UE in 1:1 unicast form.

The OGI file server 550 receives an OGI session notification (OGI-SessionNotification) message from the BM-SC 530 at step 7250 and checks the "Reason" code at step 7260.

Next, the OGI file server 550 performs the subsequent process according to the checked code at step 7270.

Afterward, the OGI file server 550 generates an OGI file transfer response (OGI-FileTransferResponse) message including information on whether the file retransmission has succeeded or failed at step 7280 and sends this message to the OGI controller 560 at step 7290.

Figure 73:
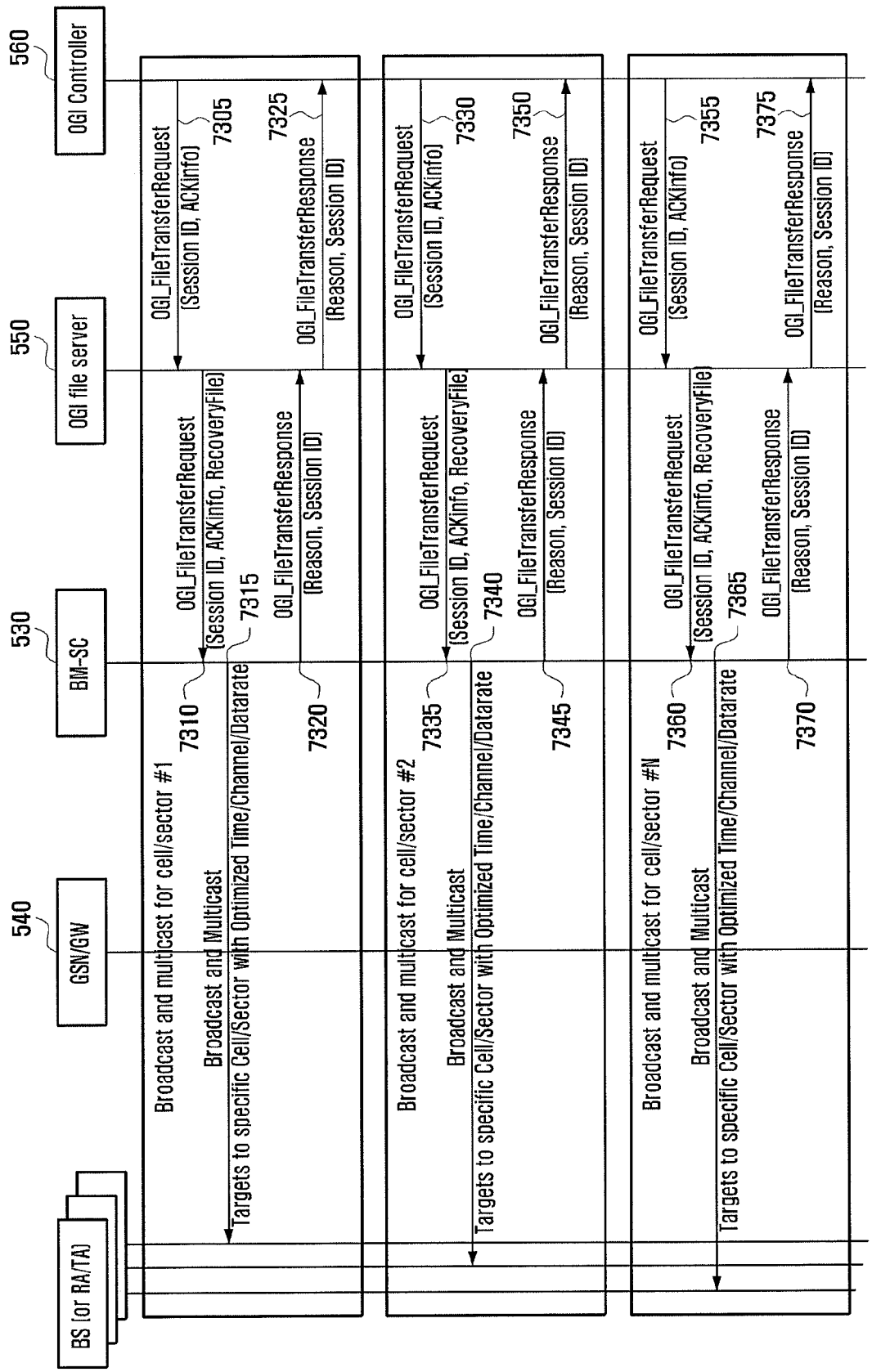
FIG. 73 is a signaling diagram illustrating a file retransmission procedure per cell per multicast/broadcast channel.

FIG. 73 is a signaling diagram illustrating a file retransmission procedure per cell per multicast/broadcast channel.

In case of retransmission, it is preferred to retransmit the file in the form optimized to a specific cell. This is to avoid the increase of the retransmission file size and the influence of the transmission failure caused by the local property.

Detailed procedure is identical with those in FIGS. 61 and 64 with the exception that the retransmission file optimized per cell is reconfigured by the OGI file server 550 based on the error report information collected by the OGI controller 560.

Figure 74:
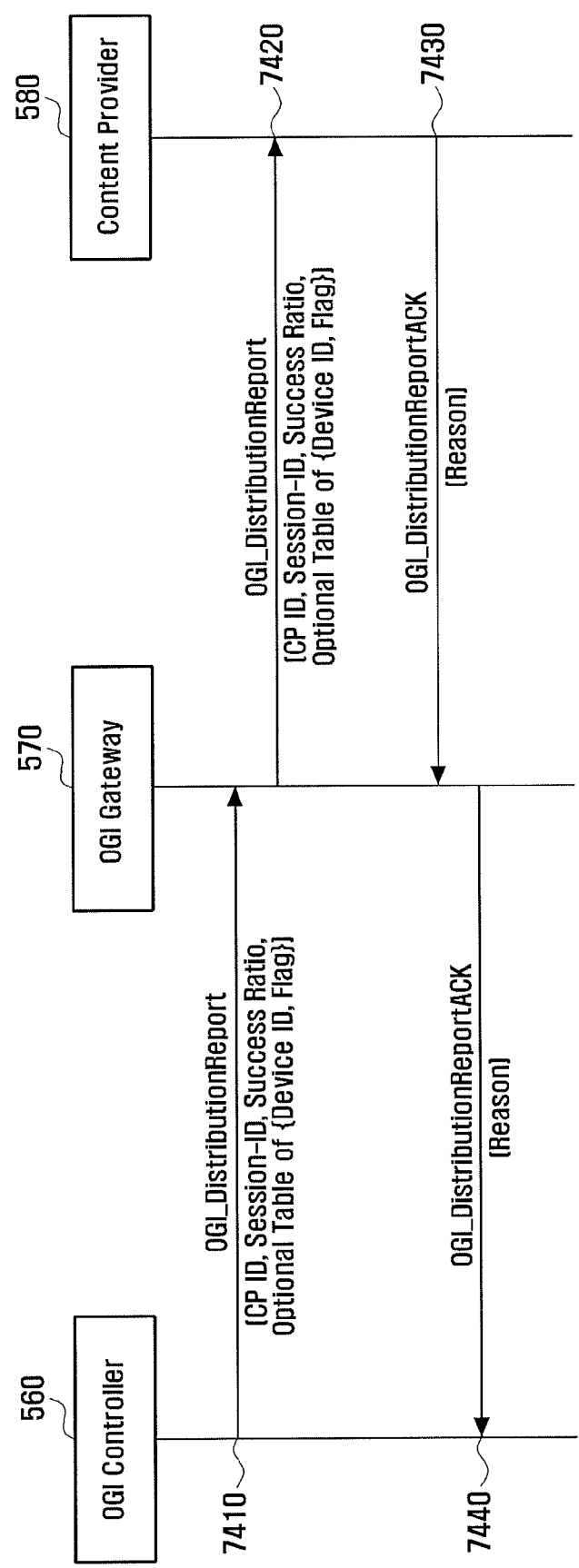
FIG. 74 is a signaling diagram illustrating details of the group transfer report step of FIG. 39.

FIG. 74 is a signaling diagram illustrating details of the group transfer report step of FIG. 39. That is, FIG. 74 shows the procedure of transmitting the per-group file transfer result to the content provider or content provider server 580 as statistical information.

First, the OGI controller 560 generates a transfer result report table per session and calculates success ratio of the corresponding session based on the statistical value of the entire UEs. Also, the OGI controller 560 generates an OGI distribution report (OGI-DistributionReport) message by analyzing the success, failure, and remarkable matters. The OGI controller 560 sends the generated message to the content provider server 580 at steps 7410 and 7420.

The content provider server 580 sends an OGI distribution report acknowledgement (OGI-DistributionReportACK) message to the OGI controller 560 at steps 7430 and 7440.

Figure 75:
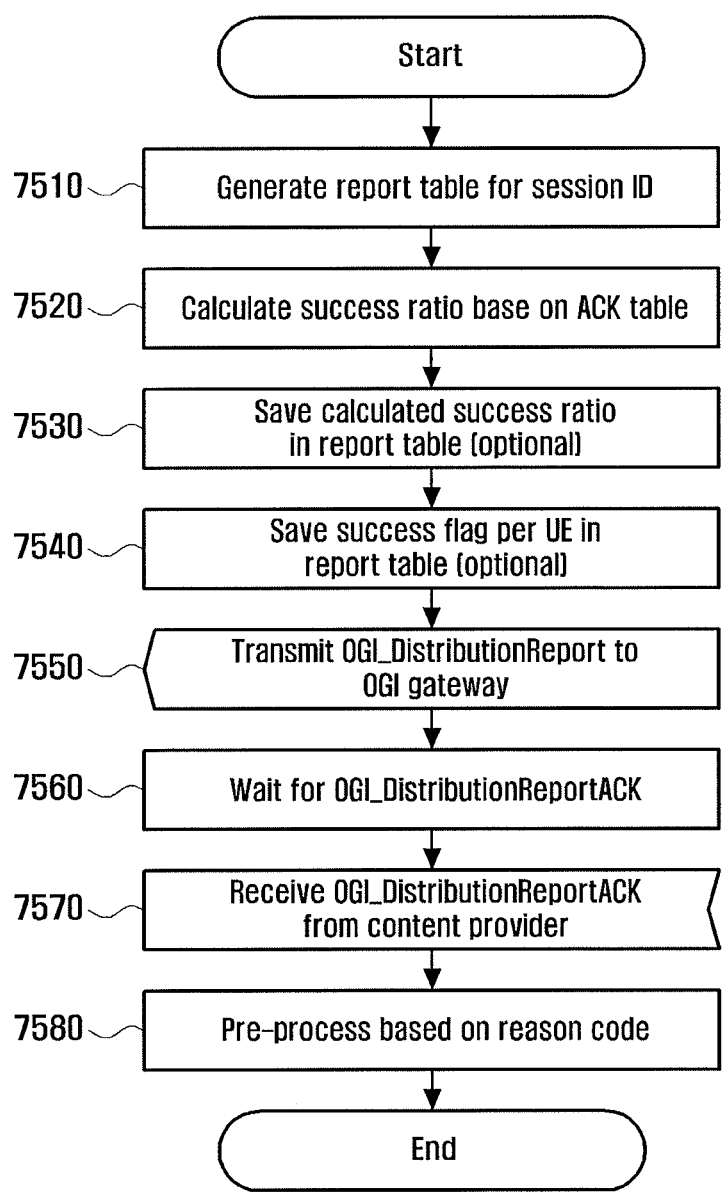
FIG. 75 is a flowchart illustrating an operation order of the OGI controller in FIG. 74.

FIG. 75 is a flowchart illustrating an operation order of the OGI controller in FIG. 74.

The OGI controller 560 generates a transfer result report table per session at step 7510. The OGI controller 560 calculates the success ratio of the corresponding session based on the statistical values of the entire UEs. According to an embodiment of the present invention, the OGI controller 560 may store the success ratio in the transfer result report table at step 7530. The OGI controller 560 also may store a transfer success indication flag per UE in the transfer result report table at step 7540.

Next, the OGI controller 560 generates an OGI distribution report (OGI-DistributionReport) message including the transfer result report table and sends this message to the content provider 580. In this case, the OGI-DistributionReport message is generated in the format of XML or spreadsheet rather than a normal message format and records the entire success ratio of the session and per-UE status in detail as shown in FIG. 76.

While waiting for a reply in response to the OGI-DistributionReport message, the OGI controller 560 receives the response message form the content provider 580 at step 7570. Upon receipt of the response message, the OGI controller 560 performs subsequent process at step 7580.

The structures of the message used in the message transmission/reception procedures predicted in the aforementioned drawings are depicted in FIGS. 77 to 97. In this case, as the common header information of all the messages, message type (MSG-TYPE) is a control code indicating the type of the corresponding message, a transaction sequence (TRANSACTION-SEQ) is a code used for detecting redundancy or error at the sender. Typically, a specific message is transmitted with the sequence which starts from 0 and increasing by 1.

FIG. 77 is a diagram illustrating a format of the OGI-ServiceReserveRequest message.

The transfer mode indicates the multicast/broadcast transmission scheme based on scheduling, and the device characteristics indicate whether the UEs of the group are fixed or mobile UEs. The target region indicates local target of the corresponding session transmission and, if a plurality of target regions exist, the target regions are defined repeatedly as many as the target region length. The group ID indicates the group belonged to the corresponding session. The deadline indicates the expected end time of the corresponding session, the importance indicates the importance of the session. The target-success-ratio indicates the hopeful success ratio of the corresponding session. The file-description is the supplementary information on the transferred file. Finally, the session ID is the identifier of the session in the corresponding group.

FIG. 78 is a diagram illustrating a format of the OGI-SessionReserveResponse message. As shown in FIG. 78, the OGI-SessionReserveResponse message includes a session ID and a reason code indicating a message execution result.

Figure 79:
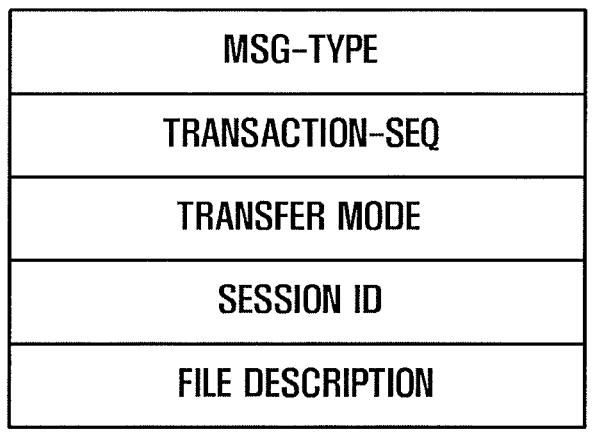

FIG. 79 is a diagram illustrating a format of the OGI-FileUploadReserveRequest message. The OGI-FileUploadReserveRequest message may include the transfer mode indicating the multicast/broadcast transmission scheme and a session ID for identifying the session. The file description carries the supplementary information on the transferred file.

Figure 80:
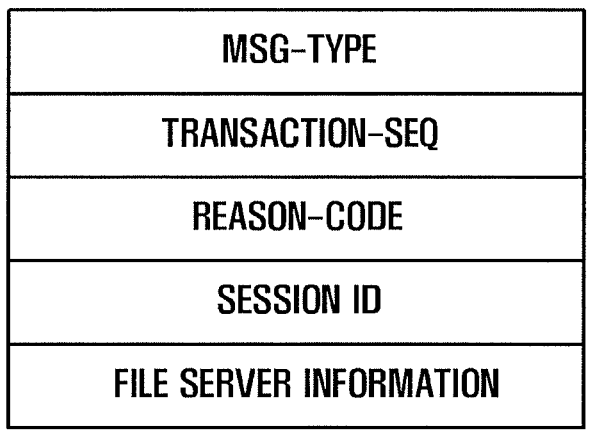

FIG. 80 is a diagram illustrating a format of the OGI-FileUploadReserveResponse message. The OGI-FileUploadReserveResponse message may include a session (D for indicating a session, a reason code for indicating a message execution result, and a file server information on the file server.

Figure 81:
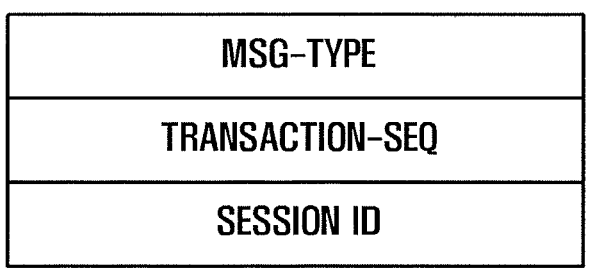

FIG. 81 is a diagram illustrating a format of the OGI-FileUploadConfirmRequest message. The OGI-FileUploadConfirmRequest message may include a session ID for indicating a session.

Figure 82:
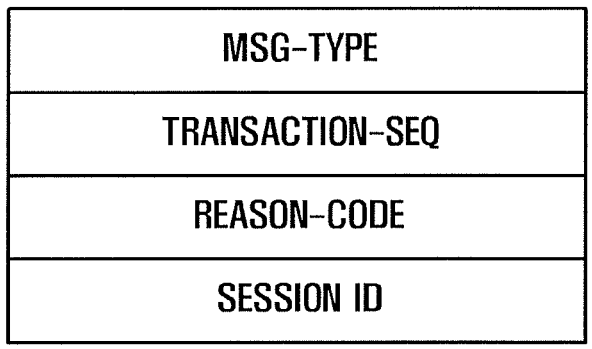

FIG. 82 is a diagram illustrating a format of the OGI-FileUuploadConfirm Response message. The OGI-FileUploadConfirmResponse message may include a reason code for indicating a message execution result.

Figure 83:
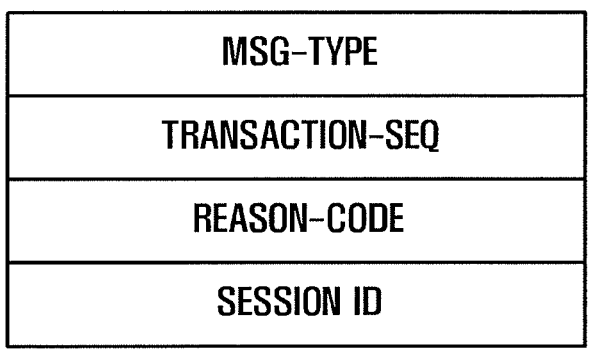

FIG. 83 is a diagram illustrating a format of the OGI-ServiceUnreserveRequest message. The OGI-ServiceUnreserveRequest message may include a session ID for indicating a session and a reason code for indicating a message execution result.

Figure 84:
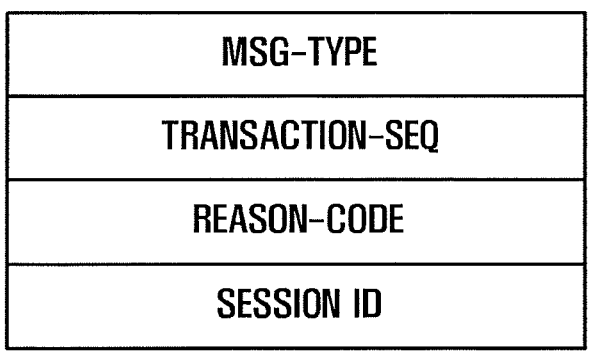

FIG. 84 is a diagram illustrating a format of the OGI-ServiceUnreserveResponse message. The OGI-ServiceUnreserveResponse message may include a session ID for indicating a session and a reason code for indicating a message execution result.

Figure 85:
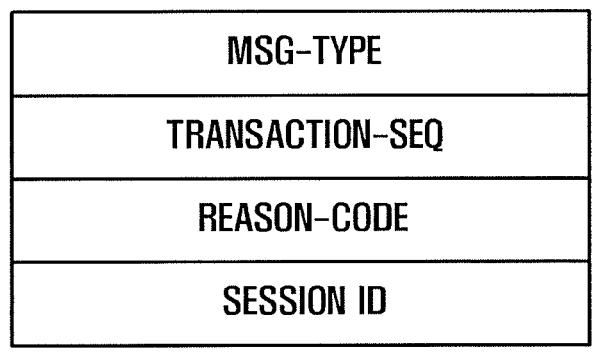

FIG. 85 is a diagram illustrating a format of the OGI-FileUploadReserveRequest message. The OGI-FileUploadReserveRequest message may include a session ID for indicating a session and a reason code for indicating a message execution result.

Figure 86:
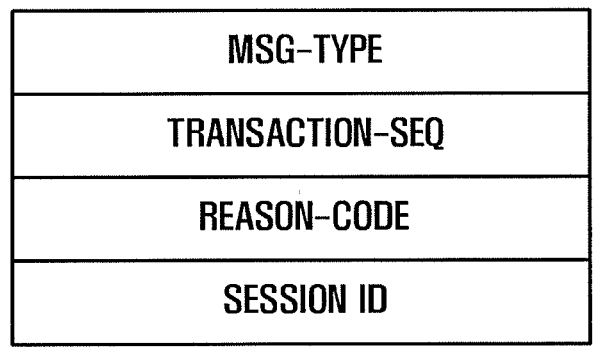

FIG. 86 is a diagram illustrating a format of the OGI-FileUploadUnreserveResponse) message. The OGI-FileUploadUnreserveResponse message may include a session ID for indicating a session and a reason code for indicating a message execution result.

FIG. 87 is a diagram illustrating a format of the OGI-SessionNotificationRequest message.

As shown in FIG. 87, the OGI-SessionNotificationRequest message may include a session ID for indicating a session, a start time for indicating the scheduled start time of the session, a start channel for indicating the channel carrying the actual information, and a data rate for indicating the data rate of the channel carrying the actual information. The OGI-SessionNotificationRequest message also may include an acknowledge request for requesting for acknowledgement, an ACK-required for indicating whether the ACK transmission is required, an ACK-enabled for indicating per-class acknowledgement, an ACK-channel for indicating the radio channel to be used for acknowledgement, and an ACK-timeslot for indicating the timeslot carrying the response time information.

Figure 88:
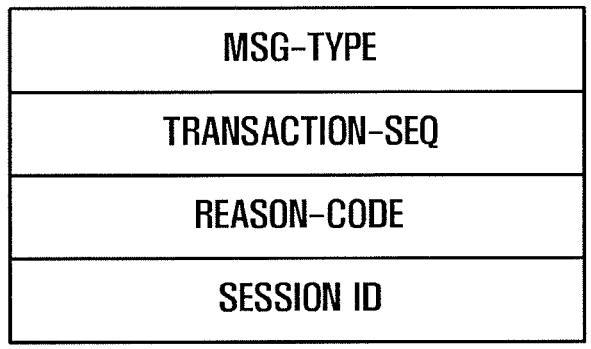

FIG. 88 is a diagram illustrating a format of the OGI-SessionNotificationResponse message. The OGI-SessionNotificationResponse message may include a session ID for indicating a session and a reason code for indicating the message execution result.

Figure 89:
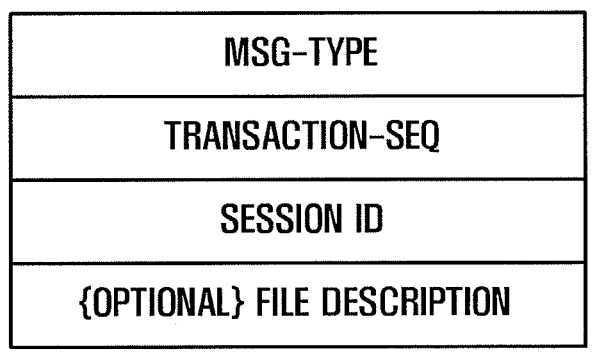

FIG. 89 is a diagram illustrating a format of the OGI-FileTransferRequest message. The OGI-FileTransferRequest message may include a session ID for indicating a session and a file description carrying the information on the transmitted file.

Figure 90:
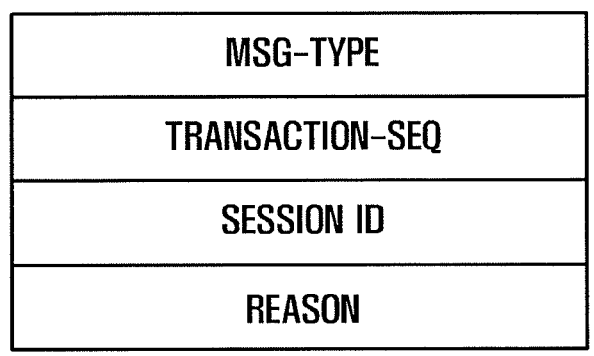

FIG. 90 is a diagram illustrating a format of the OGI-FileTransferResponse message. The OGI-FileTransferResponse message may include a session ID for indicating a session and a reason code for indicating the message execution result.

Figure 91:
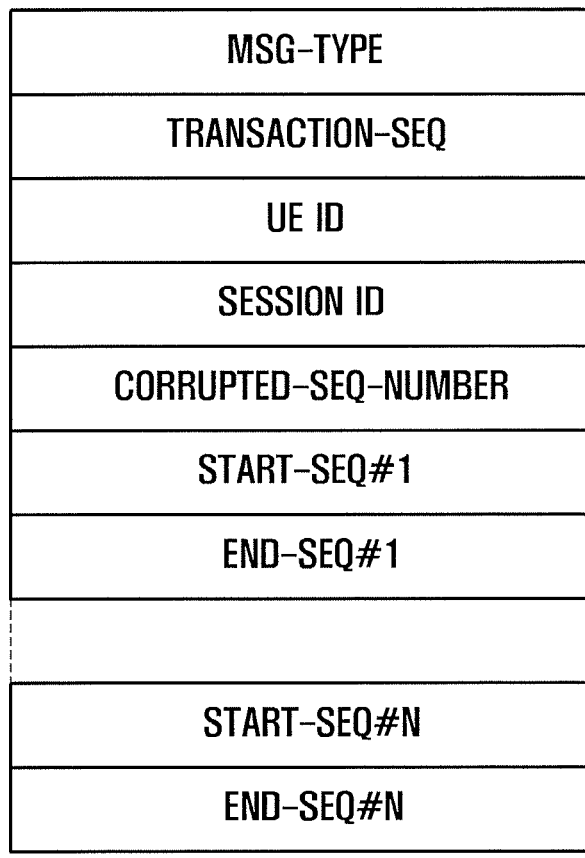

FIG. 91 is a diagram illustrating a format of the OGI-ACKreport message. The OGI-ACKreport message may include a UE ID (device ID) for identifying s UE and a session ID for indicating a session. The OGI-ACKreport message may also include a start sequence number (START-SEQ) for indicating the sequence number of the first one among the erroneous packets and an end sequence number (END-SEQ) for indicating the sequence number of the last one among the erroneous packet repeatedly as many as the erroneous parts.

Figure 92:
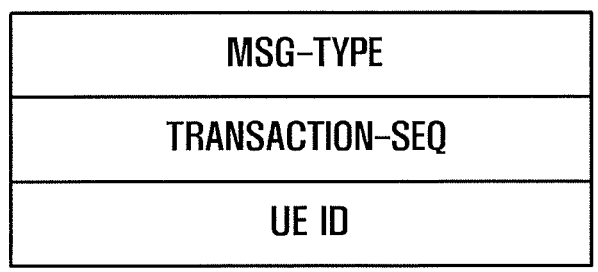

FIG. 92 is a diagram illustrating a format of the OGI-ACKreportRequest message. The OGI-ACKreportRequest message may include a UE ID (DEVICE-ID) for identifying the UE.

Figure 93:
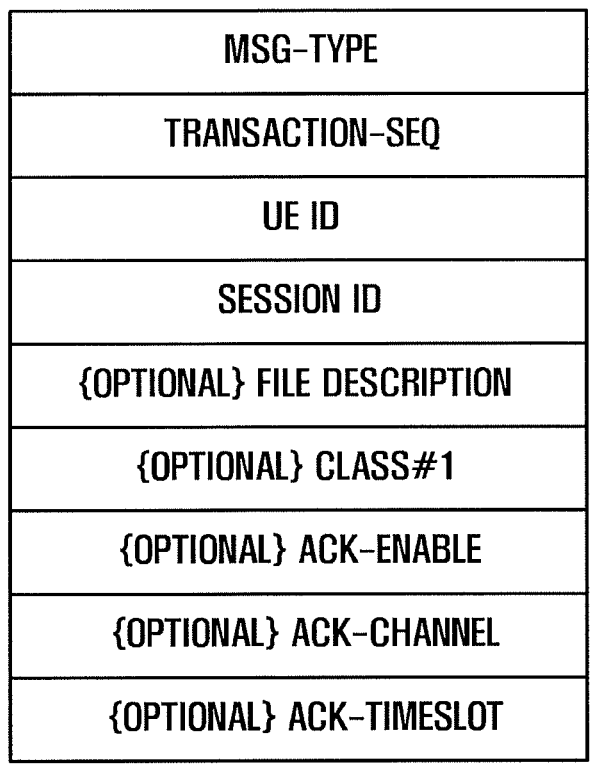

FIG. 93 is a diagram illustrating a format of the OGI-FileTransferRequest message.

As shown in FIG. 93, the OGI-FileTransferRequest message may include a UE ID (DEVICE-ID) for identifying the UE and a session ID for indicating a session. The OGI-FileTransferRequest message also may include a file description for supplementary information on the file to be retransmitted, a class (CLASS) for indicating the acknowledgement class of the corresponding UE, an ACK-enabled for informing of the configuration of radio channel to be used for acknowledgement, an ACK-channel, and an ACK-timeout slot. Since the ACK-enabled, ACK-channel, and ACK-timeout have been described with reference to FIG. 87, detailed descriptions thereon are omitted herein.

Figure 94:
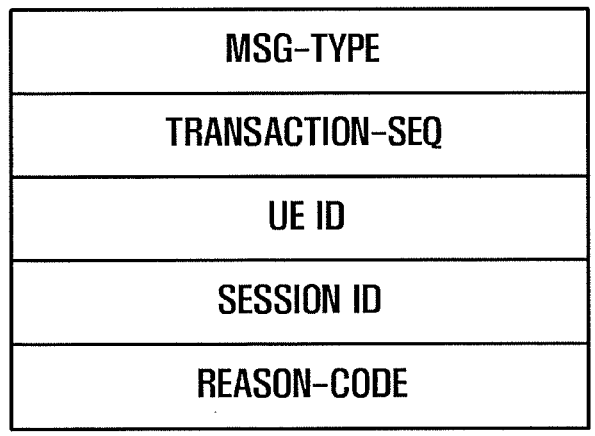

FIG. 94 is a diagram illustrating a format of the OGI-FileTransferResponse message. The OGI-fileTransferResponse message may include a UE ID (DEVICE-ID) for identifying the UE, a session ID for indicating a session, and a reason code for indicating the message execution result.

FIG. 95 is a diagram illustrating a format of the OGI-FileRetransferRequest message. Since this message is identical with that of FIG. 87 with the exception of including the information on the file optionally, detailed description thereon is omitted herein.

Figure 96:
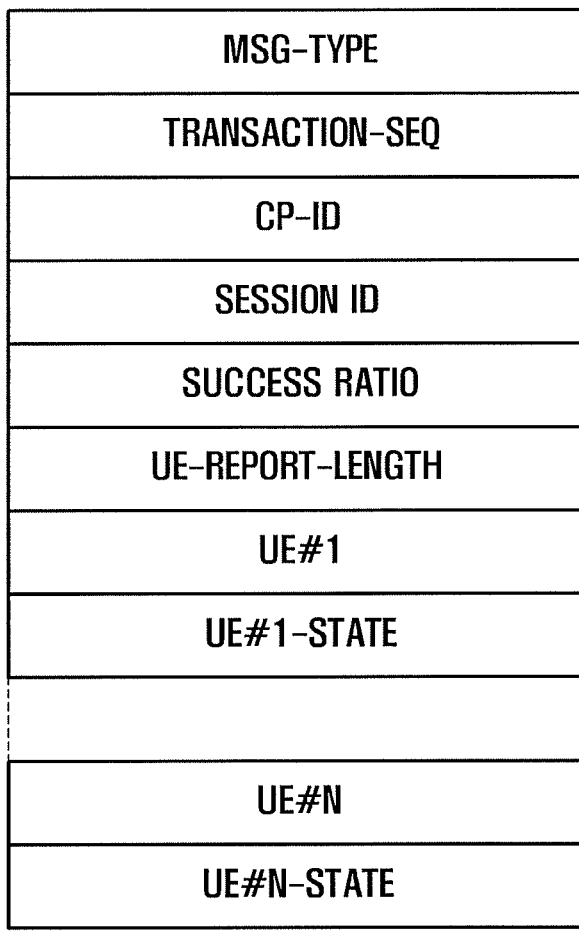

FIG. 96 is a diagram illustrating a format of the OGI-DistributionReport message. The OGI-DistributionReport message may include a CP ID for indicating the content provider, a session ID for indicating a session, a success ratio for indicating the success ratio of the session, a UE ID (DE- VICE-ID) for identifying the UE, and a device status field for indicating per-UE success or failure.

Figure 97:
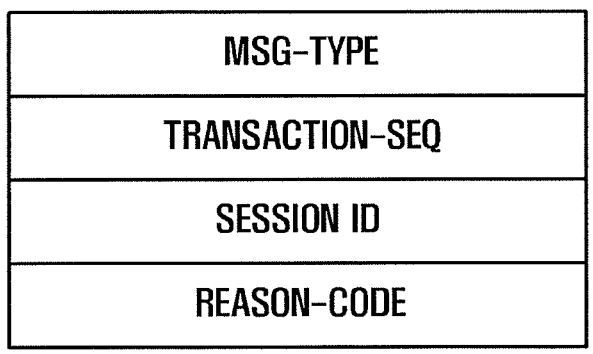

FIG. 97 is a diagram illustrating a format of the OGI-DistributionReportACK message. The OGI-DistributionReportACK message may include a session ID for indicating a session and a reason code for indicating the message execution result.

Additional description is made of the file transfer on the radio channel, which has been described with reference to FIGS. 61 and 64, hereinafter.

Figure 98:
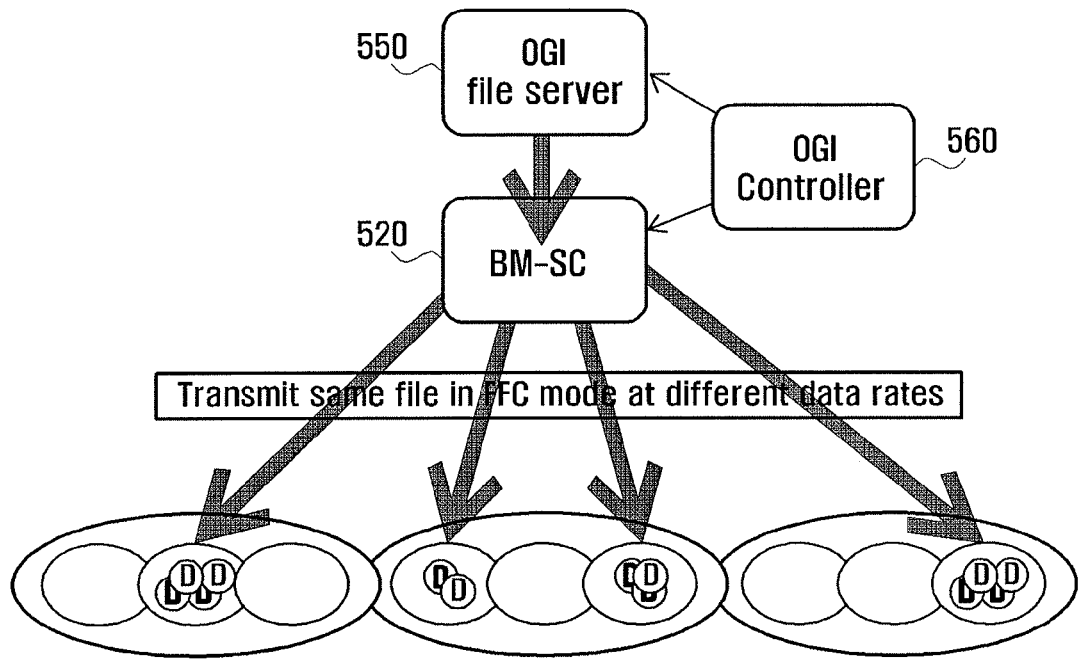
FIG. 98 is a diagram illustrating a file transfer mode for a fixed type UE according to an embodiment of the present invention.

According to an embodiment of the present invention, the FIG. 98 is a diagram illustrating a file transfer mode for a fixed type UE.

As shown in FIG. 98, in case of a fixed UE, the OGI file server 550 may transfer the file to a specific cell or sector in which the UEs located so as to use the radio resource efficiently.

Figure 99:
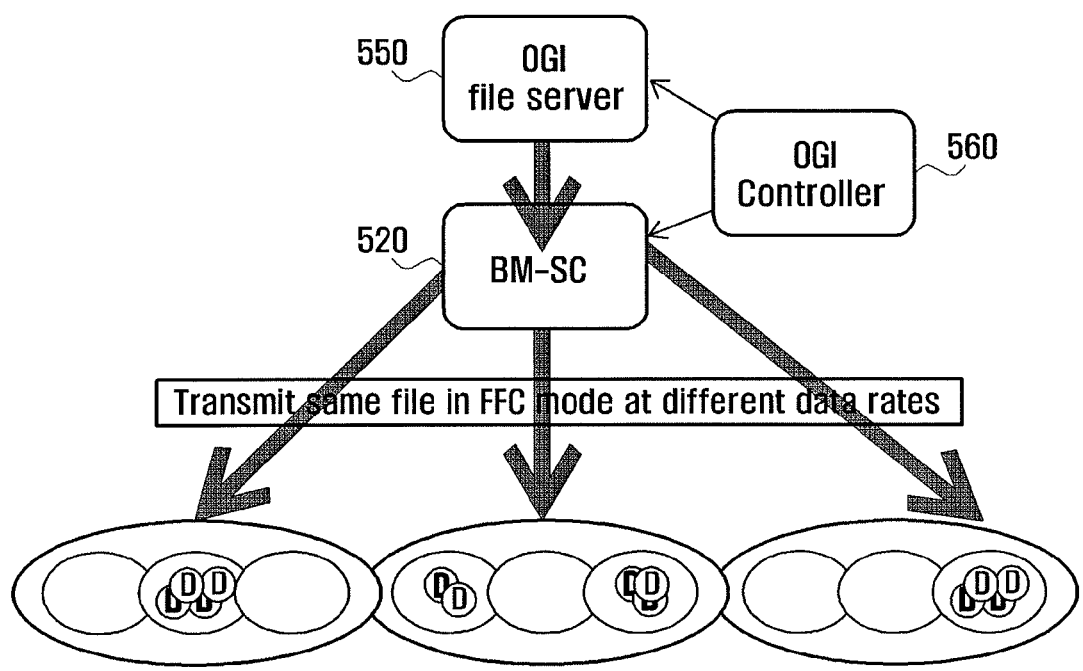
FIG. 99 is a diagram illustrating a file transfer mode for a mobile type UE according to an embodiment of the present invention.

In case of a mobile UE, however, the file transfer method of the present invention aims to transfer the file to a routing or a tracking area as depicted in FIG. 99. This is because, if it is subdivided to the cell or sector level as for the fixed UE, the mobility of the UE may increase the file transfer error probability. In this case, however, the optimized data rate and configuration per routing or tracking area reinforce the resource efficiency of the radio channel.

Additional description is made on the file reception status report of the UE, which has been described with reference to FIG. 66, hereinafter.

Figure 100:
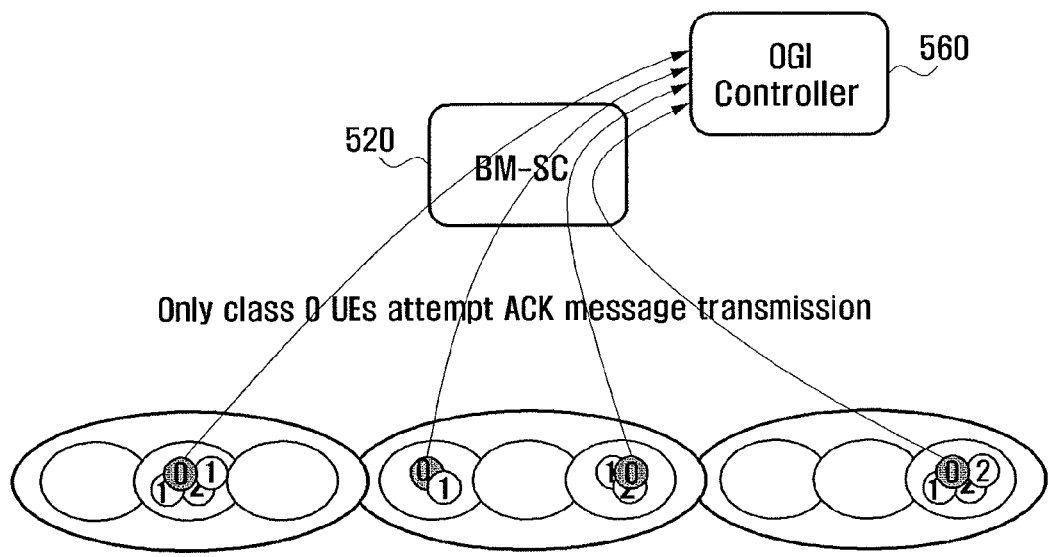
FIG. 100 is a diagram illustrating a class-based distributed UE ACK transmission method according to an embodiment of the present invention.

As shown FIG. 100, the UEs are assigned different uplink channel access timings based on their classes assigned by the network. The corresponding timing arrives, the UE attempts error report in a situation with reduced collision probability statistically by distributing collisions according to a random variable. Through this, it is possible to reinforce the efficiency of the restricted uplink channel and the efficiency of the radio channel by calculating the success ratio for the transfer requested with a success ratio other than 100%.

Similar to the file transfer on the radio channel which has been described with reference to FIGS. 98 and 99, it is possible, in case of the fixed UE, to support the subdivision to a specific cell or sector level for the transmission from the OGI file server 550 on the multicast/broadcast channel through BM-SC 530. The matters on this are depicted in FIG. 101.

Figure 101:
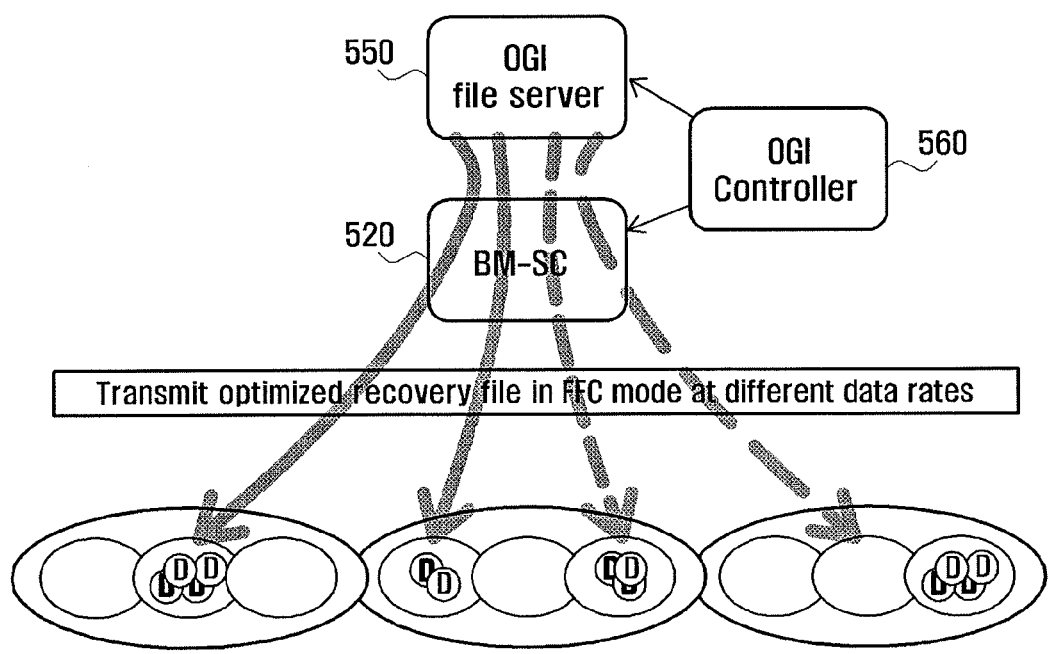
FIG. 101 is a diagram illustrating a file retransmission method for the fixed UE according to an embodiment of the present invention.
Figure 102:
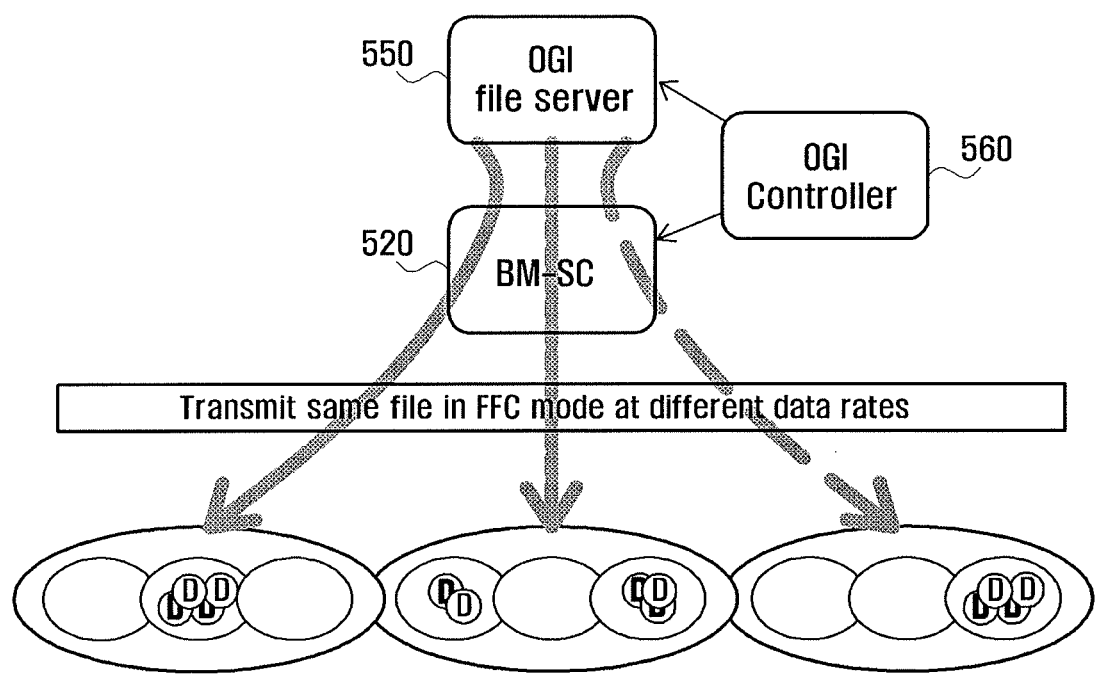
FIG. 102 is a diagram illustrating a file transmission method for the fixed UE according to another embodiment of the present invention.

As shown in FIG. 101, the OGI file server 550 performs transmission to the level of the cell or sector where the UEs are located so as to use the radio resource efficiently. Likewise, in case of the mobile UE, it is aimed to transfer the file to the routing or tracking area as shown in FIG. 102. This is because the subdivision to the cell or sector level, as in the case of fixed UE, causes increase of the file transfer error probability due to the UE's mobility. In this case, however, the resource efficiency of the radio channel is reinforced by using the data rate and configuration optimized per the routing or tracking area.

While the invention is described in terms of some specific examples and embodiments, it will be clear that this invention is not limited to these specific examples and embodiments and that many changes and modified embodiments will be obvious to those skilled in the art without departing from the true spirit and scope of the invention.

What is claimed is:

1. A method for an Open Group delivery service Interface (OGI) controller to register terminals for transmitting information through multicast or broadcast radio channel, the method comprising:
   registering a service for transmitting the information provided by a content provider to the terminals;
   assigning an ID to a terminal group to receive the information;
   registering the terminal group by a request of the content provider;
   receiving operation status of terminals belonging to the registered terminal group;
   assigning classes to the terminals belonging to the registered terminal group based on operation status of the terminals belonging to the registered terminal group; and
   reporting terminal status to the content provider.

2. The method of claim 1, wherein the registering of the service comprises:
   receiving a service registration request message (OGI-ServiceRegistrationRequest) for registering the service from the content provider; and
   generating a group ID for the service and transmitting a service registration response message (OGI-ServiceRegistrationResponse) to the content provider.

3. The method of claim 2, wherein the registering of the terminals comprises:
   receiving a terminal registration request message (OGI-UERegistrationRequest) for registering the terminals to receive the service with the group ID from the content provider;
   registering the terminals with the group ID; and
   transmitting a terminal registration response message (OGI-UERegistrationResponse) to the content provider.

4. The method of claim 3, wherein the receiving of the operation status of the terminals comprises receiving a terminal report message (OGI-KeepAliveReport) including the information on the status of the terminals belonging to the registered terminal group and received radio signal information from the terminals belonging to the registered terminal group.

5. The method of claim 4, wherein the receiving of the operation status of the terminals comprises receiving the terminal report message from the terminals belonging to the registered terminal group at a predetermined time.

6. The method of claim 4, wherein the receiving of the operation status of the terminals comprises receiving the terminal report message from the terminals belonging to the registered terminal group in response to a terminal status report request from the controller.

7. The method of claim 4, wherein the assigning of the classes to the terminals comprises assigning the class to the terminals belonging to the registered terminal group according to the received radio signal information or the terminals belonging to the registered terminal group.

8. The method of claim 7, wherein the assigning of the classes to the terminals comprises assigning the class to the terminals belonging to the registered terminal group using a mapping table mapping received radio signal strengths to respective classes.

9. The method of claim 7, wherein reporting of the terminal status comprises:
   receiving a request for statistical information on the terminals belonging to the registered terminal group from the content provider; and
   transmitting the system information, location information, group ID of the terminals belonging to the registered terminal group, to the content provider.

10. An apparatus for registering terminals for transmitting information through a multicast or broadcast radio channel, the apparatus comprising:
    a processor configured to control to register a service for transmitting the information provided by a content provider to the terminals and to assign an ID to a terminal group to receive the information, registering the terminal group, to check operations status of the terminals belonging to the registered terminal group, to assign classes to the terminals belonging to the registered terminal group based on operation status of the terminals belonging to the registered terminal group, and to report terminal status to the content provider; and a network module configured to perform communication with the terminals belonging to the registered terminal group.

11. The apparatus of claim 10, wherein the processor controls to receive a service registration request message (OGI-ServiceRegistrationRequest) for registering the service from the content provider and to generate a group ID for the service and to transmit a service registration response message (OGI-ServiceRegistrationResponse) to the content provider.

12. The apparatus of claim 11, wherein the processor controls to receive a terminal registration request message (OGI-UERegistrationRequest) for registering the terminals to receive the service with the group ID from the content provider, to register the terminals with the group ID and to transit a terminal registration response message (OGI-UERegistrationResponse) to the current provider.

13. The apparatus of claim 12, wherein the processor control to receive a terminal report message (OHI-KeepAliveReport) including the information on the status of the terminals belonging to the registered terminal group and received radio signal information from the terminals belonging to the registered terminal group.

14. The apparatus of claim 13, wherein the processor controls to receive the terminal report message from the terminals belonging to the registered terminal group at a predetermined time.

15. The apparatus of claim 13, wherein the processor control to receive the terminal report message from the terminals belonging to the registered terminal group in response to a terminal status report request from a controller.

16. The apparatus of claim 13, wherein the processor controls to assign the classes to the terminals belonging to the registered terminal group according to the received radio signal information or the terminals belongi8ng to the registered terminal group.

17. The apparatus of claim 16, wherein the processor control to assign the classes to the terminals belonging to the registered terminal group using a mapping table mapping received radio signal strengths to respective classes.

18. The apparatus of claim 16, wherein the processor control to receive a request for statistical information on the terminals belonging to the registered terminal group from the content provider and to transmit system information, location information, group ID of the terminals belonging to the registered terminal group, to the content provider.

* * * * *